United States Patent
Park et al.

(10) Patent No.: US 12,127,264 B2
(45) Date of Patent: Oct. 22, 2024

(54) TIMING ALIGNMENT PROCEDURE FOR A USER EQUIPMENT

(71) Applicant: Equo IP LLC, Wayne, PA (US)

(72) Inventors: Sung Jun Park, Anyang-si (KR); Seung June Yi, Anyang-si (KR); Young Dae Lee, Anyang-si (KR); Sung Duck Chun, Anyang-si (KR)

(73) Assignee: Equo IP LLC, Wayne, PA (US)

( * ) Notice: Subject to any disclaimer, the term of this patent is extended or adjusted under 35 U.S.C. 154(b) by 0 days.

(21) Appl. No.: 18/205,882

(22) Filed: Jun. 5, 2023

(65) Prior Publication Data

US 2023/0319895 A1  Oct. 5, 2023

Related U.S. Application Data

(63) Continuation of application No. 17/183,615, filed on Feb. 24, 2021, now Pat. No. 11,672,018, which is a (Continued)

(30) Foreign Application Priority Data

Jun. 25, 2009  (KR) .......................... 10-2009-0057128

(51) Int. Cl.
*H04W 74/0833*  (2024.01)
*H04W 72/20*  (2023.01)
(Continued)

(52) U.S. Cl.
CPC ....... *H04W 74/0833* (2013.01); *H04W 72/20* (2023.01); *H04W 72/21* (2023.01);
(Continued)

(58) Field of Classification Search
CPC ............. H04W 74/0833; H04W 72/20; H04W 72/21; H04W 72/23; H04W 74/08;
(Continued)

(56) References Cited

U.S. PATENT DOCUMENTS

| | | | |
|---|---|---|---|
| 5,311,176 A | 5/1994 | Gurney |
| 5,553,153 A | 9/1996 | Eatwell |
| 6,161,160 A | 12/2000 | Niu et al. |
| 6,374,080 B2 | 8/2002 | Uchida |
| 6,634,020 B1 | 10/2003 | Bates et al. |

(Continued)

FOREIGN PATENT DOCUMENTS

| | | |
|---|---|---|
| CA | 2720833 | 1/2014 |
| CN | 1437416 | 8/2003 |

(Continued)

OTHER PUBLICATIONS

U.S. Appl. No. 60/599,916, filed Aug. 2004, Olfat et al.
(Continued)

*Primary Examiner* — Kibrom T Hailu
(74) *Attorney, Agent, or Firm* — Volpe Koenig

(57) ABSTRACT

A user equipment (UE) receives a timing advance medium access control (MAC) control element. The UE applies a timing advance command of the timing advance MAC control element and to start or restart a time alignment timer. The UE releases physical uplink control channel (PUCCH) resources and releases any assignment sounding reference signal (SRS) resources, when the time alignment timer expires. The UE flushes hybrid automatic request (HARQ) buffers, when the time alignment timer expires or is stopped.

28 Claims, 23 Drawing Sheets

Related U.S. Application Data continuation of application No. 16/723,514, filed on Dec. 20, 2019, now Pat. No. 10,939,473, which is a continuation of application No. 15/664,686, filed on Jul. 31, 2017, now Pat. No. 10,517,120, which is a continuation of application No. 15/294,351, filed on Oct. 14, 2016, now Pat. No. 9,775,177, which is a continuation of application No. 13/801,529, filed on Mar. 13, 2013, now Pat. No. 9,532,336, which is a continuation of application No. 12/972,366, filed on Dec. 17, 2010, now Pat. No. 8,422,410, which is a continuation of application No. 12/538,514, filed on Aug. 10, 2009, now Pat. No. 7,881,236.

(60) Provisional application No. 61/087,988, filed on Aug. 11, 2008.

(51) Int. Cl.
*H04W 72/21* (2023.01)
*H04W 72/23* (2023.01)
*H04W 74/08* (2009.01)
*H04L 101/622* (2022.01)

(52) U.S. Cl.
CPC ........... *H04W 72/23* (2023.01); *H04W 74/08* (2013.01); *H04L 2101/622* (2022.05); *H04W 74/0866* (2013.01)

(58) Field of Classification Search
CPC ......... H04W 74/0866; H04W 28/0278; H04W 36/0055; H04W 74/004; H04W 88/023; H04L 2101/622; H04L 1/18; H04B 7/005
See application file for complete search history.

(56) References Cited

U.S. PATENT DOCUMENTS

| | | | |
|---|---|---|---|
| 6,722,417 B2 | 4/2004 | Ban et al. | |
| 6,944,453 B2 | 9/2005 | Faerber et al. | |
| 7,047,009 B2 | 5/2006 | Laroia et al. | |
| 7,292,641 B2 | 11/2007 | Suh et al. | |
| 7,321,645 B2 | 1/2008 | Lee et al. | |
| 7,400,573 B2 | 7/2008 | Sundstrom et al. | |
| 7,417,970 B2 | 8/2008 | Shaheen | |
| 7,418,065 B2 | 8/2008 | Qui et al. | |
| 7,424,067 B2 | 9/2008 | Vanderperren et al. | |
| 7,426,175 B2 | 9/2008 | Zhuang et al. | |
| 7,433,418 B1 | 10/2008 | Dogan et al. | |
| 7,447,504 B2 | 11/2008 | Lohr et al. | |
| 7,496,113 B2 | 2/2009 | Cai et al. | |
| 7,508,792 B2 | 3/2009 | Petrovic et al. | |
| 7,570,618 B2 | 8/2009 | Son et al. | |
| 7,580,400 B2 | 8/2009 | Sung et al. | |
| 7,590,183 B2 | 9/2009 | Yonge, III et al. | |
| 7,593,732 B2 | 9/2009 | Kim et al. | |
| 7,599,327 B2 | 10/2009 | Zhuang | |
| 7,613,104 B2 | 11/2009 | Bhatt et al. | |
| 7,623,439 B2 | 11/2009 | Webster et al. | |
| 7,660,279 B2 | 2/2010 | Brueck et al. | |
| 7,664,076 B2 | 2/2010 | Kim et al. | |
| 7,675,841 B2 | 3/2010 | Suh et al. | |
| 7,675,905 B2 | 3/2010 | Delaney et al. | |
| 7,693,517 B2 | 4/2010 | Etemad et al. | |
| 7,693,924 B2 | 4/2010 | Cho et al. | |
| 7,701,919 B2 | 4/2010 | Ah Lee | |
| 7,702,028 B2 | 4/2010 | Zhou et al. | |
| 7,706,824 B2 | 4/2010 | Schulist et al. | |
| 7,881,236 B2 | 2/2011 | Park et al. | |
| 7,961,696 B2 | 6/2011 | Ma et al. | |
| 7,995,967 B2 | 8/2011 | Li et al. | |
| 8,000,305 B2 | 8/2011 | Tan et al. | |
| 8,098,745 B2 | 1/2012 | Bertrand | |
| 8,116,195 B2 | 2/2012 | Hou et al. | |
| 8,121,045 B2 | 2/2012 | Cal et al. | |
| 8,131,295 B2 | 3/2012 | Wang et al. | |
| 8,180,058 B2 | 5/2012 | Kitazoe | |
| 8,199,730 B2 | 6/2012 | Ou et al. | |
| 8,286,047 B2 | 10/2012 | Che et al. | |
| 8,340,232 B2 | 12/2012 | Ding et al. | |
| 8,406,179 B2 | 3/2013 | Kim et al. | |
| 8,422,410 B2 | 4/2013 | Park et al. | |
| 8,448,037 B2 | 5/2013 | Bergquist et al. | |
| 8,462,611 B2 | 6/2013 | Ma et al. | |
| 8,717,907 B2 | 5/2014 | Bergquist et al. | |
| 8,798,808 B2 | 8/2014 | Gatti et al. | |
| 8,953,562 B2 | 2/2015 | Bachl et al. | |
| 8,977,258 B2 | 3/2015 | Chou | |
| 9,094,202 B2 | 7/2015 | Maheshwari et al. | |
| 9,204,468 B2 | 12/2015 | Tynderfeldt et al. | |
| 9,215,731 B2 | 12/2015 | Kitzaoe et al. | |
| 9,444,650 B2 | 9/2016 | Muharemovic et al. | |
| 9,532,336 B2 | 12/2016 | Park et al. | |
| 9,775,177 B2 | 9/2017 | Park et al. | |
| 10,517,120 B2 | 12/2019 | Park et al. | |
| 10,939,473 B2 | 3/2021 | Park et al. | |
| 2001/0004583 A1 | 6/2001 | Uchida | |
| 2002/0089957 A1 | 7/2002 | Viero | |
| 2004/0047284 A1 | 3/2004 | Eidson | |
| 2004/0066740 A1 | 4/2004 | Suh et al. | |
| 2004/0131106 A1 | 7/2004 | Kanterakis | |
| 2004/0185853 A1 | 9/2004 | Kim et al. | |
| 2005/0013381 A1 | 1/2005 | Suh et al. | |
| 2005/0041573 A1 | 2/2005 | Eom et al. | |
| 2005/0084030 A1 | 4/2005 | Zhou et al. | |
| 2005/0101328 A1 | 5/2005 | Son et al. | |
| 2005/0105460 A1 | 5/2005 | Suh et al. | |
| 2005/0117519 A1 | 6/2005 | Kwak et al. | |
| 2005/0259567 A1 | 11/2005 | Webster et al. | |
| 2006/0003767 A1 | 1/2006 | Kim et al. | |
| 2006/0018336 A1 | 1/2006 | Sutivong et al. | |
| 2006/0093052 A1 | 5/2006 | Cho et al. | |
| 2006/0126570 A1 | 6/2006 | Kim et al. | |
| 2006/0274843 A1 | 12/2006 | Koo et al. | |
| 2007/0042784 A1 | 2/2007 | Anderson | |
| 2007/0058595 A1 | 3/2007 | Classon et al. | |
| 2007/0110172 A1 | 5/2007 | Faulkner et al. | |
| 2007/0115871 A1 | 5/2007 | Zhang et al. | |
| 2007/0253465 A1 | 11/2007 | Muharemovic et al. | |
| 2007/0270273 A1 | 11/2007 | Fukuta et al. | |
| 2007/0291696 A1 | 12/2007 | Zhang et al. | |
| 2007/0291708 A1 | 12/2007 | Rao | |
| 2008/0059658 A1 | 3/2008 | Williams | |
| 2008/0095094 A1 | 4/2008 | Innami | |
| 2008/0165733 A1 | 7/2008 | Xiao et al. | |
| 2008/0186911 A1 | 8/2008 | Bachl et al. | |
| 2008/0192674 A1 | 8/2008 | Wang et al. | |
| 2008/0194243 A1 | 8/2008 | Jeong et al. | |
| 2008/0198800 A1 | 8/2008 | Zhang et al. | |
| 2008/0267105 A1* | 10/2008 | Wang | H04W 56/005 370/311 |
| 2008/0291880 A1 | 11/2008 | Nakada | |
| 2008/0305822 A1 | 12/2008 | Li et al. | |
| 2008/0318567 A1 | 12/2008 | Popovic et al. | |
| 2009/0042576 A1* | 2/2009 | Mukherjee | H04W 76/12 455/552.1 |
| 2009/0052388 A1 | 2/2009 | Kim et al. | |
| 2009/0163211 A1 | 6/2009 | Kitazoe et al. | |
| 2009/0268693 A1 | 10/2009 | Lindh et al. | |
| 2010/0034162 A1 | 2/2010 | Ou et al. | |
| 2010/0037113 A1 | 2/2010 | Maheshwari et al. | |
| 2010/0113057 A1 | 5/2010 | Englund et al. | |
| 2010/0157916 A1 | 6/2010 | Kim et al. | |
| 2010/0254356 A1 | 10/2010 | Tynderfeldt et al. | |
| 2011/0110240 A1 | 5/2011 | Bergquist et al. | |
| 2011/0176513 A1 | 7/2011 | Yi et al. | |

FOREIGN PATENT DOCUMENTS

| | | |
|---|---|---|
| CN | 1183789 | 1/2005 |
| CN | 1596020 | 3/2005 |
| CN | 101184333 | 5/2008 |
| CN | 100415028 | 8/2008 |

(56) References Cited

FOREIGN PATENT DOCUMENTS

| | | |
|---|---|---|
| CN | 100592648 | 2/2010 |
| DE | 50103757 | 10/2004 |
| DE | 60310433 | 11/2007 |
| DE | 60220727 | 3/2008 |
| DE | 60336813 | 6/2011 |
| DE | 602005018040 | 1/2020 |
| DK | 2208291 | 1/2017 |
| EP | 1188344 | 1/2004 |
| EP | 1404079 | 3/2004 |
| EP | 1469697 | 10/2004 |
| EP | 1748593 | 12/2009 |
| EP | 1794971 | 3/2010 |
| EP | 1519519 | 4/2011 |
| EP | 1787414 | 1/2012 |
| EP | 2223456 | 9/2012 |
| EP | 3537681 | 10/2020 |
| GB | 2357009 | 6/2001 |
| GB | 2461158 | 3/2011 |
| JP | 2008-103862 | 5/2008 |
| JP | 2008-124800 | 5/2008 |
| JP | 4591973 | 12/2010 |
| KR | 10-2004-0029253 | 4/2004 |
| KR | 10-2006-0066595 | 6/2006 |
| KR | 10-0597439 | 7/2006 |
| KR | 10-062668 | 9/2006 |
| KR | 10-0626668 | 9/2006 |
| KR | 10-0651430 | 11/2006 |
| KR | 10-0657506 | 12/2006 |
| KR | 10-0665425 | 1/2007 |
| KR | 10-2007-0055004 | 5/2007 |
| KR | 10-2007-0055845 | 5/2007 |
| KR | 10-0735277 | 7/2007 |
| KR | 10-2007-0107619 | 11/2007 |
| KR | 10-2008-0004025 | 1/2008 |
| KR | 10-2008-0030941 | 4/2008 |
| KR | 10-0868679 | 11/2008 |
| KR | 10-0918764 | 9/2009 |
| KR | 10-0930894 | 12/2009 |
| KR | 10-0938095 | 1/2010 |
| KR | 10-0939722 | 2/2010 |
| KR | 10-0946913 | 3/2010 |
| KR | 10-0950646 | 4/2010 |
| KR | 10-0965694 | 6/2010 |
| KR | 10-1221890 | 1/2013 |
| KR | 10-1596188 | 2/2016 |
| MY | 149225 | 7/2013 |
| PL | 2637318 | 3/2015 |
| TW | 200805910 | 1/2008 |
| WO | 2000/79705 | 12/2000 |
| WO | 2001/41471 | 6/2001 |
| WO | 2004/030392 | 4/2004 |
| WO | 2005/043791 | 5/2005 |
| WO | 2005/055543 | 6/2005 |
| WO | 2005/088882 | 9/2005 |
| WO | 2005/117314 | 12/2005 |
| WO | 2006/015108 | 2/2006 |
| WO | 2006/023536 | 3/2006 |
| WO | 2006/123275 | 11/2006 |
| WO | 2007/082409 | 7/2007 |
| WO | 2007/126301 | 11/2007 |
| WO | 2007/138453 | 12/2007 |
| WO | 2007/149509 | 12/2007 |
| WO | 2008/023932 | 2/2008 |
| WO | 2008/041824 | 4/2008 |
| WO | 2008/115110 | 9/2008 |
| WO | 2008/157839 | 12/2008 |

OTHER PUBLICATIONS

U.S. Appl. No. 60/666,494, filed Mar. 2005, Classon et al.
U.S. Appl. No. 60/732,080, filed Oct. 2005, Lee et al.
U.S. Appl. No. 60/759,697, filed Jan. 2006, Tan et al.
U.S. Appl. No. 60/815,246, filed Jun. 2006, Zhang et al..
U.S. Appl. No. 60/815,023, filed Jun. 2006, Chandra et al.
U.S. Appl. No. 60/945,464, filed Jun. 2007, Peyton.
U.S. Appl. No. 60/955,867, filed Aug. 2007, Kitazoe et al.
U.S. Appl. No. 60/015,159, filed Dec. 2007, Kitazoe et al.
U.S. Appl. No. 61/087,307, filed Aug. 2008, Meylan et al.
U.S. Appl. No. 61/087,988, filed Aug. 2008, Yi et al.
U.S. Appl. No. 61/088,257, filed Aug. 2008, Meylan et al.
U.S. Appl. No. 61/038,988, filed Mar. 2008, Raaf et al.
3GPP TS 25.214 V5.11.0 (Jun. 2005); Release 5; Jun. 2005 (50 pages).
3GPP TS 25.302 V6.5.0 "3rd Generation Partnership Project; Technical Specification Group Radio Access Network; Services Provided by the Physical Layer (Release 6)" Sep. 2005 (75 pages).
3GPP TR 21.900 V8.2.0 (Mar. 2008) "3rd Generation Partnership Project; Technical Specification Group Services and System Aspects; Technical Specification Group Working Methods (Release 8)" Mar. 2008; 34 pages.
Holma, Harri et al. "WCDMA For UMTS: Radio Access for Third Generation Mobile Communications" 3rd Edition; Wiley; 2004; 481 pages.
IEEE "Minutes of IEEE 802.16 Session #38" IEEE 802.16 Broadband Wireless Acess Working Group; Aug. 25, 2005 (44 pages).
IEEE "Draft IEEE Standard for Local and Metropolitan Area Networks: Part 16: Air Interface for Fixed and Mobile Broadband Wireless Access Systems" IEEE P802.16e/D12, Oct. 14, 2005 (684 Pages).
Printout of http://www.3gpp.orgiftp/Specs/ archive/36_series/36.300i; Jul. 5, 2006-Jan. 11, 2016 (2 pages).
Popovic, Branislav M. "Generalized Chirp-Like Polyphase Sequences with Optimum Correlation Properties" IEEE Transactions on Information Theory, vol. 38, No. 4. Jul. 1992 (4 pages).
Nuaymi, Loutfi "Wi AX: Technology for Broadband Wireless Access" John Wiley & Sons, Ltd., 2007 (286 pages).
Natarajan, Balasubramaniam et al. "High-Performance MC-CDMA via Carrier Interferometry Codes" IEEE Transactions on Vehicular Technology, Vo, 60, No. 6, Nov. 2001; 10 pages.
LG Electronics "Corrections to the Random Access Response Reception" 3GPP TSG-RAN WG2 #62, R2-082447; Kansas City, US, May 5-9, 2008.
IEEE "IEEE 802.16e Handoff Draft" IEEE C802.16e-03/20r1; Mar. 13, 2003 (22 pages).
IEEE "IEEE 802.16 Standard for Local and Metropolitan Area Networks: Part 16: Air Interface for Fixed Broadband Wireless Access Systems" Oct. 1, 2004 (895 pages).
IEEE "Signaling Methodologies to Support Closed-Loop Transmit Processing in TDD-OFDMA" IEEE C802.16e-04/103r2; Jul. 7, 2004 (35 pages).
Joint RAN2-RAN3 #48bis LTE "EUTRAN Handover Procedure for LTE_Active" Cannes, France; TSGR3(05)1106; Oct. 11-14, 2005 (3 pages).
Krause, Joern Email re "RAN2 LTE specs" 3GPP_TSG_RAN_WG2@list.etsi.org Archives; Mar. 11, 2008 (8 pages).
Krause, Joern Email re "Set 1 (13 of 27 specs) of new RAN2 Specifications Now Available in Final Specs Folder" 3gpp_TST_RAN_WG2@LIST.ETSI.ORG Archives; Jun. 15, 2008.
3rd Generation Partnership Project (3GPP) "Enforcing New Transmission After Flushing HARQ Process" pp. 1-6, Feb. 9-13, 2009, Athens, Greece, XP050323002.
Chu, David C. "Polyphase Codes with Good Periodic Correlation Properties" Information Theory IEEE Transaction on, vol. 18, Issue 4, pp. 531-532, Jul. 1972).
ETSI TS 136 321 V8,2.0 "LTE; Evolved Universal Terrestrial Radio Access (E-UTRA); Medium Access Control (MAC) Protocol Specification (3GPP TS 36.321 Version 8,2.0 Release 8)" Nov. 2008 (35 pages).
Dahlman, Erik "3G Evolution HSPA and LTE For Mobile Broadband" Academic Press; 2007; 18 pages.
Dahlman, Erik "3G Evolution HSPA and LTE For Mobile Broadband" Academic Press; 2017; 486 pages.
ETSI TS 101 761-1 V1,3.1 "Broadband Radio Access Networks (BRAN); HIPERLAN Type 2; Data Link Control (DLC) Layer; Part 1: Basic Data Transport Functions" Dec. 2001 (88 pages).

(56) References Cited

OTHER PUBLICATIONS

ETSI TS 101 475 V1.3.1 "Broadband Radio Access Networks (BRAN); HIPERLAN Type 2; Physical (PHY) Layer" Dec. 2001 (43 pages).
3GPP The Mobile Broadband Standard HSPA: Delegates Corner Release 14: May 23-27, 2016.
3GPP Facts "The Mobile Broadband Standard LTE-Advanced Pro" available at http://www.3gpp.org/about-3gpp/3gpp-fags; 2016 (10 pages).
3GPP FAQs "The Mobile Broadband Standard Edge+" Available at http://www.3gpp.org/about3gpp/3gpo-fags (retrieved Jun. 20, 2016); 11 pages.
3GPP Meeting Registration; Meeting: 3GPPRAN1 #44-bis; Mar. 12, 2016 (6 pages).
3GPP Meeting Registration; Meeting: 3GPPRAN2 #62-bis; Mar. 12, 2016 (6 pages).
3GPP Meeting Registration; Meeting: 3GPPRANI #44; Mar. 10, 2016 (7 pages).
3GPP Meeting Registration; Meeting: RAN2 #62; Kansas City; May 5, 2008 (6 pages).
3GPP RAN 1 Meeting #44-bis "On the Performances of LTE RACH" Athens. Greece: Mar. 27-31, 2006; R1-060908; 6 pages.
3GPP Specification Detail (3GPP TS 36.300) "Evolved Universal Terrestrial Radio Access (E-UTRA) and Evolved Universal Terrestrial Radio Access Network (E-UTRAN); Overall Description; Stage 2" Printout of httplAmAiw.3gpp.org/DynaReport/36300.htrn; Mar. 21, 2016.
3GPP TR 25.813 V0.0.2 "3rd Generation Partnership Project; Technical Specification Group Radio Access Network; Evolved Universal Terrestrial Radio Access (UTRA) and Universal Terrestrial Radio Access Network (UTRAN); Radio Interface Protocol Aspects (Release 7)"; Oct. 2005 (17 pages).
3GPP TR 25.813 V0.0.2 "3rd Generation Partnership Project; Technical Specification Group Radio Access Network; Evolved Universal Terrestrial Radio Access (UTRA) and Universal Terrestrial Radio Access Network (UTRAN); Radio Interface Protocol Aspects (Release 7)"—Marked-Up; Oct. 2005 (18 pages).
3GPP TR 25.814 V0.3.1 "3rd Generation Partnership Project; Technical Specification Group Radio Access Network; Physical Layer Aspects for Evolved UTRA (Release 7)" Oct. 2005 (51 pages).
3GPP TR 25.814 V1,0.2 (Jan. 2006) "3rd Generation Partnership Project; Technical Specification Group Radio Access Network; Physical Layer Aspects for Evolved UTRA (Release 7)" Marked-Up; Jan. 2006; 79 pages.
3GPP TR 25.905 V7.0.0 (Dec. 2006) "3rd Generation Partnership Project; Technical Specification Group Radio Access Network; Improvement of the Multimedia Broadcast Multicast Service (MBMS) in UTRAN (Release 7)" Dec. 2006; 41 pages.
3GPP TR 25.912 V7.0.0 "3rd Generation Partnership Project; Technical Specification Group Radio Access Network; Feasibility Study for Evolved Universal Terrestrial Radio Access (UTRA) and Universal Terrestrial Radio Access Network (E-UTRAN) (Release 7)" Jun. 2006 (55 pages).
3GPP TS 25.201 V3.0.0 (Oct. 1999) "3rd Generation Partnership Project; Technical Specification Group Radio Access Network; Physical Layer—General Description (3G TS 25.201 Version 3.0.0)" Oct. 1999; 13 pages.
3GPP TS 25.211 V6.6.0 (Sep. 2005) "3rd Generation Partnership Project; Technical Specification Group Radio Access Network; Physical Channels and Mapping of Transport Channels onto Physical Channels (FDD) (Release 6)" Sep. 2005; 50 pages.
3GPP TS 25.211 V6.7.0 (Dec. 2005) "3rd Generation Partnership Project; Technical Specification Group Radio Access Network; Physical Channels and Mapping of Transport Channels onto Physical Channels (FDD) (Release 6)" Dec. 2005; 50 pages.
3GPP TS 25.213 V6.4.0 (Sep. 2005) "3rd Generation Partnership Project; Technical Specification Group Radio Access Network; Spreading and Modulation (FDD) (Release 6)" Sep. 2005; 32 pages.
3GPP TS 36.300 V8.3.0 (Dec. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Dec. 2007; 121 pages.
3GPP TS 36.331 V8.0.0 (Dec. 2007) "3rd Generation Partnership Project; Technical Specification Group Radio Access Network; Evolved Universal Terrestrial Radio Access (E-UTRA) Radio Resource Control (RRC); Protocol Specification (Release 8)" Dec. 2007 (56 pages).
3GPP TS 36,331 V8.5.0 (Mar. 2009) "3rd Generation Partnership Project; Technical Specification Group Radio Access Network; Evolved Universal Terrestrial Radio Access (E-UTRA) Radio Resource Control (RRC); Protocol Specification (Release 8)" Mar. 2009 (204 pages).
3GPP TS 36.101 V8.2.0 (May 2008) "3rd Generation Partnership Project; Technical Specification Group Radio Access Network; Evolved Universal Terrestrial Radio Access (E-UTRA); User Equipment (UE) Radio Transmission and Reception (Release 8)" May 2008; 66 pages.
3GPP TS 36.211 V8.0.0 (Sep. 2007) "3rd Generation Partnership Project; Technical Specification Group Radio Access Network; Evolved Universal Terrestrial Radio Access (E-UTRA); Physical Channels and Modulation (Release 8)" Sep. 2007; 50 pages.
3GPP TS 36.213 V8.3.0 (May 2008) "3rd Generation Partnership Project; Technical Specification Group Radio Access Network; Evolved Universal Terrestrial Radio Access (E-UTRA); Physical Layer Procedures (Release 8)" May 2008; 45 pages.
3GPP TS 36.300 V0.9.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2" Mar. 2007 (81 pages).
3GPP TS 36.300 V0.9.0 (Marked-Up) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2" Mar. 2007 (87 pages).
3GPP TS 36.300 V8.0.0 (Mar. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Mar. 2007; 82 pages.
3GPP TS 36.300 V8.1.0 (Jun. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Jun. 2007 (106 pages).
3GPP TS 36.300 V8.2.0 (Sep. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Sep. 2007; 109 pages.
3GPP TS 36.300 V8.4.0 (Mar. 2008) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Mar. 2008; 126 pages.
3GPP TS 36.300 V8.5.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" May 2008 (134 pages).
3GPP TS 36.300 V8.6.0 (Sep. 2008) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Sep. 2008 (137 pages).
3GPP TS 36.300 V8.7.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Dec. 2008 (144 pages).

(56) References Cited

OTHER PUBLICATIONS

3GPP TS 36.300 V8.8.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Mar. 2009 (156 pages).
3GPP TS 36.300 V8.9.0 (Jun. 2009) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Jun. 2009 (159 pages).
3GPP TS 36.321 "3GPP Specification Detail: Evolved Universal Terrestrial Radio Access (E-UTRA); Medium Acces Control (MAC) Protocol Specification" Wayback Machine—May 5, 2008; https://web.archive,orgiweb/20080505041953/http://www.3gpp.org/ftp/Specs/htmlinfoi36321.htm (retrieved Jun. 20, 2016).
3GPP TS 36.321 "3GPP The Mobile Broadband Standard Edge+: Evolved Universal Terrestrial Radio Access (E-UTRA); Medium Access Control (MAC) Protocol Specification" Available at http://www.3gpp.org/DynaReport136321.htm; retrieved Jun. 20, 2016; (3 pages).
3GPP TS 36.321 "3GPP The Mobile Broadband Standard GPRS: Evolved Universal Terrestrial Radio Access (E-UTRA); Medium Access Control (MAC) Protocol Specification" Available at http://www.3gpp.org/DynaReport/36321.htm; Mar. 17, 2016.
3GPP TS 36.321 V8.1.0, "3rd Generation Partnership Project; Technical Specification Group Access Network; Evolved Universal Terrestrial Radio Access (E-UTRA) Medium Access Control (MAC) protocol specification" (Release 8) 30 pages, Mar. 2008.
3GPP TS 36.321 V8.2.0 "3rd Generation Partnership Project; Technical Specification Group Radio Access Network; Evolved Universal Terrestrial Radio Access (E-UTRA) Medium Access Control (MAC) Protocol Specification (Release 8)" May 2008 (33 pages).
3GPP TS 36.321 V8.2.0. "3rd Generation Partnership Project; Technical Specification Group Access Network; Evolved Universal Terrestrial Radio Access (E-UTRA) Medium Access Control (MAC) protocol specification" (Release 8) pp. 1-33, May 2008.
3GPP TS 36.321 V8.3.0 "3rd Generation Partnership Project; Technical Specification Group Radio Access Network; Evolved Universal Terrestrial Radio Access (E-UTRA) Medium Access Control (MAC) Protocol Specification (Release 8)" Sep. 2008 (36 pages).
3GPP TS 36.321 V8.6.0 "3rd Generation Partnership Project; Technical Specification Group Radio Access Network; Evolved Universal Terrestrial Radio Access (E-UTRA) Medium Access Control (MAC) Protocol Specification (Release 8)" Jun. 2009 (47 pages).
3GPP TS 36.331 V8.1.0 (Mar. 2008) "3rd Generation Partnership Project; Technical Specification Group Radio Access Network; Evolved Universal Terrestrial Radio Access (E-UTRA) Radio Resource Control (RRC); Protocol Specification (Release 8)" Mar. 2008 (122 pages).
3GPP TS 36.331 V8.2.0 (May 2008) "3rd Generation Partnership Project; Technical Specification Group Radio Access Network; Evolved Universal Terrestrial Radio Access (E-UTRA) Radio Resource Control (RRC); Protocol Specification (Release 8)" May 2008 (151 pages).
3GPP TS 36.331 V8.3.0 (Sep. 2008) "3rd Generation Partnership Project; Technical Specification Group Radio Access Network; Evolved Universal Terrestrial Radio Access (E-UTRA) Radio Resource Control (RRC); Protocol Specification (Release 8)" Sep. 2008 (178 pages).
3GPP TS 36.331 V8.4.0 (Dec. 2008) "3rd Generation Partnership Project; Technical Specification Group Radio Access Network; Evolved Universal Terrestrial Radio Access (E-UTRA) Radio Resource Control (RRC); Protocol Specification (Release 8)" Dec. 2008 (198 pages).
3GPP TS 36.331 V8.6.0 (Jun. 2009) "3rd Generation Partnership Project; Technical Specification Group Radio Access Network; Evolved Universal Terrestrial Radio Access (E-UTRA) Radio Resource Control (RRC); Protocol Specification (Release 8)" Jun. 2009 (207 pages).
3GPP TSG RAN WG1 #42 on LTE "Orthogonal Pilot Channel in the Same Node B in Evolved UTRA Uplink" London, UK; R1-060851; Aug. 29-Sep. 2, 2005: (9 pages).
3GPP TSG RAN WG1 #44 "Some Consideration for LTE Rach 13.2.3.1" Denver, USA; R1060631; Feb. 13-17, 2006 (4 pages).
3GPP TSG RAN WG1 #44-bis "A New Preamble Shape for the Random-Access Preamble in E-UTRA" Athens, Greece, Mar. 27-31, 2006; R1-060867; 5 pages.
3GPP TSG RAN WG1 Ad Hoc on LTE "On Allocation of Uplink Pilot Sub-Channels in EUTRA SC-FDMA" London, UK; R1-050822; Aug. 29-Sep. 2, 2005; (7 pages).
3GPP TSG RAN WG1 Ad Hoc on LTE "On Uplink Pilot in EUTRA SC-FDMA" San Diego, USA; R1-051062; Oct. 10-14, 2005 (7 pages).
3GPP TSG RAN WG2 #52 "Mobility in LTE Active" Athens, Greece; Tdoc R2-060915; Mar. 27-31, 2006 (4 pages).
3GPP TSG RAN WG2 #57 "Uplink Synchronization" R2-070781; St. Louis, USA; Feb. 12-16, 2007 (3 pages).
3GPP TSG RAN2 Meeting #63 "Handling of Received UL Grant in RA Procedure" Jeju, South Korea; Aug. 18-22, 2008; Marked-Up; R2-084388; 4 pages.
3GPP TSG RANI #43 "RACH Design for EUTRA" Helsinki, Finland; Jan. 23-25, 2006; R1-060026; 11 pages.
3GPP TSG RANI #44 "RACH Design for EUTRA" Denver, USA; R1-060387; Feb. 13-17.2006 (11 pages).
3GPP TSG RANI #44 "RACH Design for EUTRA" Denver, USA; R1-060387; Marked-Up; Feb. 13-17, 2006 (11 pages).
3GPP TSG RANI #44-bis "Random Access Sequence Design" R1-060884; Athens, Greece, Mar. 24-26, 2006 (7 pages).
3GPP TSG WG1 Meeting #44bis "RACH Design for E-UTRA" R1-060797; Athens, Greece, Mar. 27-31, 2006 (9 pages).
3GPP TSG-RAN WG1 Meeting #44bis "Investigations on Random Access Channel Structure for E-UTRA Uplink" Athens, Greece; Mar. 27-31, 2006; R1-060992; 7 pages.
3GPP TSG-RAN WG1 Meeting #53 "UL Grant for Random Access Message 3" R1-082078; Kansas City, USA; May 5-9, 2008 (4 pages).
3GPP TSG-RAN WG2 "Access Procedure" Shanghai. China; R2-061201; May 8-12, 2006 (3 pages).
3GPP TSG-RAN WG2 #50 "Intra-System Mobility" Sophia-Antipolis, France; R2-060013; Jan. 9-13, 2006 (7 pages).
3GPP TSG-RAN WG2 #61bis "Control of HARQ for RACK message 3" R2-081764; Shenzhen, China; Mar. 31-Apr. 4, 2008 (5 pages).
3GPP TSG-RAN WG2 #62 "Update of MAC Random Access Procedure" Tdoc R2-082731; Kansas City, USA; May 5-9, 2008 (7 pages).
3GPP TSG-RAN WG2 #63 "Handling of Received UL Grant in RA Procedure" Jeju, South Korea; Aug. 18-22, 2008; R2-084387; 3 pages.
3GPP TSG-RAN WG2 #63 "NDI and Message 3" Jeju Island, Korea; Aug. 18-22, 2008; R2084156; 5 pages.
3GPP TSG-RAN WG2 #63 "PCCH Configuration in SIBI" Jeju, Korea; R2-083882; Aug. 18-22, 2008; (4 pages).
3GPP TSG-RAN WG2 Meeting #53 "Cell Switching in LTE_Active State" Shanghai, China; R2061196; May 8-12, 2006 (5 pages).
3GPP TSG-RAN WG2 Meeting #53 "Intra-LTE Handover Operation" Shanghai, Prc; R2-061135; May 8-13, 2006 (3 pages).
3GPP TSG-RAN WG2 Meeting #64bis "Clarification on RA Preambles" Athens, Greece; R2-091523; Jan. 9-13, 2009 (3 pages).
3GPP TSG-RAN WG2 Meeting #64bis "Clarification on RA Preambles" Athens, Greece; R2-091523; Marked-Up; Jan. 9-13, 2009 (3 pages).
3GPP TSG-RAN WG3 #48 his meeting "On Intra-Access Mobility for LTE_Active UEs" Cannes, France; R3-051108; Oct. 11-14, 2005 (4 pages).
3GPP TSG-RAN WG3 #53bis "Intral-LTE Mobility Procedure" Seoul, Korea; R3-061489; Oct. 10-13, 2006 (4 pages).
3GPP TSG-RAN WG3 #54 "Updates of Infra-LTE Handover in 36.300" Riga. Latvia Nov. 610, 2006; R3-061788; 6 pages.
3GPP TSG-RAN WG3 #54 "Updates of Intra-LTE Handover in 36.300" Riga, Latvia Nov. 6-10, 2006; R3-061946; 10 pages.

(56) References Cited

OTHER PUBLICATIONS

3GPP TSG-RAN Working Group 2 Meeting #52 "Infra-RAT Handover Access Procedure" Shanghai, China; May 8-12, 2006; R2-061229 (4 pages).
3GPP TSG-RAN2 Meeting #59bis "E-UTRA RRC TP Capturing Current Status on Mobility" Shanghai, P.R. China; Oct. 8-12, 2007; R2-074014 (11 pages).
3GPP TSG-RAN2 Meeting #62bis "Clarification of DL- and UL-SCH Data Transfer" Warsaw, Poland, R2-083400; Marked-Up; Jun. 30-Jul. 4, 2008 (7 pages).
3GPP TSG-RAN2 Meeting #62bis "Clarification of DL- and UL-SCH Data Transfer" Warsaw, Poland, R2-083701 (revision of R2-083400); Marked-Up; Jun. 30-Jul. 4, 2008 (8 pages).
3GPP TSG-RAN2 Meeting #62bis "NDI and Msg3" Warsaw, Poland, R2-083703; Marked-Up: Jun. 30-Jul. 4, 2008 (3 pages).
3GPP TSG-RAN2 Meeting #63 "Corrections Relating to RACK Partitioning" Jeju, Korea; R2084788: Aug. 18-22, 2008; (4 pages).
42.108 and 37 C.F.R. § 42.122(a) for *ZTE (USA) Inc., of al. v. Evolved Wireless LLC*, United States Patent and Trademark Office—Before the Patent Trial and Appeal Board, Case No. IPR 2016-00757 filed Dec. 2, 2016 (5 pages).
Abramson, Norman "The Aloha System—Another Alternative for Computer Communications" University of Hawaii; Honolulu, Hawaii; Fall Joint Computer Conference, 1970; 6 pages.
Bucknell, Paul e-mail re "[RAN2#61bis] Philips/NXP Semiconductors Contributions on LTE" 3gpp_tst_ran_wg2@list.etsi.org Archives; Mar. 25, 2008; 8 pages.
Communication Under Rule 71(3) EPC for European Patent Application No. 09166620.6, mailed Mar. 8, 2016.
Complaint re In the Matter of *Certain Lte-Compliant Cellular Communication Devices* in the United States International Trade Commission Washington, DC; Inv. No. 337-TA-1253; Filed Feb. 1, 2021 (82 pages).
Decision Granting Institution of Inter Partes Review and Scheduling Order submitted with *Samsung Electronics Co., Ltd., et al. v. Evolved Wireless LLC*, United States Patent and Trademark Office Before the Patent Trial and Appeal Board, Case No. IPR 202100943 filed Dec. 1, 2021 (38 pages).
Decision Instituting Inter Partes Review 37 C.F.R. § 42.108 for *ZTE (USA) Inc., et al. v. Evolved Wireless LLC*, United States Patent and Trademark Office—Before the Patent Trial and Appeal Board, Case No. IPR 2016-00757 filed Dec. 2, 2016 (20 pages).
Decision Instituting Inter Partes Review 37 C.F.R. 42.108 for *Apple Inc. v. Evolved Wireless LLC*, United States Patent and Trademark Office—Before the Patent Trial and Appeal Board, Case No. IPR 2016-01229 filed Dec. 27, 2016 (21 pages).
Decision Instituting Inter Partes Review and Consolidating with IPR2016-00757 37 C.F.R. § 42.108 and 37 C. F.R. 42.122(a) for *amsung Electronics Co., Ltd., et al. v. Evolved Wireless LLC*, United States Patent and Trademark Office—Before the Patent Trial and Appeal Board, Case No. IPR 2016-01345 filed Dec. 2, 2016 (5 pages).
Decision Instituting Inter Partes Review and Consolidating with IPR2016-00757 37 C.F.R. §.
Decision Instituting Inter Partes Review for *Apple Inc. v. Evolved Wireless LLC*, United States Patent and Trademark Office—Before the Patent Trial and Appeal Board, Case No. IPR 2016-01228 filed Dec. 27, 2016 (22 pages).
Decision to Grant for Korean Application No. 10-2009-0057128, mailed Jan. 11, 2010.
Defendants' Initial Invalidity Contentions; In the United States District Court for the District of Delaware; Civil Action Nos. 1:15-cv-00542-SLR-SRF; 1:15-cv-00543-SLR-SRF; 1:15-cv-00544-SLR-SRF; 1:15-cv-00545-SLR-SRF; 1:15-cv-00546-SLR-SRF; 1:15-cv-00547-SLR-SRF; filed Mar. 14, 2016 (1244 pages).
Defendants' Invalidity Contentions; In the United States District Court for the District of Delaware; Civil Action Nos. 1:15-cv-00542-SLR-SRF; 1:15-cv-00543-SLR-SRF; 1:15-cv-00544-SLR-SRF; 1:15-cv-00545-SLR-SRF; 1:15-cv-00546-SLR-SRF; 1:15-cv-00547-SLR-SRF; filed Feb. 28, 2017 (3,140 pages).

Documents filed with *Apple Inc. v. Evolved Wireless LLC*, United States Patent and Trademark Office—Before the Patent Trial and Appeal Board, Case No. IPR 2016-01228 filed Jun. 28, 2016-Jul. 11, 2016 (14 pages).
Documents filed with *Apple Inc. v. Evolved Wireless LLC*, United States Patent and Trademark Office—Before the Patent Trial and Appeal Board, Case No. IPR 2016-01228 filed Dec. 27, 2016-Jul. 14, 2017 (27 pages).
Documents filed with *Apple Inc. v. Evolved Wireless LLC*, United States Patent and Trademark Office—Before the Patent Trial and Appeal Board, Case No. IPR 2016-01228 filed Aug. 16. 2017-Oct. 26, 2017 (256 pages).
Documents filed with U.S. Court of Appeals for the Federal Circuit for *Evolved Wireless, LLC v. Apple Inc.*; Appeal Docket No. 19-2362; Includes documents filed from Dec. 4, 2019-Jan. 27, 2020; Docket Nos. 16-21; (224 pages).
Documents filed with U.S. Court of Appeals for the Federal Circuit for *Evolved Wireless, LLC v. Apple Inc.*; Appeal Docket No. 19-2362; Includes documents filed from May 4, 2020-Jun. 23, 2020; Docket Nos. 25-31; (578 pages).
Documents filed with U.S. Court of Appeals for the Federal Circuit for *Evolved Wireless, LLC v. HTC Corporation*; Appeal Docket No. 2020-1335; Includes documents filed from Jan. 8, 2020-Jan. 27, 2020; Docket Nos. 1-36; (158 pages).
Documents filed with U.S. Court of Appeals for the Federal Circuit for *Evolved Wireless, LLC v. HTC Corporation*; Appeal Docket No. 2020-1335; Includes documents filed from Jan. 27, 2020 - Jan. 31, 2020; Docket Nos. 37-40; (9 pages).
Documents filed with U.S. Court of Appeals for the Federal Circuit for *Evolved Wireless, LLC v. HTC Corporation*; Appeal Docket No. 2020-1335; Includes documents filed from Mar. 9, 2020-Sep. 16, 2020; Docket Nos. 41-73; (1125 pages).
Documents filed with U.S. Court of Appeals for the Federal Circuit for *Evolved Wireless, LLC v. HTC Corporation*; Appeal Docket No. 2020-1335; Includes documents filed from Sep. 23, 2020-Nov. 16, 2020; Docket Nos. 75 and 79-81; (6 pages).
Documents filed with U.S. Court of Appeals for the Federal Circuit for *Evolved Wireless, LLC v. HTC Corporation*; Appeal Docket No. 2020-1335; Includes publicly available documents filed from Jan. 26, 2021-Mar. 4, 2021; Docket Nos. 84-86; (19 pages).
Documents filed with U.S. Court of Appeals for the Federal Circuit for *Evolved Wireless, LLC v. Motorola Mobility, LLC*; Appeal Docket No. 2020-1337; Includes documents filed from Jan. 8, 2020-Jan. 24, 2020; Docket Nos. 1-9; (95 cages).
Documents filed with U.S. Court of Appeals for the Federal Circuit for *Evolved Wireless, LLC v. Motorola Mobility, LLC*; Appeal Docket No. 2020-1337; Includes documents filed from Jan. 26, 2021-Mar. 4, 2021; Docket Nos. 10-12; (19 pages).
Documents filed with U.S. Court of Appeals for the Federal Circuit for *Evolved Wireless, LLC v. ZTE(USA) Inc.*; Appeal Docket No. 2020-1339; Includes documents filed from Jan. 8, 2020-Jan. 23, 2020; Docket Nos. 1-9; (63 pages).
Documents filed with U.S. Court of Appeals for the Federal Circuit for *Evolved Wireless, LLC v. ZTE(USA) Inc.*; Appeal Docket No. 2020-1339; Includes documents filed from Jan. 26, 2021-Mar. 4, 2021; Docket Nos. 10-12; (19 pages).
Documents filed with U.S. Court of Appeals for the Federal Circuit for *Evolved Wireless, LLC v. Microsoft Corporation*; Appeal Docket No. 2020-1340; Includes documents filed from Jan. 8, 2020-Jan. 21, 2020; Docket Nos. 1-3; (52 pages).
Documents filed with U.S. Court of Appeals for the Federal Circuit for *Evolved Wireless, LLC v. Microsoft Corporation*; Appeal Docket No. 2020-1340; Includes documents filed from Jan. 26, 2021-Mar. 4, 2021; Docket Nos. 4-6; (19 pages).
Documents filed with U.S. Court of Appeals for the Federal Circuit for *Evolved Wireless, LLC v. Samsung Electronics Co., Ltd.*; Appeal Docket No. 2020-1363; Includes documents 'filed from Jan. 17, 2020-Jan. 21, 2020; Docket Nos. 1-3; (59 pages).
Documents filed with U.S. Court of Appeals for the Federal Circuit for *Evolved Wireless, LLC v. Samsung Electronics Co., Ltd.*; Appeal Docket No. 2020-1363; Includes documents filed from Jan. 26, 2021-Mar. 4, 2021; Docket Nos. 4-6; (19 pages).

(56) References Cited

OTHER PUBLICATIONS

Documents filed with U.S. Court of Appeals for the Federal Circuit for *Evolved Wireless, LLC* v. *ZTE (USA) Inc.*; Appeal Docket No. 18-2008; Includes documents filed on Nov. 15, 2019; Docket No. 131; (2 pages).
Documents filed with U.S. Court of Appeals for the Federal Circuit for *Evolved Wireless, LLC* v. *Samsung Electronics Co., Ltd.*; Appeal Docket No. 18-2009: Includes documents filed from May 25, 2018-Oct. 4, 2019; Docket Nos. 1-6; (110 pages).
Documents filed with U.S. Court of Appeals for the Federal Circuit for *Evolved Wireless, LLC* v. *Samsung Electronics Co., Ltd.*; Appeal Docket No. 18-2009; Includes documents filed on Nov. 25, 2019; Docket No. 7; (2 pages).
Documents filed with U.S. Court of Appeals for the Federal Circuit for *Evolved Wireless, LLC* v. *Apple Inc.*; Appeal Docket No. 18-2010; Includes documents filed from May 25, 2018 Oct. 4, 2019; Docket Nos. 1-24; (216 pages).
Documents filed with U.S. Court of Appeals for the Federal Circuit for *Evolved Wireless, LLC* v. *Apple Inc.*; Appeal Docket No. 18-2010; Includes documents filed on Nov. 25, 2019; Docket No. 25; (2 pages).
Documents filed with U.S. Court of Appeals for the Federal Circuit for *Evolved Wireless, LLC* v. *Apple Inc.*; Appeal Docket No. 18-2011; Includes documents filed from May 25, 2018 Oct. 4, 2019; Docket Nos. 1-5; (162 pages).
Documents filed with U.S. Court of Appeals for the Federal Circuit for *Evolved Wireless, LLC* v. *Apple Inc.*; Appeal Docket No. 18-2011; Includes documents filed on Nov. 25, 2019; Docket No. 6; (2 pages).
Documents filed with U.S. Cowl of Appeals for the Federal Circuit for *Evolved Wireless, LLC* v. *Apple Inc.*; Appeal Docket No. 19-2362; Includes documents filed from Sep. 5, 2019-Oct. 21, 2019; Docket Nos. 1-15; (102 pages).
Documents filed with U.S. Cowl of Appeals for the Federal Circuit for *Evolved Wireless, LLC* v. *ZTE (USA) Inc.*; Appeal Docket No. 18-2008; Includes documents filed from May 25, 2018 Oct. 4, 2019; Docket Nos. 1-130; (4386 pages).
Documents filed with U.S. District Court Proceedings for *Evolved Wireless, LLC* v. *HTC Corporation et al.*; U.S. District Court. for the District of Delaware (Wilmington); Civil Action No. 1:15-cv-00543-SLR-SRF; Includes documents filed from Jan. 5, 2018-Apr. 16, 2018; Docket Nos. 309-372; (3,169 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Apr. 23, 2018-Jun. 28, 2018; Docket Nos. 373-383; (156 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Jul. 15, 2016-Aug. 19, 2016; Docket Nos. 62-71; (310 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Aug. 23, 2016-Nov. 8, 2016; Docket Nos. 72-102; (740 pages).
Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from Nov. 9, 2016-Dec. 7, 2016; Docket Nos. 103-113; (212 pages).
Documents filed with U.S. District Court Proceedings for *Evolved Wireless, LLC* v. *Motorola Mobility, et al..*; U.S. District Court, for the District of Delaware (Wilmington); Civil Action No. I :15-cv-00544-SLR-SRF; Includes documents filed from Sep. 4, 2018-Oct. 3, 2018; Docket Nos. 363-371; (60 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Aug. 23, 2016-Nov. 8, 2016; Docket Nos. 92-126; (775 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Nov. 9, 2016-Dec. 7, 2016; Docket Nos. 127-139; (220 pages).
Documents filed with U.S. District Court Proceedings for *Evolved Wireless, LLC* v. *Samsung Electronics Co. Ltd., et al.*; U.S. District Court. for the District of Delaware (Wilmington); Civil Action No. 1:15-cv-00545-SLR-SRF; Includes documents filed from Dec. 27, 2016-Jan. 23, 2017; Docket Nos. 140-146; (17 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Jan. 24, 2017-Mar. 17, 2017; Docket Nos. 147-168; (107 pages).
Documents filed with U.S. District Court Proceedings for *Evolved Wireless, LLC* v. *Samsung Electronics Co. Ltd., et al..*: U.S. District Court, for the District of Delaware (Wilmington); Civil Action No. 1:15-cv-00545-SLR-SRF; Includes documents filed from Mar. 21, 2017-May 30, 2017; Docket Nos. 169-183; (185 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Jun. 14, 2017-Aug. 25, 2017; Docket Nos. 184-221; (281 pages).
Documents filed with U.S. District Court Proceedings for *Evolved Wireless, LLC* v. *Samsung Electronics Co. Ltd., et al..*; U.S. District Court. for the District of Delaware Wilmington); Civil Action No. 1:15-cv-00545-SLR-SRF; Includes documents filed from Aug. 31, 2017-Sep. 28, 2017; Docket Nos. 222-244; (241 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Oct. 6, 2017-Jan. 3, 2018; Docket Nos. 245-312; (3,694 pages).
Documents filed with U.S. District Court Proceedings for *Evolved Wireless, LLC* v. *Samsung Electronics Co. Ltd., et al.*: U.S. District Court, for the District of Delaware (Wilmington); Civil Action No. 1:15-cv-00545-SLR- SRF; Includes documents filed from Jan. 5, 2018-Apr. 16, 2018; Docket Nos. 313-377; (1,508 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Apr. 23, 2018-Jun. 28, 2018; Docket Nos. 378-386; (114 pages).
Documents filed with U.S. District Court Proceedings for *Evolved Wireless, LLC V. Samsung Electronics Co. Ltd., et al..*: U.S. District Court, for the District of Delaware (Wilmington); Civil Action No. 1:15-cv-00545-SLR-SRF; Includes documents filed from Jul. 24, 2018-Aug. 24, 2018; Docket Nos. 387-401; (89 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Aug. 30, 2018-Oct. 3, 2018; Docket Nos. 402-428; (389 pages).
Documents filed with U.S. District Court Proceedings for *Evolved Wireless, LLC* v. *Samsung Electronics Co. Ltd., et al..*; U.S. District Court. for the District of Delaware (Wilmington); Civil Action No. 1:15-cv-00545-SLR-SRF; Includes documents filed from Dec. 31, 2018-Mar. 28, 2019; Docket Nos. 429-474; (774 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed on May 1, 2019; Docket No. 475; (3 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF: Includes documents filed on Jun. 13, 2019; Docket No. 476; (7 pages).

(56) References Cited

OTHER PUBLICATIONS

Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Aug. 29, 2019-Oct. 11, 2019; Docket Nos. 477-480; (17 pages).
Documents filed with U.S. District Court Proceedings for *Evolved Wireless, LLC* v. *Samsung Electronics Co. Ltd., et al.*; U.S. District Court. for the District of Delaware Wilmington); Civil Action No. 1:15-cv-00545-SLR-SRF; Includes documents filed from Nov. 15, 2019-Jan. 17, 2020; Docket Nos. 481-493; (65 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed Feb. 13, 2020; Docket No. 494; (2 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed Sep. 3, 2020; Docket No. 495; (643 pages).
Documents filed with U.S. District Court Proceedings for *Evolved Wireless, LLC* v. *Samsung Electronics Co. Ltd., et al.*; U.S. District Court, for the District of Delaware (Wilmington): Civil Action No. 1:15-cv-00545-SLR-SRF; Includes documents filed from Mar. 4, 2021-Apr. 14, 2021; Docket Nos. 496-499; (29 Rages).
Documents filed with U.S. District Court Proceedings for *Evolved Wireless, LLC* v. *Samsung Electronics Co. Ltd., et al.*; In the United States District Court for the Eastern District of Texas Marshall Division; Civil Action No. 2:21-cv-00033; Includes documents filed from Feb. 1, 2021-Mar. 10, 2021; Docket Nos. 1-14; (1,227 pages).
Documents filed with U.S. District Court Proceedings for *Evolved Wireless, LLC* v. *Motorola Mobility LLC*; In the United States District Court for the Northern District of Illinois Chicago Division; Civil Action No. 1:21-cv-00567; Includes documents filed from Feb. 1, 2021-Dec. 6, 2021; Docket Nos. 1-20; (1,126 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jun. 25, 2015-May 13, 2016 Docket Nos. 1-53; (1259 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from May 17, 2016-Jul. 11, 2016— Docket Nos. 54-67; (4,028 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jul. 15, 2016-Aug. 19, 2016— Docket Nos. 68-76; (308 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Aug. 23, 2016-Nov. 8, 2016 Docket Nos. 77-108; (785 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Nov. 9, 2016-Dec. 12, 2016; Docket Nos. 109-119; (212 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Dec. 27, 2016-Jan. 17, 2017; Docket Nos. 120-122; (9 pages).
Documents filed with U.S. District Court Proceedings for *Evolved Wireless, LLC* v. *Apple Inc.*; U.S. District Court, for the District of Delaware (Wilmington); Civil Action No, 1:15-cv-00542-SLR-SRF; Includes documents filed from Jan. 25, 2017-Mar. 17, 2017; Docket Nos. 123-145; (176 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Mar. 20, 2017-May 30, 2017; Docket Nos. 146-157; (175 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jun. 14, 2017-Aug. 25, 2017; Docket Nos. 158189; (257 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Aug. 31, 2017-Oct. 5, 2017; Docket Nos. 190-219; (307 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF: Includes documents filed from Oct. 6, 2017-Jan. 3, 2018; Docket Nos. 220-308; (5,058 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jan. 5, 2018-Apr. 16, 2018; Docket Nos. 309379; (1198 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Apr. 23, 2018-Jun. 28, 2018; Docket Nos. 380392; (205 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jul. 10, 2018-Aug. 24, 2018; Docket Nos. 393408; (91 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Sep. 21, 2018-Oct. 3, 2018; Docket Nos. 409-432; (349 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Dec. 31, 2018-Mar. 28, 2019; Docket Nos. 433-510; (2342 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Apr. 2, 2019-Jun. 7, 2019; Docket Nos. 511-537; (233 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jun. 13, 2019-Aug. 9, 2019; Docket Nos. 538545; (105 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Aug. 30, 2019-Sep. 5, 2019; Docket Nos. 546-548; (6 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Nov. 15, 2019 -Dec. 17. 2019; Docket Nos. 549-552; (31 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed on Jun. 23, 2020; Docket No. 553; (2 pages).

(56) References Cited

OTHER PUBLICATIONS

Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents on Jul. 20, 2021; Docket No. 554-557; (4 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jun. 25, 2015-May 13, 2016 Docket Nos. 1-54; (1369 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from May 17, 2016-Jul. 11, 2016 Docket Nos. 55-69; (4,029 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jul. 15, 2016-Aug. 19, 2016 Docket Nos. 70-81; (336.

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Aug. 23, 2016-Nov. 8, 2016; Docket Nos. 82-114; (702 pages).

Documents filed with U.S. District Court Proceedings for *Evolved Wireless, LLC* v. *HTC Corporation et al.*; U.S. District Court. for the District of Delaware (Wilmington); Civil Action No. 1:15-cv-00543-SLR-SRF; Includes documents filed from Nov. 9, 2016-Dec. 7, 2016; Docket Nos. 115-125; (212 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Dec. 27, 2016-Jan. 17, 2017; Docket Nos. 126-129; (11 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jan. 25, 2017-Mar. 17, 2017; Docket Nos. 130-151; (161 pages).

Documents filed with U.S. District Court Proceedings for *Evolved Wireless, LLC* v. *HTC Corporation et al.*; U.S. District Court. for the District of Delaware (Wilmington); Civil Action No. 1:15-cv-00543-SLR-SRF; Includes documents filed from Mar. 22, 2017-May 30, 2017; Docket Nos. 152-163; (172 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jun. 5, 2017-Aug. 29, 2017; Docket Nos. 164-202; (281 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Aug. 31, 2017-Oct. 5, 2017; Docket Nos. 203-232; (352 pages).

Documents filed with U.S. District Court Proceedings for *Evolved Wireless, LLC* v. *HTC Corporation et al.*; U.S. District Court, for the District of Delaware (Wilmington); Civil Action No. 1-15-cv-00543-SLR-SRF; Includes documents filed from Oct. 16, 2017-Jan. 3, 2018; Docket Nos. 233-308i (3,907yages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Sep. 4, 2018-Oct. 3, 2018; Docket Nos. 403-408; (60 pages).

Documents filed with U.S. District Court Proceedings for *Evolved Wireless, LLC* v. *HTC Corporation et al.*; U.S. District Court. for the District of Delaware (Wilmington); Civil Action No. 1:15-cv-00543-SLR-SRF; Includes documents filed from Dec. 31, 2018-Mar. 28, 2019; Docket Nos. 409-428; (154 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed on May 1, 2019; Docket No. 429; (3 pages).

Documents filed with U.S. District Court Proceedings for *Evolved Wireless, LLC* v. *HTC Corporation et al.*; U.S. District Court. for the District of Delaware (Wilmington); Civil Action No. 1:15-cv-00543-SLR-SRF; Includes documents filed from Jun. 13, 2019-Aug. 14, 2019; Docket Nos. 430431; (10 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Aug. 29, 2019-Oct. 11, 2019; Docket Nos. 432-435; (17 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents on Sep. 3, 2020; Docket No. 449; (643 pages).

Documents filed with U.S. District Court Proceedings for *Evolved Wireless, LLC* v. *HTC Corporation et al.*; U.S. District Court. for the District of Delaware (Wilmington); Civil Action No. 1:15-cv-00543-SLR-SRF; Includes documents filed from Mar. 4, 2021-Apr. 15, 2021; Docket Nos. 450-453; (25 pages).

Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Jun. 25, 2015-May 13, 2016 Docket Nos. 1-48; (993 pages).

Documents filed with U.S. District Court Proceedings for*Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from Dec. 27, 2016-Jan. 23, 2017; Docket Nos. 114-117; (11 pages).

Documents filed with U.S. District Court Proceedings for*Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Jan. 25, 2017-Mar. 17, 2017; Docket Nos. 118-135; (103 pages).

Documents filed with U.S. District Court Proceedings for*Evolved Wireless, LLC* v. *Lenovo Group Ltd., et al..*; U.S. District Court, for the District of Delaware (Wilmington); Civil Action No. 1-15-cv-00544-SLR-SRF; Includes documents filed from Jun. 14, 2017-Aug. 25, 2017; pocket Nos. 148-179; (264 pages).

Documents filed with U.S. District Court Proceedings for*Evolved Wireless, LLC* v. *Lenovo Group Ltd., et al..*; U.S. District Court, for the District of Delaware (Wilmington); Civil Action No. 1:15-cv-00544-SLR-SRF: Includes documents filed from Aug. 31, 2017-Oct. 3, 2017; Docket Nos. 180-207; (255 pages).

Documents filed with U.S. District Court Proceedings for*Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Oct. 6, 2017-Jan. 3, 2018; Docket Nos. 208-273; (3,364yages).

Documents filed with U.S. District Court Proceedings for*Evolved Wireless, LLC* v. *Lenovo Group Ltd., et al..*; U.S. District Court, for the District of Delaware (Wilmington); Civil Action No. 1:15-cv-00544-SLR-SRF, Includes documents filed from Apr. 23, 2018-Jun. 28, 2018; Docket Nos. 338-346; (114 pages).

Documents filed with U.S. District Court Proceedings for *Evolved Wireless, LLC* v. *Motorola Mobility, et al..*; U.S. District Court, for the District of Delaware (Wilmington); Civil Action No. 1:15-cv-00544-SLR-SRF; Includes documents filed from Jul. 24, 2018-Aug. 24, 2018; Docket Nos. 347-365; (139 pages).

Documents filed with U.S. District Court Proceedings for *Evolved Wireless, LLC* v. *Motorola Mobility, et al.*; U.S. District Court, for the District of Delaware (Wilmington); Civil Action No. 1:15-cv-00544-SLR-SRF: Includes documents filed from Dec. 31, 2018 Mar. 28, 2019; Docket Nos. 372-391; (140 pages).

(56) References Cited

OTHER PUBLICATIONS

Documents filed with U.S. District Court Proceedings for *Evolved Wireless, LLC* v. *Motorola Mobility, et al.*; U.S. District Court, for the District of Delaware (Wilmington); Civil Action No. 1:15-cv-00544-SLR-SRF; Includes documents filed on May 1, 2019; Docket No. 392; (3 pages).
Documents filed with U.S. District Court Proceedings for *Evolved Wireless, LLC* v. *Motorola Mobility, et al.*; U.S. District Court, for the District of Delaware (Wilmington); Civil Action No. 1:15-cv-00544-SLR-SRF; Includes documents filed on Jun. 13, 2019; Docket No. 393; (7 pages).
Documents filed with U.S. District Court Proceedings for *Evolved Wireless, LLC* v. *Motorola Mobility, et al.*; U.S. District Court, for the District of Delaware (Wilmington); Civil Action No. 1:15-cv-00544-SLR-SRF; Includes documents filed from Aug. 29, 2019 Oct. 11, 2019; Docket Nos. 394-397; (17 pages).
Documents filed with U.S. District Court Proceedings for *Evolved Wireless, LLC* v. *Motorola Mobility, et al.*; U.S. District Court, for the District of Delaware (Wilmington); Civil Action No. 1:15-cv-00544-SLR-SRF: Includes documents filed from Nov. 15, 2019 Jan. 13, 2020; Docket Nos. 398-414; (70 pages).
Documents filed with U.S. District Court Proceedings for *Evolved Wireless, LLC* v. *Motorola Mobility, et al.*; U.S. District Court, for the District of Delaware (Wilmington); Civil Action No. 1:15-cv-00544-SLR-SRF; Includes documents on Sep. 3, 2020; Docket No. 415; (643 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Jun. 25, 2015-May 17, 2016 Docket Nos. 1-56; (1202 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from May 26, 2016-Jul. 11, 2016 Docket Nos. 57-77; (4.713 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Jul. 15, 2016-Aug. 19, 2016; Docket Nos. 78-91; (354 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jun. 5, 2017-Aug. 25, 2017; Docket Nos. 166-192; (155 pages).
Documents filed with U.S. District Court Proceedings for *Evolved Wireless, LLC* v. *Microsoft Corporation, et al.*; U.S. District Court, for the District of Delaware (Wilmington): Civil Action No. 1:15-cv-00547-SLR-SRF; Includes documents filed from Aug. 31, 2017-Sep. 28, 2017; Docket Nos. 193-218; (232 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jan. 5, 2018-Apr. 16, 2018; Docket Nos. 290-358; (1,476 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Apr. 23, 2018-Jun. 28, 2018; Docket Nos. 359-364; (58 pages).
Documents filed with U.S. District Court Proceedings for *Evolved Wireless, LLC* v. *Microsoft Corporation, et al.*; U.S. District Court, for the District of Delaware Wilmington); Civil Action No. 1:15-cv-00547-SLR-SRF; Includes documents filed from Aug. 28, 2018-Oct. 3, 2018; Docket Nos. 386-393; (61 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Dec. 31, 2018-Mar. 28, 2019; Docket Nos. 394-412; (134 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed on May 1, 2019; Docket No. 413; (2 pages).
Documents filed with U.S. District Court Proceedings for *Evolved Wireless, LLC* v. *Microsoft Corporation, et al.*; U.S. District Court, for. the District of Delaware (Wilmington); Civil Action No. 1:15-cv-00547-SLR-SRF; Includes documents filed on Jun. 13, 2019; Docket No. 414; (7 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed Sep. 3, 2020; Docket No. 412; (643 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Mar. 4, 2021-Mar. 24, 2021; Docket Nos. 413-415; (21 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jun. 25, 2015-May 17, 2016 Docket Nos. 1-57; (1273 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from May 18, 2016-Jul. 11, 2016—Docket Nos. 58-69; (3,996 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF: Includes documents filed from July 15, 2016-Aug. 19, 2016—Docket Nos. 70-78; (305 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Aug. 24, 2016-Nov. 8, 2016—Docket Nos. 79-113; (796 pages).
Documents filed with U.S. District Court Proceedings for *Evolved Wireless, LLC* v. *Microsoft Corporation, et al.*; U.S. District Court, for the District of Delaware Wilmington); Civil Action No. 1:15-cv-00547-SLR-SRF; Includes documents filed from Nov. 9, 2016-Dec. 14, 2016—Docket Nos. 114-129; (129 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Dec. 19, 2016-Jan. 17, 2017; Docket Nos. 130-133; (11 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jan. 25, 2017-Mar. 17, 2017; Docket Nos. 134-151; (98 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Mar. 21, 2017-May 30, 2017; Docket Nos. 151-165; (176 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Aug. 29, 2019-Oct. 11, 2019; Docket Nos. 415-418; (17 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Nov. 15, 2019-Jan. 8, 2020; Docket Nos. 419-431; (62 pages).

(56) References Cited

OTHER PUBLICATIONS

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed Sep. 3, 2020; Docket Nos. 432-433; (1286 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Mar. 4, 2021-Apr. 2, 2021; Docket Nos. 434-437; (26 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Oct. 6, 2017-Jan. 3, 2018; Docket Nos. 219-276; (3,378 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF: Includes documents filed from Jan. 5, 2018-Apr. 16, 2018; Docket Nos. 277-339; (1,196 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jul. 24, 2018-Aug. 24, 2018; Docket Nos. 349-369; (141 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Sep. 4, 2018-Oct. 3, 2018; Docket Nos. 370-375; (60 pages).

Documents filed with U.S. District Court Proceedings for *Evolved Wireless, LLC* v. *ZTE Corporation*; U.S. District Court, for the District of Delaware (Wilmington); Civil Action No. 1-15-cv-00546-SLR-SRF; Includes documents filed from Dec. 31, 2018-Mar. 28, 2019; Docket Nos. 376-394; (138 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed on May 1, 2019; Docket No. 395; (3 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed on Jun. 13, 2019; Docket No. 396; (7 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Aug. 29, 2019-Oct. 11, 2019; Docket Nos. 397-400; (17 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Nov. 15, 2019-Jan. 8, 2020; Docket Nos. 401-411; (61 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jun. 25, 2015-May 17, 2016 Docket Nos. 1-57; (1203 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jun. 1, 2016-Jul. 11, 2016 Docket Nos. 58-70; (4,001 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Aug. 23, 2016-Nov. 8, 2016; Docket Nos. 80-113; (733 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Nov. 9, 2016-Dec. 7, 2016; Docket Nos. 114-124; (212 pages).

Documents filed with U.S. District Court Proceedings for *Evolved Wireless, LLC* v. *ZTE Corporation*; U.S. District Court, for the District of Delaware (Wilmington); Civil Action No. 1-15-cv-00546-SLR-SRF; Includes documents filed from Dec. 27, 2016-Jan. 17, 2017; Docket Nos. 125-127; (9 pages).

Documents filed with U.S. District Court Proceedings for *Evolved Wireless, LLC* v. *ZTE Corporation*; U.S. District Court, for the District of Delaware (Wilmington); Civil Action No. 11 5-cv-00546-SLR-SRF; Includes documents filed from Mar. 20, 2017-May 30, 2017; Docket Nos. 154-165; (178 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jun. 14, 2017-Aug. 25, 2017; Docket Nos. 166-193; (254 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Aug. 31, 2017-Sep. 28, 2017; Docket Nos. 194-218; (244 pages).

Documents filed with U.S. District Cowl Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jul. 5, 2018-Aug. 24, 2018; Docket Nos. 365-385; (136 pages).

Documents filed with *ZTE (USA) Inc., et al.* v. *Evolved Wireless LLC*, United States Patent and Trademark Office—Before the Patent Trial and Appeal Board, Case No. IPR 2016-00757 filed Jun. 2, 2016-Oct. 6, 2016 (19 pages).

Documents filed with *ZTE (USA) Inc., et al.* v. *Evolved Wireless LLC*, United States Patent and Trademark Office—Before the Patent Trial and Appeal Board, Case No. IPR 2016-00757 filed Dec. 2, 2016-Mar. 13, 2017 (50 pages).

Documents filed with *ZTE (USA) Inc., et al.* v. *Evolved Wireless LLC*, United States Patent and Trademark Office—Before the Patent Trial and Appeal Board, Case No. IPR 2016-00757 filed Mar. 30, 2017-May 19, 2017 (19 pages).

Documents filed with *ZTE (USA) Inc., et al.* v. *Evolved Wireless LLC*, United States Patent and Trademark Office—Before the Patent Trial and Appeal Board, Case No. IPR 2016-00757 filed Oct. 3, 2017-Oct. 26, 2017 (85 pages).

Documents filed with *ZTE (USA) Inc., et al.* v. *Evolved Wireless LLC*, United States Patent and Trademark Office—Before the Patent Trial and Appeal Board, Case No. IPR 2016-00757 filed Jul. 10, 2017-Aug. 9, 2017 (81 pages).

Documents filed with *ZTE (USA) Inc., et al.* v. *Evolved Wireless LLC*, United States Patent and Trademark Office—Before the Patent Trial and Appeal Board, Case No. IPR 2016-00757 filed Dec. 29, 2017-May 24, 2018 (95 pages).

Documents flied with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Oct. 6, 2017-Jan, 3, 2018; Docket Nos. 219-289; (3,748 pages).

Documents submitted with *Apple Inc.* v. *Evolved Wireless LLC*, United States Patent and Trademark Office—Before the Patent Trial and Appeal Board, Case No. IPR 2016-01229 filed Dec. 27. 2016-Apr. 7, 2017 (22 pages).

Documents submitted with *Apple Inc.* v. *Evolved Wireless LLC*, United States Patent and Trademark Office—Before the Patent Trial and Appeal Board, Case No. IPR 2016-01229 filed Jul. 14, 2017-Oct. 26, 2017 (261 pages).

Documents submitted with *Apple Inc.* v. *Evolved Wireless LLC*, United States Patent and Trademark Office—Before the Patent Trial and Appeal Board, Case No. IPR 2016-01229 filed Dec. 29, 2017-May 24, 2018 (97 pages).

(56) References Cited

OTHER PUBLICATIONS

Documents submitted with *Apple Inc. v. Evolved Wireless LLC*, United States Patent and Trademark Office—Before the Patent Trial and Appeal Board, Case No. IPR 2016-01228 filed Dec. 29, 2017-May 24, 2018 (96 pages).
Documents submitted with *Apple Inc. v. Evolved Wireless LLC*, United States Patent and Trademark Office—Before the Patent Trial and Appeal Board, Case No. IPR 2016-01229 filed Jun. 28, 2016-Jul. 11, 2016 (14 pages).
Documents submitted with *Samsung Electronics Co., Ltd., et al. v. Evolved Wireless LLC*, United States Patent and Trademark Office—Before the Patent Trial and Appeal Board, Case No. IPR 2021-00943 filed Oct. 1, 2021-Oct. 5, 2021 (10 pages).
Documents submitted with *Samsung Electronics Co., Ltd., et al. v. Evolved Wireless LLC*, United States Patent and Trademark Office—Before the Patent Trial and Appeal Board, Case No. IPR 2016-01345 filed Dec. 2, 2016-Oct. 26, 2017 (29 pages).
Documents submitted with *Samsung Electronics Co., Ltd., et al. v. Evolved Wireless LLC*, United States Patent and Trademark Office—Before the Patent Trial and Appeal Board. Case No. IPR 2021-00943 filed Jun. 4, 2021-Jun. 7, 2021 (13 pages).
Documents submitted with *Samsung Electronics Co., Ltd., et al. v. Evolved Wireless LLC*, United States Patent and Trademark Office—Before the Patent Trial and Appeal Board. Case No. IPR 2016-01345 filed Jul. 22, 2016-Jul. 28, 2016 (13 pages).
Documents submitted with *Samsung Electronics Co., Ltd., et al. v. Evolved Wireless LLC*, United States Patent and Trademark Office—Before the Patent Trial and Appeal Board, Case No. IPR 2016-01345 filed Dec. 29, 2017-May 24, 2018 (69 pages).
Documents tiled with U.S. Court of Appeals for the Federal Circuit for *Evolved Wireless, LLC v. Apple Inc.*; Appeal Docket No. 19-2362; Includes documents filed from Feb. 12, 2020-Feb. 28, 2020; Docket Nos. 22-24; (73 pages).
Documents tiled with U.S. District Court Proceedings for *Evolved Wireless, LLC v. Lenovo Group Ltd., et al.*; U.S. District Court, for the District of Delaware (Wilmington); Civil Action No. 1:15-cv-00544-SLR-SRF; Includes documents filed from May 17, 2016-Jul. 11, 2016; Docket Nos. 49-61; (4,026 pages).
Documents tiled with U.S. District Court Proceedings for *Evolved Wireless, LLC v. HTC Corporation et al.*; U.S. District Court, for the District of Delaware (Wilmington); Civil Action No. 1:15-cv-00543-SLR-SRF; Includes documents filed from Nov. 1, 2019-Jan. 8, 2020; Docket Nos. 436-448; (63 pages).
Documents tiled with U.S. District Court Proceedings for *Evolved Wireless, LLC v. Lenovo Group Ltd., et al.*; U.S. District Court, for the District of Delaware (Wilmington): Civil Action No. 1:15-cv-00544-SLR-SRF; Includes documents filed from Mar. 20, 2017-May 30, 2017; Docket Nos. 136-147; (179 pages).
Documents tiled with U.S. District Court Proceedings for *Evolved Wireless, LLC v. Lenovo Group Ltd., et al.*; U.S. District Court, for the District of Delaware (Wilmington): Civil Action No. 1:15-cv-00544-SLR-SRF; Includes documents filed from Jan. 5, 2018-Apr. 16, 2018; Docket Nos. 274-337; (1,456 pages).
Documents tiled with U.S. District Court Proceedings for *Evolved Wireless, LLC v. Motorola Mobility, et al.*; U.S. District Court, for the District of Delaware (Wilmington); Civil Action No. 1:15-cv-00544-SLR-SRF; Includes documents filed from Mar. 4, 2021-Jul. 7, 2021; Docket Nos. 416-437; (497 pages).
Documents tiled with U.S. District Court Proceedings for *Evolved Wireless, LLC v. ZTE Corporation*; U.S. District Court, for the District of Delaware (Wilmington); Civil Action No. 1:15-cv-00546-SLR-SRF: Includes documents filed from Apr. 23, 2018-Jun. 28, 2018; Docket Nos. 340-348; (114 pages).
Documents tiled with U.S. District Court Proceedings for *Evolved Wireless, LLC v. ZTE Corporation*; U.S. District Court, for the District of Delaware (Wilmington); Civil Action No. 1:15-cv-00546-SLR-SRF; Includes documents filed from Jul. 15, 2016-Aug. 19, 2016; Docket Nos. 71-79; (308 pages).
Documents tiled with U.S. District Court Proceedings for *Evolved Wireless, LLC v. ZTE Corporation*; U.S. District Court, for the District of Delaware (Wilmington): Civil Action No. 1:15-cv-00546-SLR-SRF; Includes documents filed from Jan. 25, 2017-Mar. 17, 2017; Docket Nos. 128-153; (135 pages).
Documents Wed with U.S. District Court Proceedings for *Evolved Wireless, LLC v. HTC Corporation et al.*; U.S. District Court, for the District of Delaware (Wilmington); Civil Action No. 1:15-cv-00543-SLR-SRF; Includes documents filed from Jul. 24, 2018-Aug. 24, 2018; Docket Nos. 384-402; (139 pages).
Ericsson "Clarification of DL- and UL-SCH Data Transfer" 3GPP TSG-RAN2 Meeting #62bis; R2-083727; Warsaw, Poland; Jun. 30-Jul. 4, 2008 (7 pages).
European Search Report for European Patent Application No. 09166620.6, mailed Nov. 27, 2009.
European Search Report for European Patent Application No. 16020306.3, mailed Sep. 15, 2016.
European Search Report for European Patent Application No. 17199914.7, mailed May 7, 2018.
Examination Decision on Request for Invalidation (Including Translation) for Chinese Patent Application No. 200980120004.0, mailed Oct. 11, 2018.
Examination Report for Great Britain Patent Application No. GB0912850.5, mailed Aug. 20, 2009.
Final Written Decision for Inter Partes Review of U.S. Pat. No. 7,881,236 for *Apple Inc. v. Evolved Wireless LLC*, United States Patent and Trademark Office—Before the Patent Trial and Appeal Board, Case No. IPR 2016-01229 tiled Nov. 30, 2017 (43 pages).
Final Written Decision for Inter Partes Review of U.S. Pat. No. 7,881,236 for *Apple Inc. v. Evolved Wireless LLC*, United States Patent and Trademark Office—Before the Patent Trial and Appeal Board, Case No. IPR 2016-01228 filed Nov. 30, 2017 (42 pages).
Final Written Decision for *Samsung Electronics Co., Ltd., et al. v. Evolved Wireless LLC*, United States Patent and Trademark Office—Before the Patent Trial and Appeal Board. Case No. IPR 2016-01345 filed Nov. 30, 2017 (41 pages).
Final. Written Decision for Inter Partes Review of U.S. Pat. No. 7,881,236 for *ZTE (USA) Inc., of al. v. Evolved Wireless LLC*, United States Patent and Trademark Office—Before the Patent Trial and Appeal Board, Case No. IPR 2016-00757 filed Nov. 30, 2017 (41 pages).
First Office Action (Including Translation) for Chinese Patent Application No. 201410612502.X, mailed Jun. 27, 2017.
IEEE "IEEE Standard for Local and Metropolitan Area Networks: Part 16: Air Interface for Fixed and Mobile Broadband Wireless Access Systems; Amendment 2: Physical and Medium Access Control Layers for Combined Fixed and Mobile Operation in Licensed Bands" IEEE P802.16e¬2005; Feb. 28, 2006 (864 Pages).
Intent to Grant for European Patent Application No. 17199914.7, mailed Aug. 20, 2018.
Intention to Grant for European Patent Application No. 16020306.3, mailed Jun. 2, 2017.
International Preliminary Report on Patentability for corresponding International Application No. PCT/KR2009/004002, mailed Feb. 24, 2011.
International Search Report for corresponding International Application No. PCT/KR2009/004002, mailed Mar. 9, 2010.
Invalidation Request (including translation) for Chinese Patent Application No. 200980120004.0, mailed Jan. 30, 2018.
Notice of Allowance for Canadian Patent Application No. 2,720,833, mailed Aug. 8, 2013.
Notice of Allowance for U.S. Appl. No. 12/538,514. mailed Sep. 20, 2010.
Notice of Allowance for U.S. Appl. No. 12/972,366, mailed Dec. 14, 2012.
Notice of Allowance for U.S. Appl. No. 13/801,529 mailed Jul. 18, 2016.
Notice of Allowance for U.S. Appl. No. 15/294,351 mailed Mar. 6, 2017.
Notice of Allowance for U.S. Appl. No. 15/664,686, mailed Sep. 5, 2019.
Notice of Allowance for U.S. Appl. No. 16/723,514, mailed Dec. 11, 2020.
Notification of Grant for Great Britain Patent Application No. GB0912850.5, mailed Dec. 7, 2010.

(56) References Cited

OTHER PUBLICATIONS

Notification on the Grant of Patent Right for Invention (including translation) for Chinese Patent Application No. 200980120004.0, mailed Sep. 4, 2014.
Notification on the Grant of Patent Right for Invention (Including Translation) for Chinese Patent Application No. 201410612502.X, mailed Feb. 12, 2018.
Observation (including translation) for Chinese Patent Application No. 200980120004.0, mailed Feb. 28, 2018.
Office Action (including translation) for Chinese Patent Application No. 200980120004.0, mailed May 28, 2014.
Office Action for Canadian Patent Application No. 2,720,833, mailed Jun. 12, 2012.
Office Action for Chinese Patent Application No. 200980120004.0, mailed Mar. 5, 2013.
Office Action for Chinese Patent Application No. 200980120004.0, mailed Nov. 21, 2013.
Office Action for European Patent Application No. 09166620.6, mailed Jan. 19, 2010.
Office Action for U.S. Appl. No. 15/294,351 mailed Dec. 2, 2016.
Office Action for U.S. Appl. No. 15/664,686, mailed Jun. 11, 2019.
Office Action for U.S. Appl. No. 161723,514, mailed Sep. 2, 2020.
Official Action (Ex Parte Quayle Action) for U.S. Appl. No. 13/801,529 mailed Apr. 8, 2016.
Official Action for Great Britain Patent Application No. GB0912850. 5, mailed Jan. 8, 2010.
Official Action for Great Britain Patent Application No. GB0912850. 5, mailed Jun. 7, 2010.
Official Action for Great Britain Patent Application No. GB0912850. 5, mailed Jul. 21, 2010.
Official Action for U.S. Appl. No. 12/538,514, mailed Jun. 11, 2010.
Official Action for U.S. Appl. No. 13/801,529 mailed Feb. 3, 2015.
Official Action for U.S. Appl. No. 13/801,529 mailed Oct. 16, 2015.
Order No. 4: Regarding Procedural Schedule In the Matter of *Certain LTE-Compliant Cellular Communication Devices* in the United States International Trade Commission Washington, DC; Inv. No. 337-TA-1253; Filed Mar. 23, 2021 (3 pages).
Order No. 5: Setting Procedural Schedule In the Matter of *Certain LTE-Compliant Cellular Communication Devices* in the United States International Trade Commission Washington, DC; Inv. No. 337-TA-1253; Filed Apr. 2, 2021 (4 pages).
Patent Owner Evolved Wireless LLC's Preliminary Response Pursuant to 37 C.F.R. 42.107(a), including Exhibits 2001-2012 submitted with *Samsung Electronics Co., Ltd., et al.* v. *Evolved Wireless LLC*, United States Patent and Trademark Office—Before the Patent Trial and Appeal Board, Case No. IPR 2021-00943 filed Sep. 7, 2021 (705 pages).
Patent Owner's Preliminary Response for *Apple Inc.* v. *Evolved Wireless LLC*, United States Patent and Trademark Office—Before the Patent Trial and Appeal Board, Case No. IPR 2016-01228 filed Sep. 28, 2016 (534 pages).
Patent Owner's Preliminary Response for *Apple Inc.* v. *Evolved Wireless LLC*, United States Patent and Trademark Office—Before the Patent Trial and Appeal Board, Case No. IPR 2016-01229 filed Sep. 29, 2016 (616 pages).
Patent Owner's Preliminary Response for *Samsung Electronics Co., Ltd., et at..* v. *Evolved Wireless LLC*, United States Patent and Trademark Office—Before the Patent Trial and Appeal Board, Case No. IPR 2016-01345 filed Sep. 27, 2016, (305 pages).
Patent Owner's Preliminary Response for *ZTE (USA) Inc., et al.* v. *Evolved Wireless LLC*, United States Patent and Trademark Office—Before the Patent Trial and Appeal Board, Case No. IPR 2016-00757 filed Sep. 6, 2016 (150 pages).
Patent Owner's Response to Petitioners' Petition for Inter Partes Review of U.S. Pat. No. 7,881,236 for *Apple Inc.* v. *Evolved Wireless LLC*, United States Patent and Trademark Office—Before the Patent Trial and Appeal Board, Case No. IPR 2016-01229 filed Apr. 30, 2017 (506 pages).
Patent Owner's Response to Petitioners' Petition for Inter Partes Review of U.S. Pat. No. 7,881,236 for *ZTE (USA) Inc., et al.* v. *Evolved Wireless LLC*, United States Patent and Trademark Office—Before the Patent Trial and Appeal Board, Case No. IPR 2016-00757 filed Mar. 27, 2017 (702 pages).
Patent Owner's Response to Petitioner's Petition for inter Partes Review of U.S. Pat. No. 7,881,236 for *Apple Inc.* v. *Evolved Wireless LLC*, United States Patent and Trademark Office—Before the Patent Trial and Appeal Board, Case No. IPR 2016-01228 filed Apr. 30, 2017 (505 pages).
Petition for Inter Partes Review of U.S. Pat. No. 10,517,120, including Exhibits 1001-1049, Case No. IPR2021-00943, filed May 16, 2021 (3,690 pages).
Petition for Inter Partes Review of U.S. Pat. No. 7,881,236, including Exhibits 1001-1046, Case No. IPR2016-00757, filed May 31, 2016 (2,497 pages).
Petition for Inter Partes Review of U.S. Pat. No. 7,881,236, including Exhibits 1001-1047, Case No. IPR2016-01345, filed Jul. 1, 2016 (2,570 pages).
Petition for Inter Partes Review of U.S. Pat. No. 7,881,236, including Exhibits 1001-1021, Case No. IPR2016-01228, filed Jun. 20, 2016 (742 pages).
Petition for Inter Partes Review of U.S. Pat. No. 7,881,236, including Exhibits 1001-1021, Case No. IPR2016-01229, filed Jun. 20, 2016 (741 pages).
Petitioner's Reply to Patent Owner's Response for Inter Partes Review of U.S. Pat. No. 7,881,236 for *Apple Inc.* v. *Evolved Wireless LLC*, United States Patent and Trademark Office—Before the Patent Trial and Appeal Board, Case No. IPR 2016-01229 filed Jul. 26, 2017 (42 pages).
Petitioner's Reply to Patent Owner's Response for Inter Partes Review of U.S. Pat. No. 7,881,236 for *Apple Inc.* v. *Evolved Wireless LLC*, United States Patent and Trademark Office—Before the Patent Trial and Appeal Board, Case No. IPR 2016-01228 filed Jul. 26, 2017 (39 pages).
Petitioners' Reply to Patent Owner's Response to Petitioner's Petition for Inter Partes Review of U.S. Pat. No. 7,881,236 for *ZTE (USA) Inc., of al.* v. *Evolved Wireless LLC*, United States Patent and Trademark Office—Before the Patent Trial and Appeal Board, Case No. IPR 201600757 filed Jun. 14. 2017 (32 pages).
Printout of archived version of 3GPP Frequently Asked Questions, available at https://web.archive.orgiweb/20080611055805/ht tp://www.3gpp.org/fag/fag_2005_2.htm; Jul. 20, 2006 (11 pages).
Printout of http:/www.3gpp.org/ftp/ Specs/archive/36_series/36. 321/; Jan. 14, 2016 (2 pages).
Printout of http://www.3gpp.org/ftp/tsg_ran/WG2_RL2/TS GR2_63/Docs/; Jul. 18, 2008-Mar. 23, 2016; 18 pages.
Printout of http://www.3gpp.orgiftpitsg_ran/ WGLRL2/TSGR2_61bis/Docsi; Mar. 19-Apr. 29, 2008; (11 pages).
Printout of list of attendees at 3GPP TSG RAN WG2 Meeting 61bis; Date Unknown; (3 pages).
Printout of List of Tdocs submitted for 3GPP TSG RAN WG2 Meeting 61bis; Apr. 4, 2008: (31 pages).
Prior Art Search Report (including translation) for Korean Application No. 10-2009-0057128, mailed Oct. 27, 2009.
Record of Oral Hearing Held: Aug. 8, 2017 for Inter Partes Review of U.S. Pat. No. 7,881.236 for *ZTE (USA) Inc., et al.* v. *Evolved Wireless LLC*, United States Patent and Trademark Office—Before the Patent Trial and Appeal Board, Case No. IPR 2016-00757 filed Sep. 12. 2017 (64 pages).
Respondents' Omnibus Invalidity Contentions (Jul. 15, 2021) Including Claim Charts A-1-A7—U.S. Pat. No. 10,517,120 In the Matter of Certain LTE-Compliant Cellular Communication Devices in the United States International Trade Commission Washington. DC; Inv. No. 337-TA-1253; Filed Jul. 15, 2021 (550 pages) (7836-5 Family).
*Samsung Electronics Co., Ltd et al.* v/ *Equo IP LLC*, Judgment Final Written Decision Determining All Challenged Claims Unpatentable, IPR-2021-00943, U.S. Pat. No. 10,517,120 (Nov. 28, 2022).
Sesia, Stefania "LTE: The UMTS Long Term Evolution: From Theory to Practice" Second Edition; Wiley; 2011 (794 pages).
Tsai, Shang Ho et al. "MAI-Free MC-CDMA Systems Based on Hadamard-Walsh Codes" IEEE Transactions on Signal Processing, vol. 54, No. 8, Aug. 2006 (14 pages).

(56) References Cited

OTHER PUBLICATIONS

TSG-RAN Meeting #41 "REL-8 CRs for LTE to TS 36.321 MAC" Kobe, Japan; RP-080690; Sep. 9-12, 2008; (3 pages).

TSG-RAN Meeting #43 "RAN2 REL-8 CRs for LTE to TS 36.30" Biarritz, France; RP-090123; Mar. 3-6, 2009 (1 page).

TSG-RAN WG1 #43 E-UTRA Random Access: Seoul, Korea; Nov. 7-11, 2005; R1-061446; 4 pages.

TSG-RAN WG1 #46 "E-UTRA Scalability of Random Access Preamble with Cyclic Prefix" Tallinn, Estonia; R1-062274; Aug. 28-Sep. 1, 2006 (8 pages).

TSG-RAN WG1 Meeting #44 "RACH Preamble Evaluation in E-UTRA Uplink" Denver, USA; R1-060700; Feb. 13-17, 2006 (5 pages).

TSG-RAN WG1 Meeting #44bis "Random Access Burst Evaluation in E-UTRA Uplink" Athens, Greece; R1-060792; Mar. 27-31, 2006 (8 pages).

TSG-RAN WG1 Meeting #45 "Random Access Design for E-UTRA Uplink" Shanghai, China; R1-061114; May 8-12, 2006 (6 pages).

TSG-RAN WG1 Meeting #45 "Random Access Design for E-UTRA Uplink" Shanghai, China; R1-061114; Marked-Up; May 8-12, 2006 (5 pages).

TSG-RAN Working Group 1 Meeting #6 "Proposal for RACH Preambles" Espoo, Finland; Jul. 13-16, 1999; 3GPP/TSGR1#6(99)893; 26 pages.

TSG-RAN Working Group 1 Meeting #63bis "Report of 3GPP TSG RAN WG2 Meeting #63" Prague, Czech Republic; Oct. 18-22, 2008; R2-085971; 156 pages.

TSG-RAN Working Group 2 Meeting # 62 "Report of 3GPP TSG RAN WG2 meeting #61bis" R2-082800: Shenzhen, China, Mar. 31-Apr. 4, 2008; (135 pages).

Van Den Brand, J.W. et al. "Streaming Consistency: A Model for Efficient MPSoC Design" IEEE Computer Society; 10th Euromicro Conference on Digital System Design Architectures, Methods and Tools; Aug. 2007.

Webster'S New World College Dictionary; Third Edition: Definition of "If"; 1997.

Written Opinion for corresponding International Application No. PCT/KR2009/004002, mailed Mar. 9, 2010.

Wu, Yik-Chung et al "Maximum-Likelihood Symbol Synchronization for IEEE 802.11a WLANs in Unknown Frequency-Selective Fading Channels" IEEE Transactions on Wireless Communications, vol. 4, No. 6, Nov. 2005 (13 pages).

\* cited by examiner

Structure of the physical channel

Random Access Procedure for E-UTRAN initial access

MOBILE STATION/ACCESS TERMINAL

ETWS scheduling information and notifications on ETWS specific SIs

TIMING ALIGNMENT PROCEDURE FOR A USER EQUIPMENT

CROSS REFERENCE TO RELATED APPLICATIONS

This application is a continuation of U.S. application Ser. No. 17/183,615, filed on Feb. 24, 2021, which is a continuation of U.S. application Ser. No. 16/723,514, filed on Dec. 20, 2019, which issued on Mar. 2, 2021 as U.S. Pat. No. 10,939,473, which is a continuation of U.S. application Ser. No. 15/664,686, filed on Jul. 31, 2017, which issued on Dec. 24, 2019 as U.S. Pat. No. 10,517,120, which is a continuation of U.S. application Ser. No. 15/294,351, filed on Oct. 14, 2016, which issued on Sep. 26, 2017 as U.S. Pat. No. 9,775,177, which is a continuation of U.S. Ser. No. 13/801,529, filed on Mar. 13, 2020, which issued on Dec. 27, 2016 as U.S. Pat. No. 9,532,336, which is a continuation of U.S. application Ser. No. 12/972,366, filed on Dec. 17, 2010, which issued on Apr. 16, 2013 as U.S. Pat. No. 8,422,410, which is a continuation of U.S. application Ser. No. 12/538,514 filed on Aug. 10, 2009, which issued on Feb. 1, 2011 as U.S. Pat. No. 7,881,236, which claims the benefit of U.S. Provisional Application No. 61/087,988, filed on Aug. 11, 2008, and which claims the benefit of Korean Patent Application No. 10-2009-0057128, filed on Jun. 25, 2009. The entire contents of each of these applications are hereby incorporated by reference as if fully set forth.

BACKGROUND OF THE INVENTION

Field of the Invention

The present invention relates to a mobile communication technology, and more particularly, to a method for efficiently transmitting data stored in a message 3 (Msg3) buffer and a user equipment for the same.

Discussion of the Related Art

As an example of a mobile communication system to which the present invention is applicable, a $3^{rd}$ Generation Partnership Project Long Term Evolution (3GPP LTE) communication system will be schematically described.

FIG. 1 is a schematic view showing the network architecture of an Evolved Universal Mobile Telecommunication System (E-UMTS) as an example of a mobile communication system.

The E-UMTS is evolved from the existing UMTS and has been currently standardized in the 3GPP. Generally, the E-UMTS may be called an LTE system.

An E-UMTS network may be largely divided into an Evolved UMTS Terrestrial Radio Access Network (E-UTRAN) 101 and a Core Network (CN) 102. The E-UTRAN 101 may include a User Equipment (UE) 103, a base station (hereinafter, referred to as an "eNode B" or "eNB") 104, and an Access Gateway (AG) 105 positioned at the end of the network and connected to an external network. The AG 105 may be divided into a portion for processing user traffic and a portion for processing control traffic. At this time, an AG for processing new user traffic and an AG for processing control traffic may communicate with each other using a new interface.

One or more cells may exist in one eNode B. A plurality of eNode Bs may be connected by an interface for transmitting the user traffic or control traffic. The CN 102 may include the AG 105 and a node for registering a user of the UE 103. An interface for distinguishing between the E-UTRAN 101 and the CN 102 may be used.

Layers of radio interface protocol between the UE and the network may be classified into a first layer L1, a second layer L2 and a third layer L3 based on three lower layers of an Open System Interconnection (OSI) reference model that is widely known in the field of communication systems. A physical layer belonging to the first layer provides an information transfer service using a physical channel. A Radio Resource Control (RRC) layer belonging to the third layer serves to control radio resources between the UE and the network. The UE and the network exchange an RRC message via the RRC layer. The RRC layer may be distributed and located at network nodes of the eNode B 104 and the AG 105. Alternatively, the RRC layer may be located at only the eNode B 104 or the AG 105.

FIGS. 2 and 3 show the structures of radio interface protocols between the UE and the UTRAN based on a 3GPP radio access network standard.

The radio interface protocols of FIGS. 2 and 3 are horizontally formed of a physical layer, a data link layer and a network layer. The radio interface protocols are vertically formed of a user plane for transmitting data information and a control plane for transmitting control signals. In detail, FIG. 2 shows the layers of a radio protocol control plane and FIG. 3 shows the layers of a radio protocol user plane. The protocol layers of FIGS. 2 and 3 may be divided into a first layer (L1), a second layer (L2) and a third layer (L3) based on three lower layers of an OSI reference model that is widely known in the field of communication systems.

Hereinafter, the layers of the control plane of the radio protocol of FIG. 2 and the user plane of the radio protocol of FIG. 3 will be described.

A physical (PHY) layer of the first layer provides an information transfer service to an upper layer using a physical channel. The PHY layer is connected to an upper layer, such as a Medium Access Control (MAC) layer, via a transport channel. Data is transferred between the MAC layer and the PHY layer via the transport channel. At this time, the transport channel is largely divided into a dedicated transport channel and a common transport channel, depending on whether or not a channel is shared. Data is also transferred between different PHY layers, such as a physical layer of a transmitting side and a physical layer of a receiving side, via a physical channel using radio resources.

Various layers exist in the second layer. First, the MAC layer serves to map various logical channels to various transport channels and serves to multiplex several logical channels into one transport channel. The MAC layer is connected to a Radio Link Control (RLC) layer, which is an upper layer, by the logical channel. The logical channel may be largely divided into a control channel for transmitting information about the control plane and a traffic channel for transmitting information about the user plane according to the kinds of information transmitted.

The RLC layer of the second layer serves to segment and concatenate data received from an upper layer so as to adjust data size such that a lower layer transmits data in a radio section. In addition, the RLC provides three modes, namely, a Transparent Mode (TM), an Unacknowledged Mode (UM) and an Acknowledged Mode (AM) in order to guarantee various Quality of Services (QoSs) requested by Radio Bearers (RBs). In particular, the AM RLC performs a retransmission function using an Automatic Repeat and Request (ARQ) function for reliable data transmission.

A Packet Data Convergence Protocol (PDCP) layer of the second layer performs a header compression function to reduce the size of an Internet Protocol (IP) packet header that includes unnecessary control information and has a relatively large size, for effective transmission in a radio section having a relatively small bandwidth when transmitting an IP packet such as an IPv4 packet or an IPv6 packet. Therefore, only necessary information in a header portion of data is transmitted so as to improve transmission efficiency of the radio section. In the LTE system, the PDCP layer also performs a security function, which includes ciphering for preventing data from being intercepted by a third party and integrity protection for preventing data from being handled by a third party.

A Radio Resource Control (RRC) located at a highest portion of the third layer is defined only in the control plane. The RRC layer handles logical channels, transport channels and physical channels for the configuration, re-configuration and release of RBs. Here, the RBs refer to logical paths provided by the first and second layers of the radio protocol, for data transfer between the UE and the UTRAN, and the configuration of the RBs refers to a process of defining the characteristics of the radio protocol layer and channel necessary for providing a specific service, and setting detailed parameters and operation methods. Each of the RBs is divided into a signaling RB and a data RB. The SRB is used as a path for transmitting an RRC message in the control plane (C-plane), and the DRB is used as a path for transmitting user data in the user plane (U-plane).

Downlink transport channels for transmitting data from a network to a UE may include a Broadcast Channel (BCH) for transmitting system information and a downlink Shared Channel (SCH) for transmitting user traffic or a control message. The traffic or the control message of a downlink multicast or broadcast service may be transmitted via the downlink SCH or via a separate Downlink Multicast Channel (MCH). Uplink transport channels for transmitting data from a UE to a network may include a Random Access Channel (RACH) for transmitting an initial control message and an uplink SCH for transmitting user traffic or a control message.

Downlink physical channels for transmitting information transferred via the downlink transport channels in a radio section between a network and a UE may include a Physical Broadcast Channel (PBCH) for transmitting information about a BCH, a Physical Multicast Channel (PMCH) for transmitting information about an MCH, a Physical Downlink Shared Channel (PDSCH) for transmitting information about a PCH and a downlink SCH, and a Physical Downlink Control Channel (PDCCH) (also referred to as a DL L1/L2 control channel) for transmitting control information provided by the first layer and the second layer, such as downlink (DL) or uplink (UL) scheduling grant information. Uplink physical channels for transmitting information transferred via the uplink transport channels in a radio section between a network and a UE may include a Physical Uplink Shared Channel (PUSCH) for transmitting information about an uplink SCH, a Physical Random Access Channel (PRACH) for transmitting information about an RACH, and a Physical Uplink Control Channel (PUCCH) for transmitting control information provided by the first layer and the second layer, such as a HARQ ACK or NACK, a Scheduling Request (SR), a Channel Quality Indicator (CQI) report.

Hereinafter, a random access procedure provided by an LTE system will be schematically described based on the above description.

First, a UE performs the random access procedure in the following cases.

when the UE performs initial access because there is no RRC Connection with an eNode B, when the UE initially accesses a target cell in a handover procedure, when the random access procedure is requested by a command of an eNode B, when there is uplink data transmission in a situation where uplink time synchronization is not aligned or where a specific radio resource used for requesting radio resources is not allocated, and when a recovery procedure is performed in case of radio link failure or handover failure.

In the LTE system, there are provided two procedures in selecting a random access preamble: one is a contention based random access procedure in which the UE randomly selects one preamble within a specific group for use, and another is a non-contention based random access procedure in which the UE uses a random access preamble allocated only to a specific UE by the eNode B. The non-contention based random access procedure may be used only in the handover procedure or when it is requested by the command of the base station, as described above.

A random access procedure of a UE with a specific eNode B may largely include (1) a step of, at the UE, transmitting a random access preamble to the eNode B (hereinafter, referred to as a "message 1" transmitting step if such use will not lead to confusion), (2) a step of receiving a random access response from the eNode B in correspondence with the transmitted random access preamble (hereinafter, referred to as a "message 2" receiving step if such use will not lead to confusion), (3) a step of transmitting an uplink message using the information received by the random access response message (hereinafter, referred to as a "message 3" transmitting step if such use will not lead to confusion), and (4) a step of receiving a message corresponding to the uplink message from the eNode B (hereinafter, referred to as a "message 4" receiving step if such use will not lead to confusion).

In the random access procedure, the UE stores data to be transmitted via the message 3 in a message 3 (Msg3) buffer and transmits the data stored in the msg3 buffer in correspondence with the reception of an Uplink (UL) Grant signal. The UL Grant signal indicates information about uplink radio resources which may be used when the UE transmits a signal to the eNode B, and is received on a random access response message received on a PDCCH or a PUSCH in the LTE system. According to the current LTE system standard, it is defined that, if the UL Grant signal is received in a state in which data is stored in the Msg3 buffer, the data stored in the Msg3 buffer is transmitted regardless of the reception mode of the UL Grant signal. As described above, if the data stored in the Msg3 buffer is transmitted in correspondence with the reception of all UL Grant signals, problems may occur. Accordingly, there is a need for research to solve such problems.

DESCRIPTION OF THE RELATED ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

FIG. 12 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 12, the E-UMTS network includes an evolved UMTS terrestrial radio access network (E-UTRAN), an Evolved Packet Core (EPC) and one or more user equipment. The E-UTRAN may include one or more evolved NodeB (eNodeB) 1220, and a plurality of user equipment (UE) 1210 may be located in one cell. One or more E-UTRAN mobility management entity (MME)/system architecture evolution (SAE) gateways 1230 may be positioned at the end of the network and connected to an external network.

As used herein, "downlink" refers to communication from eNodeB 1220 to UE 1210, and "uplink" refers to communication from the UE to an eNodeB. UE 1210 refers to communication equipment carried by a user and may be also be referred to as a mobile station (MS), a user terminal (UT), a subscriber station (SS) or a wireless device.

An eNodeB 1220 provides end points of a user plane and a control plane to the UE 1210. MME/SAE gateway 1230 provides an end point of a session and mobility management function for UE 1210. The eNodeB and MME/SAE gateway may be connected via an S1 interface.

The eNodeB 1220 is generally a fixed station that communicates with a UE 1210, and may also be referred to as a base station (BS) or an access point. One eNodeB 1220 may be deployed per cell. An interface for transmitting user traffic or control traffic may be used between eNodeBs 1220.

The MME provides various functions including distribution of paging messages to eNodeBs 1220, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity MME/SAE gateway 1230 will be referred to herein simply as a "gateway," but it is understood that this entity includes both an MME and an SAE gateway.

A plurality of nodes may be connected between eNodeB 1220 and gateway 1230 via the S1 interface. The eNodeBs 1220 may be connected to each other via an X2 interface and neighboring eNodeBs may have a meshed network structure that has the X2 interface.

FIG. 13 is a block diagram depicting architecture of a typical E-UTRAN and a typical EPC. As illustrated, eNodeB 1320 may perform functions of selection for gateway 1330, routing toward the gateway during a Radio Resource Control (RRC) activation, scheduling and transmitting of paging messages, scheduling and transmitting of Broadcast Channel (BCCH) information, dynamic allocation of resources to UEs 1210 in both uplink and downlink, configuration and provisioning of eNodeB measurements, radio bearer control, radio admission control (RAC), and connection mobility control in LTE_ACTIVE state. In the EPC, and as noted above, gateway 1230 may perform functions of paging origination, LTE-IDLE state management, ciphering of the user plane, System Architecture Evolution (SAE) bearer control, and ciphering and integrity protection of Non-Access Stratum (NAS) signaling.

FIGS. 14(a) and 14(b) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 14(a) and 14(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 14(a), the RLC and MAC layers (terminated in an eNodeB 1220 on the network side) may perform functions such as Scheduling, Automatic Repeat Request (ARQ), and Hybrid Automatic Repeat Request (HARQ). The PDCP layer (terminated in eNodeB 1220 on the network side) may perform the user plane functions such as header compression, integrity protection, and ciphering.

As illustrated in FIG. 14(b), the RLC and MAC layers (terminated in an eNodeB 20 on the network side) perform the same functions as for the control plane. As illustrated, the RRC layer (terminated in an eNodeB 1220 on the network side) may perform functions such as broadcasting, paging, RRC connection management, Radio Bearer (RB) control, mobility functions, and UE measurement reporting and controlling. The NAS control protocol (terminated in the MME of gateway 1230 on the network side) may perform functions such as a SAE bearer management, authentication, LTE_IDLE mobility handling, paging origination in LTE_IDLE, and security control for the signaling between the gateway and UE 1210.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRCCONNECTED.

In RRC_IDLE state, the UE 1210 may receive broadcasts of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNodeB.

In RRC_CONNECTED state, the UE 1210 has an E-UTRAN RRC connection and a context in the E-UTRAN, such that transmitting and/or receiving data to/from the network (eNodeB) becomes possible. Also, the UE 1210 can report channel quality information and feedback information to the eNodeB.

In RRC_CONNECTED state, the E-UTRAN knows the cell to which the UE 1210 belongs. Therefore, the network can transmit and/or receive data to/from UE 1210, the network can control mobility (handover) of the UE, and the network can perform cell measurements for a neighboring cell.

In RRC_IDLE mode, the UE 1210 specifies the paging DRX (Discontinuous Reception) cycle. Specifically, the UE 1210 monitors a paging signal at a specific paging occasion of every UE specific paging DRX cycle.

The paging occasion is a time interval during which a paging signal is transmitted. The UE 1210 has its own paging occasion.

A paging message is transmitted over all cells belonging to the same tracking area. If the UE 1210 moves from one tracking area to another tracking area, the UE will send a tracking area update message to the network to update its location.

A physical channel transfers signaling and data between layer L1 of a UE and eNB. As illustrated in FIG. 15, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, can be used for the L1/L2 control channel. The L1/L2 control channel carries L1/L2 control information, such as signaling.

A transport channel transfers signaling and data between the LI and MAC layers. A physical channel is mapped to a transport channel.

Downlink transport channel types include a Broadcast Channel (BCH), a Downlink Shared Channel (DL-SCH), a Paging Channel (PCH) and a Multicast Channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an Uplink Shared Channel (UL-SCH) and Random Access Channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a Multicast Control Channel (MCCH) and a Dedicated Control Channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bidirectional channel used by UEs having an RRC connection that transmits dedicated control information between a UE and the network.

Traffic channels are used for the transfer of user plane information only. The traffic channels provided by MAC include a Dedicated Traffic Channel (DTCH) and a Multicast Traffic Channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH and a DTCH that can be mapped to UL-SCH. Downlink connections between logical channels and transport channels include a BCCH that can be mapped to BCH, a PCCH that can be mapped to PCH, a DCCH that can be mapped to DL-SCH, and a DTCH that can be mapped to DL-SCH.

It is known that different cause values may be mapped on the signature sequence used to send messages between a UE and eNB and that either Channel Quality Indicator (CQI) or path loss and cause or message size are candidates for inclusion in the initial preamble. FIG. 16 illustrates different messages exchanged between a UE and eNB during initial access.

When a UE wishes to access the network and determines a message to be transmitted, the message may be linked to a purpose and a cause value may be determined. The size of the ideal message number 3 illustrated in FIG. 5 may also be determined by identifying all optional information and different alternative sizes, such as by removing optional information, or an alternative "scheduling request" message may be used.

The UE acquires necessary information for the transmission of the preamble, UL interference, Pilot Transmit power and required Signal-to-Noise Ratio (SNR) for the preamble detection at the receiver or combinations thereof. This information must allow the calculation of the initial transmit power of the preamble. It is beneficial to transmit the uplink message in the vicinity of the preamble from a frequency point of view in order to ensure that the same channel is used for the transmission of the message.

The UE should take into account the uplink interference and the uplink path loss in order to ensure that the network receives the preamble with a minimum SNR. The uplink interference can be determined only in the ENodeB and, therefore, must be broadcast by the ENodeB and received by the UE prior to the transmission of the preamble. The uplink path loss can be considered to be similar to the downlink path loss and can be estimated by the UE from the received Rx (receiver) signal strength when the transmit power of some pilot sequence of the cell is known to the UE.

The required uplink SNR for the detection of the preamble would typically depend on the NodeB configuration, such as a number of Rx antennas and receiver performance. There may be advantages to transmitting the rather static Transmit power of the pilot and the necessary uplink SNR separately form the varying uplink interference and possibly the power offset required between the preamble and the message.

The initial transmission power of the preamble can be roughly calculated according to the following formula:

$$\text{Transmit power} = \text{TransmitPilot} - \text{RxPilot} + \text{ULInterference} + \text{Offset} + \text{SNRRequired}.$$

Therefore, any combination of SNRRequired, ULInterference, TransmitPilot and Offset can be broadcast. In principle, only one value must be broadcast. This is essentially the method in current UMTS systems, although the UL interference in LTE will mainly be neighboring cell interference that is probably more constant than in UMTS.

The UE determines the initial uplink transmit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power for the preamble is not adequate. Another preamble will most likely be transmitted if no acknowledgement or a negative acknowledgement is received by the UE before the next random access attempt. The transmit power of the preamble can be increased, and/or the preamble can be transmitted on a different uplink frequency in order to increase the probability of detection. Therefore, the actual transmit power of the preamble that will be detected does not necessarily correspond to the initial transmit power of the preamble as initially calculated by the UE.

The UE must determine the possible uplink transport format. The transport format, which may include Modulation and Coding Scheme (MCS) and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the UE since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the UE according to the received preamble because the UE transmit power compared to the maximum allowed or possible UE transmit power is not known to the eNB, given that the UE will most likely consider the measured path loss in the downlink or some equivalent measure for the determination of the initial preamble transmission power.

The eNB could calculate a difference between the path loss estimated in the downlink compared and the path loss of the uplink. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the uplink in the signature.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 14(*b*) illustrates the control-plane protocol stack for the E-UMTS.

FIG. 20(*b*) illustrates a misaligned time alignment timer.

DETAILED DESCRIPTION OF THE INVENTION

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out. Hereinafter, the detailed description includes detailed matters to provide full understanding of the present invention. However, it will be apparent to those skilled in the art that the present invention can be carried out without the detailed matters. For example, the following description will be made on the assumption that a mobile communication system is a $3^{rd}$ Generation Partnership Project Long Term Evolution (3GPP LTE) system, but the present invention is applicable to other mobile communication systems excluding the 3GPP LTE system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE) and a mobile station (MS), and a base station includes a node of a network end communicating with a terminal, such as a Node-B, an eNode B, and a base station.

As described above, in the following description, a problem which may occur when data stored in a message 3 (Msg3) buffer is transmitted according to a reception mode of an Uplink (UL) Grant signal will be described in detail and a method of solving the problem will be described. Transmission and reception of a signal using a random access procedure and a Hybrid Automatic Repeat Request (HARQ) scheme will be described in detail.

Figure 1:
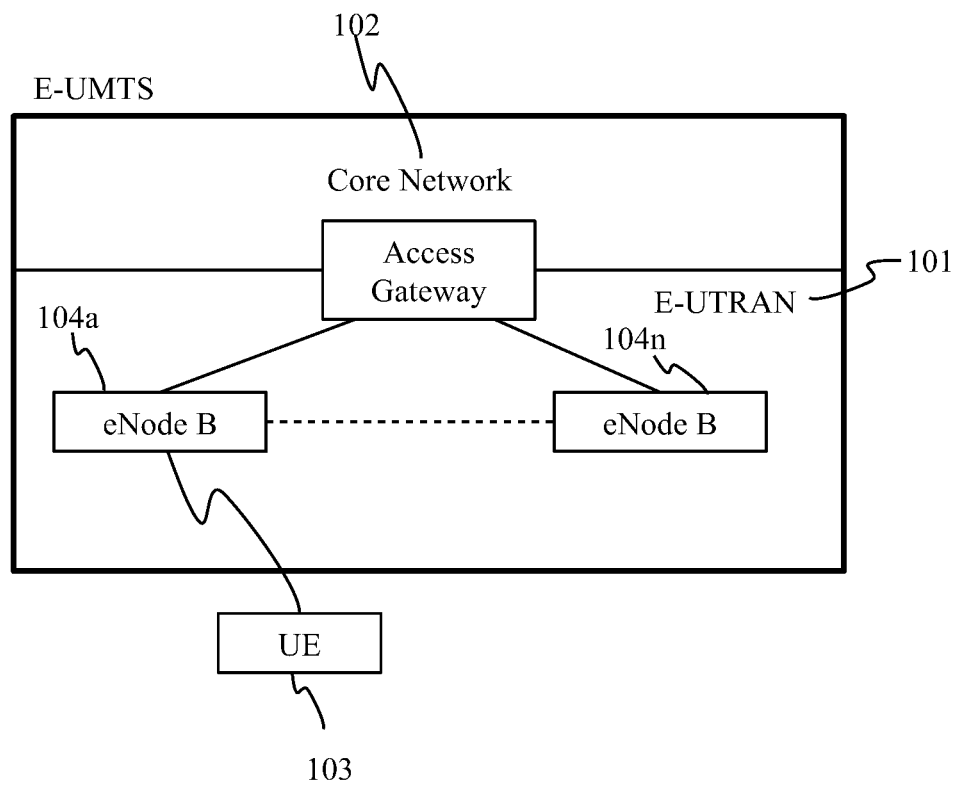
FIG. 1 is a schematic view showing the network architecture of an Evolved Universal Mobile Telecommunication System (E-UMTS) as an example of a mobile communication system.
Figure 2:
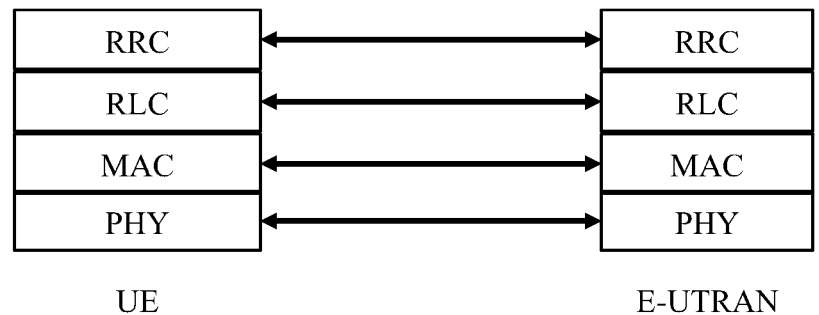
FIGS. 2 and 3 are views showing the structures of radio interface protocols between a user equipment (UE) and a UMTS Terrestrial Radio Access Network (UTRAN) based on a 3.sup.rd Generation Partnership Project (3GPP) radio access network standard.
Figure 3:
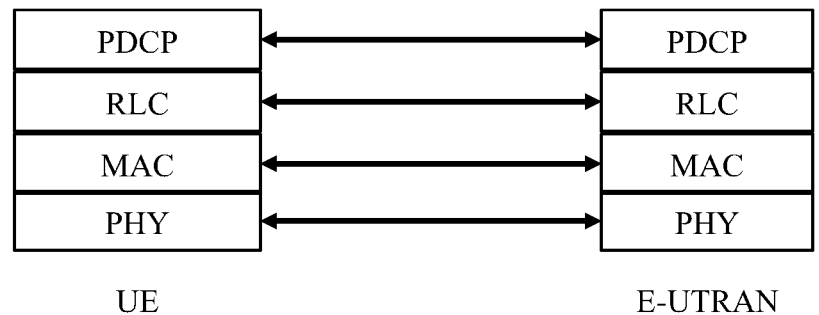
Figure 4:
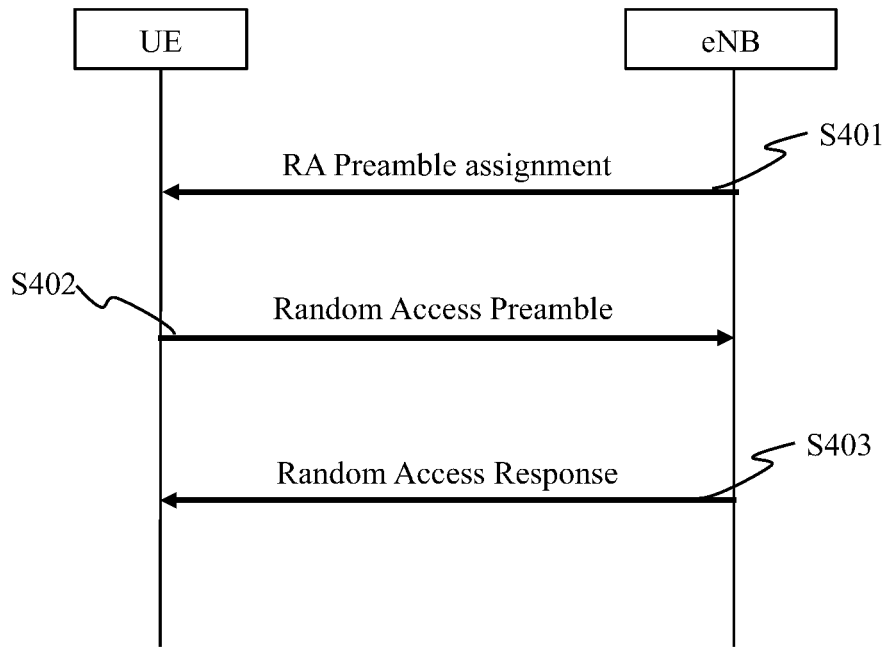
FIG. 4 is a view illustrating an operating procedure of a UE and a base station (eNode B) in a non-contention based random access procedure.

FIG. 4 is a view illustrating an operating procedure of a terminal (UE) and a base station (eNode B) in a non-contention based random access procedure.

(1) Random Access Preamble Assignment

As described above, a non-contention based random access procedure may be performed (1) in a handover procedure and (2) when the random access procedure is requested by a command of an eNode B. Even in these cases, a contention based random access procedure may be performed.

First, it is important that a specific random access preamble without the possibility of collision is received from the eNode B, for the non-contention based random access procedure. Methods of receiving the random access preamble may include a method using a handover command and a method using a Physical Downlink Control Channel (PDCCH) command. The UE receives an assigned random access preamble (S401).

(2) Message 1 Transmission

The UE transmits the preamble to the eNode B after receiving the assigned random access preamble from the eNode B as described above (S402).

(3) Message 2 Transmission

The UE attempts to receive a random access response within a random access response reception window indicated by the eNode B through a handover command or system information after transmitting the random access preamble in step S402 (S403). More specifically, the random access response information may be transmitted in the form of a Medium Access Control (MAC) Packet Data Unit (PDU), and the MAC PDU may be transferred via a Physical Downlink Shared Channel (PDSCH). In addition, the UE preferably monitors the PDCCH in order to enable to the UE to properly receive the information transferred via the PDSCH. That is, the PDCCH may preferably include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (e.g. Random Access-Radio Network Temporary Identifier (RA-RNTI)), an UL Grant indicating uplink radio resources, a temporary C-RNTI, a Time Advance Command (TAC), and the like.

As described above, the reason why the random access response includes the random access preamble identifier is because a single random access response may include random access response information of at least one UE and thus it is reported to which UE the UL Grant, the Temporary C-RNTI and the TAC are valid. In this step, it is assumed that the UE selects a random access preamble identifier matched to the random access preamble selected by the UE in step S402.

In the non-contention based random access procedure, it is determined that the random access procedure is normally performed, by receiving the random access response information, and the random access procedure may be finished.

Figure 5:
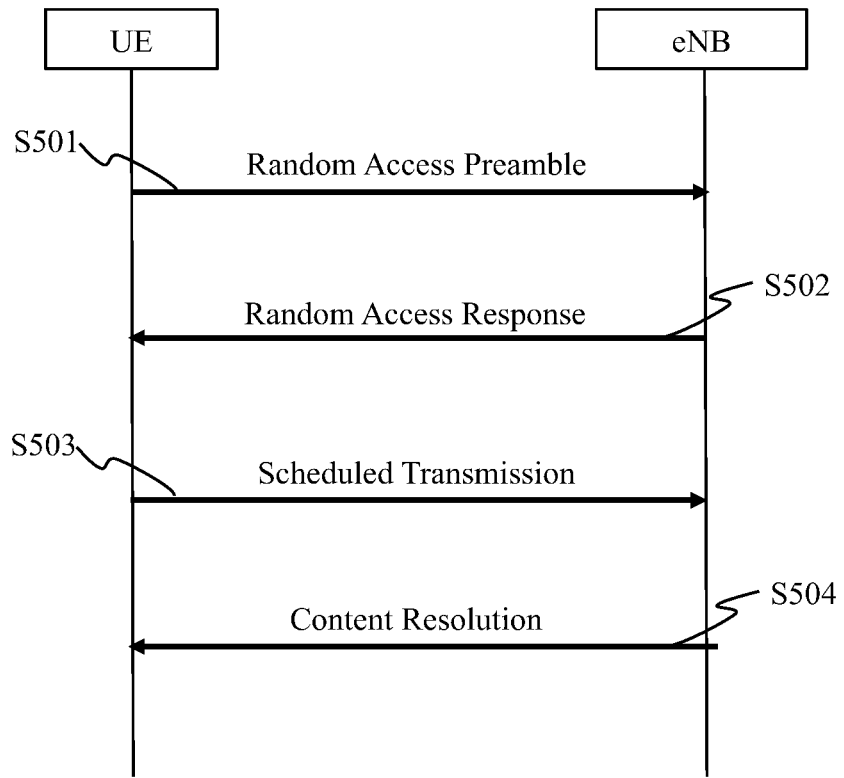
FIG. 5 is a view illustrating an operating procedure of a UE and an eNode B in a contention based random access procedure.

FIG. 5 is a view illustrating an operating procedure of a UE and an eNode B in a contention based random access procedure.

(1) Message 1 Transmission

First, the UE may randomly select a single random access preamble from a set of random access preambles indicated through system information or a handover command, and select and transmit a Physical Random Access Channel (PRACH) capable of transmitting the random access preamble (S501).

(2) Message 2 Reception

A method of receiving random access response information is similar to the above-described non-contention based random access procedure. That is, the UE attempts to receive its own random access response within a random access response reception window indicated by the eNode B through the system information or the handover command, after the random access preamble is transmitted in step S501, and receives a Physical Downlink Shared Channel (PDSCH) using random access identifier information corresponding thereto (S502). Accordingly, the UE may receive a UL Grant, a Temporary C-RNTI, a TAC and the like.

(3) Message 3 Transmission

If the UE has received the random access response valid for the UE, the UE may process all of the information included in the random access response. That is, the UE applies the TAC, and stores the temporary C-RNTI. In addition, data which will be transmitted in correspondence with the reception of the valid random access response may be stored in a Msg3 buffer. A process of storing the data in the Msg3 buffer and transmitting the data will be described later with reference to FIG. 7.

The UE uses the received UL Grant so as to transmit the data (that is, the message 3) to the eNode B (S503). The message 3 should include a UE identifier. In the contention based random access procedure, the eNode B may not determine which UEs are performing the random access procedure, but later the UEs should be identified for contention resolution.

Here, two different schemes for including the UE identifier may be provided. A first scheme is to transmit the UE's cell identifier through an uplink transmission signal corresponding to the UL Grant if the UE has already received a valid cell identifier allocated by a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a contention resolution (CR) timer.

(4) Message 4 Reception

After transmitting the data with its identifier through the UL Grant included in the random access response, the UE waits for an indication (instruction) from the eNode B for contention resolution. That is, the UE attempts to receive the PDCCH so as to receive a specific message (S504). Here, there are two schemes to receive the PDCCH. As described above, the UE attempts to receive the PDCCH using its own cell identifier if the message 3 transmitted in correspondence with the UL Grant is transmitted using the UE's cell identifier, and the UE attempts to receive the PDCCH using the temporary C-RNTI included in the random access response if the identifier is its unique identifier. Thereafter, in the former scheme, if the PDCCH is received through its own cell identifier before the contention resolution timer is expired, the UE determines that the random access procedure has been normally performed and completes the random access procedure. In the latter scheme, if the PDCCH is received through the temporary C-RNTI before the contention resolution timer has expired, the UE checks data transferred by the PDSCH indicated by the PDCCH. If the unique identifier of the UE is included in the data, the UE determines that the random access procedure has been normally performed and completes the random access procedure.

Hereinafter, the LTE system, by way of example, a uplink Hybrid Automatic Repeat Request (HARQ) scheme of a MAC layer will be described, concentrating on the transmission of uplink data.

Figure 6:
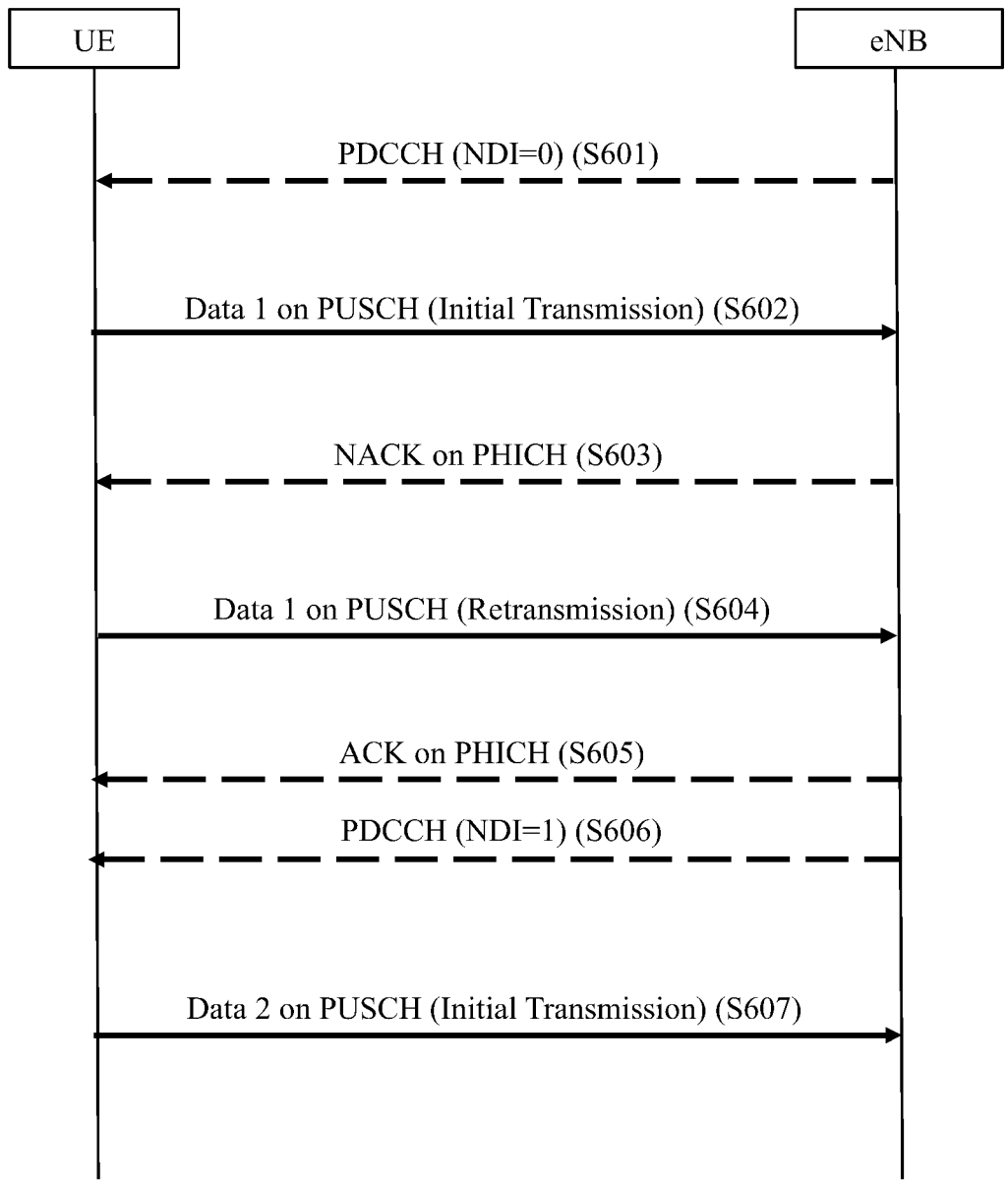
FIG. 6 is a view illustrating an uplink Hybrid Automatic Repeat Request (HARQ) scheme.

FIG. 6 is a view illustrating an HARQ scheme.

A UE may receive UL Grant information or UL scheduling information from an eNode B on a PDCCH (step S601), in order to transmit data to the eNode B by the HARQ scheme. In general, the UL scheduling information may include a UE identifier (e.g., a C-RNTI or a Semi-Persistent Scheduling C-RNTI), resource block assignment, transmission parameters (modulation, coding scheme and redundancy version), and a New Data Indicator (NDI). In the LTE system, the UE has eight HARQ processes and the HARQ processes are synchronously performed with Transmission Time Intervals (TTIs). That is, specific HARQ processes may be sequentially assigned according to points in time when data is received, in a manner of using the first HARQ process at TTI 9 and using the second HARQ process at TTI 10 after a first HARQ process is used at TTI 1, a second HARQ process is used at TTI 2, . . . , and an eighth HARQ process is used at TTI 8.

In addition, since the HARQ processes are synchronously assigned as described above, a HARQ process connected to a TTI in which a PDCCH for initial transmission of specific data is received is used for the transmission of the data. For example, if it is assumed that the UE has received a PDCCH including UL scheduling information at an $N^{th}$ TTI, the UE transmits data at an (N+4)th TTI. In other words, a Kth HARQ process assigned at the (N+4)th TTI is used for the transmission of the data. That is, the UE may transmit the data to the eNode B on a PUSCH according to the UL scheduling information after checking the UL scheduling information transmitted to the UE by monitoring the PDCCH at every TTI (step S602).

When the data has been received, the eNode B stores the data in a soft buffer and attempts to decode the data. The eNode B transmits an ACK signal if the decoding of the data succeeds and transmits an NACK signal if the decoding of the data fails. An example in which the decoding of the data fails and the eNode B transmits the NACK signal on a Physical HARQ Indicator Channel (PHICH) is shown in FIG. 6 (step S603).

When the ACK signal has been received from the eNode B, the UE determines that the transmission of the data to the eNode B succeeds and transmits next data. However, when the UE receives the NACK signal as shown in FIG. 6, the UE may determine that the transmission of the data to the eNode B has failed and retransmit the same data by the same scheme or a new scheme (step S604).

The HARQ retransmission of the UE may be performed by a non-adaptive scheme. That is, the initial transmission of specific data may be performed when the PDCCH including the UL scheduling information should be received, but the retransmission may be performed even when the PDCCH is not received. In the non-adaptive HARQ retransmission, the data is retransmitted using the same UL scheduling information as the initial transmission at a TTI at which a next HARQ process is assigned, without receiving the PDCCH.

The HARQ retransmission of the UE may be performed by an adaptive scheme. In this case, transmission parameters for retransmission are received on the PDCCH, but the UL scheduling information included in the PDCCH may be different from that of the initial transmission according to channel statuses. For example, if the channel status is better than that of the initial transmission, transmission may be performed at a high bit rate. In contrast, if the channel status is worse than that of the initial transmission, transmission may be performed at a lower bit rate than that of the initial transmission.

If the UE receives the UL scheduling information on the PDCCH, it is determined whether data which should be transmitted at this time is data which is initially transmitted or previous data which is retransmitted, by an NDI field included in the PDCCH. The NDI field is toggled in the order of 0, 1, 0, 1, . . . whenever new data is transmitted as described above, and the NDI field of the retransmission has the same value as that of the initial transmission. Accordingly, the UE may compare the NDI field with the previously transmitted value so as to determine whether or not the data is retransmitted.

The UE counts the number of times of transmission (CURRENT_TX_NB) whenever data is transmitted by the HARQ scheme, and deletes the data stored in the HARQ buffer when CURRENT_TX_NB has reached a maximum transmission number set in an RRC layer.

When the retransmitted data is received, the eNode B attempts to combine the received data and the data stored in the soft buffer due to the failure of the decoding by various schemes and decodes the combined data. The eNode B transmits an ACK signal to the UE if the decoding succeeds and transmits an NACK signal to the UE if the decoding fails. The eNode B repeats a process of transmitting the NACK signal and receiving the retransmitted data until the decoding of the data succeeds. In the example of FIG. 6, the eNode B attempts to combine the data retransmitted in step S604 and the data which is previously received and stored and decodes the combined data. The eNode B transmits the ACK signal to the UE on the PHICH if the decoding of the received data succeeds (step S605). The UE may transmit the UL scheduling information for the transmission of next data to the UE on the PDCCH, and may transmit the NDI toggled to 1 in order to report that the UL scheduling information is not used for the adaptive retransmission, but is used for the transmission of new data (step S606). The UE may transmit new data to the eNode B on the PUSCH corresponding to the received UL scheduling information (step S607).

The random access procedure may be triggered in the above-described cases as described above. Hereinafter, the case where the UE requests UL radio resources will be described.

Figure 7:
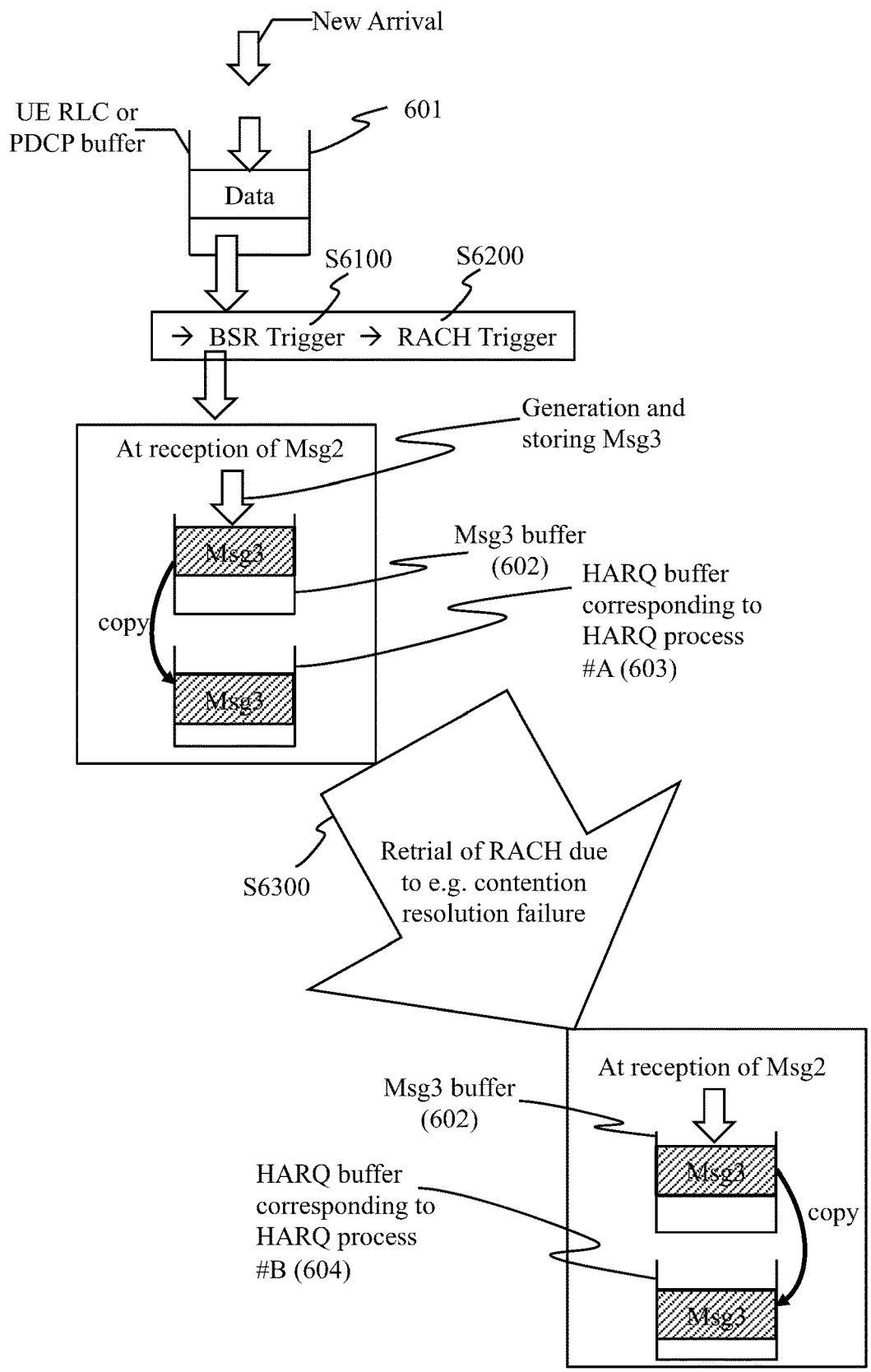
FIG. 7 is a view illustrating a method of transmitting a message 3 in a random access procedure when uplink radio resources are requested.

FIG. 7 is a view illustrating a method of transmitting a message 3 in a random access procedure when UL radio resources are requested.

When new data is generated in a transfer buffer 601 of the UE, for example, an RLC buffer and a PDCP buffer, the UE should generally inform the eNode B of information about the generation of the data. More accurately, when data having priority higher than that of data stored in the transfer buffer of the UE is generated, the UE informs the eNode B that the data is generated.

This indicates that the UE requests radio resources to the eNode B in order to transmit the generated data. The eNode B may assign proper radio resources to the UE according to the above information. The information about the generation of the data is called a buffer status report (hereinafter, referred to as "BSR"). Hereinafter, as described above, the request for the transmission of the BSR is represented by triggering of the BSR transmission (S6100). If the BSR transmission is triggered, the UE should transmit the BSR to the eNode B. However, if the radio resources for transmitting the BSR are not present, the UE may trigger a random access procedure and attempt to request radio resources (S6200).

As described above, if the random access procedure for requesting the radio resources to the eNode B is triggered, the UE may transmit a random access preamble to the eNode B and receive a random access response message corresponding thereto as described with reference to FIGS. 4 and 5. In addition, a message 3 (that is, a MAC PDU) including a UE identifier and a BSR may be generated and stored in a Msg3 buffer 602, in a MAC layer of the UE through a UL Grant signal included in the random access response message. The message 3 stored in the Msg3 buffer 602 may be copied and stored in a HARQ process buffer 603 indicated by the UL Grant information. FIG. 7 shows, by way of example, the case where the HARQ process A is used for the transmission of the message 3. Thus, the message 3 is copied to the HARQ buffer 603 corresponding to the HARQ process A. The message 3 stored in the HARQ buffer 603 may be transmitted to the eNode B on a PUSCH.

Meanwhile, if the UE should perform retrial of the random access procedure due to contention resolution failure, the UE may transmit the random access preamble to the eNode B again and receive a random access response (S6300). However, in the retried random access procedure, the UE uses the message 3 stored in the Msg3 buffer 602 again, without generating a new message 3. That is, the UE may copy and store the MAC PDU corresponding to the message 3 stored in the Msg3 buffer 602 in a HARQ buffer 604, and transmit the MAC PDU, according to the UL Grant signal included in the random access response received in the retried random access procedure. FIG. 7 shows the case where the reattempted random access procedure is performed by a HARQ process B. The data stored in the Msg3 buffer 602 may be copied into the HARQ buffer B and transmitted.

As described above, if the random access response is received while the random access procedure is performed, the UE stores the message 3 stored in the Msg3 buffer in the HARQ buffer and transmits the message 3. As described above, in the current the LTE system standard for the HARQ process, it is defined that the transmission of the data stored in the Msg3 buffer is triggered by the reception of any UL Grant signal. Accordingly, the CR timer may be erroneously driven such that an erroneous contention resolution process is performed. Due to the erroneous contention resolution procedure, the above-described BSR may not be normally transmitted and the UE may come to deadlock. This problem will be described in detail with reference to FIG. 8.

Figure 8:
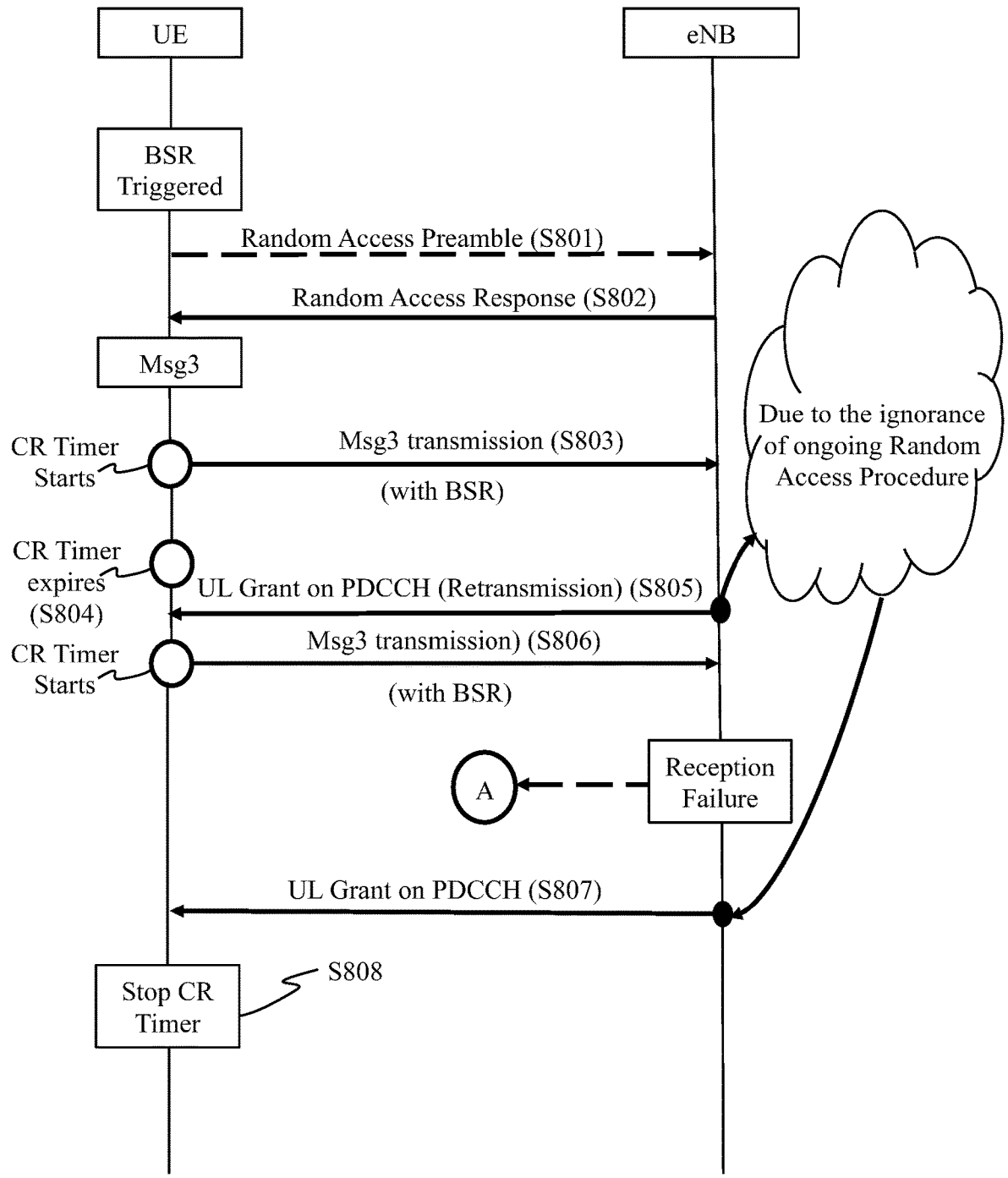
FIG. 8 is a view illustrating a problem which may occur when data stored in a message 3 buffer is transmitted by an Uplink (UL) Grant signal received on a message other than a random access response message.

FIG. 8 is a view illustrating a problem which may occur when data stored in a Msg3 buffer is transmitted by an Uplink (UL) Grant signal received on a message other than a random access response message.

As described with reference to FIG. 7, the UE may trigger the BSR when high priority data is generated, transmit the random access preamble in order to transmit the BSR to the eNode B (S801), and receive the random access response corresponding thereto (S802).

Thereafter, the UE may transmit a message 3 including the BSR via UL Grant information included in the random access response message received in step S802 (S803). If the message 3 is transmitted, the CR timer is operated as described with reference to FIG. 5.

If the random access procedure is completed before the CR timer expires, the UE determines that the random access procedure has not been successfully completed (S804). In this case, the UE may try to restart the random access procedure from the transmission of the random access preamble.

At this time, since the eNode B does not yet know that the UE is performing the random access procedure, the eNode B may transmit a UL Grant signal independent of the random access procedure on a masked PDCCH (S805). In this case, according to the current LTE system standard, the UE transmits the message 3 stored in the Msg3 buffer according to the UL Grant signal received on the PDCCH in step S805 (S806). In addition, when the message 3 is transmitted, the CR timer is restarted. That is, even when the UE does not perform the transmission of the random access preamble and the reception of the random access response message, the CR timer is restarted in step S806.

Although the CR timer is started as the UE transmits the message 3 in step S806, the eNode B may not know that the UE is performing the random access procedure because the reception of the random access preamble and the transmission of the random access response message are not performed. If another UL Grant signal is received on the PDCCH including the UE identifier (S807), the UE determines that the ongoing random access procedure is successfully completed. Accordingly, the UE may stop the ongoing CR time (S808).

If the message 3 transmitted to the eNode B in step S806 is not successfully received by the eNode B (A), the UE no longer transmits the message 3 including the BSR. Accordingly, if additional data is not generated, the UE may not transmit the data generated in the transfer buffer to the eNode B.

The above-described problem will be described as follows.

According to the current LTE system standard, if the UL Grant signal is received in a state in which the data is stored in the Msg3 buffer, the UE transmits the data stored in the Msg3 buffer to the eNode B. At this time, the UL Grant signal may be transmitted by the eNode B, not for the transmission of the data stored in the Msg3 buffer, but for the transmission of other data. Accordingly, the CR timer may be erroneously started.

In addition, if the eNode B does not know that the CR timer is erroneously started in the UE and transmits the UL Grant signal for the transmission of other data as described with reference to FIG. 8, information (e.g., BSR) to be transmitted through the message 3 may be lost.

In addition, the UE may not receive a message 4 for completing a proper contention resolution procedure even with respect to the ongoing random access procedure.

In a preferred embodiment of the invention for solving the above-described problem, the data stored in the Msg3 buffer is restrictively transmitted only in the case where the UL Grant signal received from the eNode B is received on the random access response message, but not in all cases where the UL Grant signal is received from the eNode B. If the UL Grant signal is received on the masked PDCCH not by the random access response message but by the UE identifier (C-RNTI or a Semi Persistent Scheduling Radio Network Temporary Identifier (SPS-RNTI)) in a state in which the data is stored in the Msg3 buffer, a method of acquiring and transmitting new data (MAC PDU) to the eNode B instead of the data stored in the Msg3 buffer is suggested.

Figure 9:
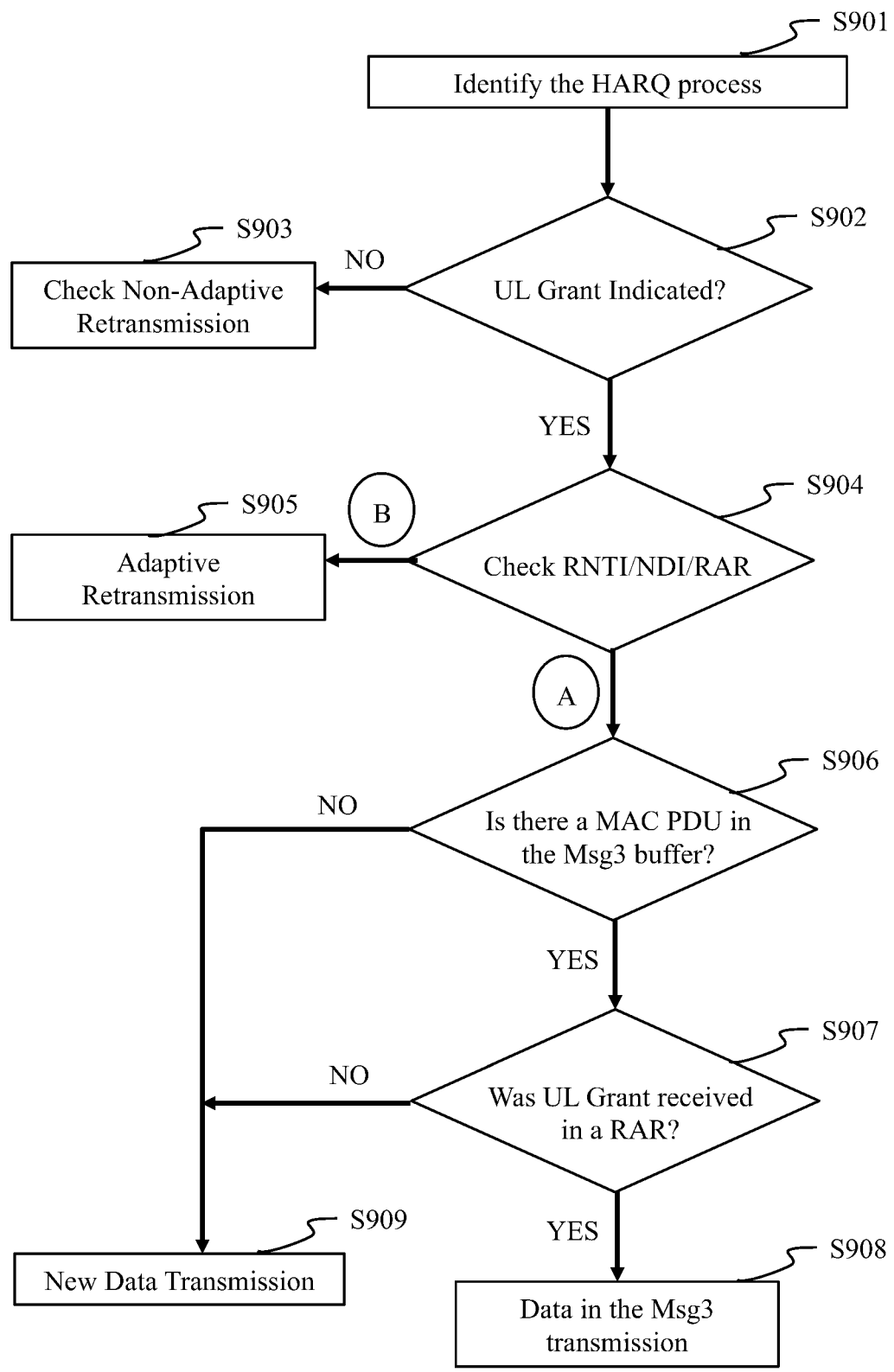
FIG. 9 is a flowchart illustrating a method of transmitting uplink data by a UE according to a preferred embodiment of the present invention.

FIG. 9 is a flowchart illustrating a method of transmitting UL data by a UE according to a preferred embodiment of the present invention. In more detail, FIG. 9 shows the operation of a HARQ entity of the UE according to an embodiment of the present invention at every TTI.

First, the HARQ entity of the UE may identify a HARQ process associated with a TTI (S901). If the HARQ process associated with the TTI is identified, the HARQ entity of the UE may determine whether or not a UL Grant signal received from the eNode B indicated at the TTI (S902). The UE may determine whether or not a HARQ buffer corresponding to the HARQ process is empty if there is no information about the received UL Grant signal at the TTI, and perform non-adaptive retransmission as described with reference to FIG. 6 if there is data in the HARQ buffer (S903).

Meanwhile, if there is a UL Grant signal received from the eNode B at the TTI, it may be determined (1) whether the UL Grant signal is not received on the PDCCH indicated by the temporary C-RNTI and the NDI is toggled from the value during transmission prior to the HARQ process, (2) whether there is previous NDI and this transmission is initial transmission of the HARQ process, (3) whether the UL Grant signal is received on the PDCCH indicated by the C-RNTI and the HARQ buffer of the HARQ process is empty, or (4) whether the UL Grant signal is received on the random access response message (S904). If any one of the conditions (1) to (4) is satisfied in step S904 (A), the method progresses to step S906. In contrast, if any one of the conditions (1) to (4) is not satisfied in step S904 (B), the method progresses to step S905 of performing adaptive retransmission using the UL Grant signal (S905).

Meanwhile, the UE determines whether there is data in the Msg3 buffer in step S906 (S906). In addition, even when there is data in the Msg3 buffer, the UE determines whether the received UL Grant signal is received on the random access response message (S907). That is, the UE according to the present embodiment transmits the data stored in the Msg3 buffer only when there is data in the Msg3 buffer when receiving the UL Grant signal and the UL Grant signal is received on the random access response message (S908). If there is no data in the Msg3 buffer when receiving the UL Grant signal or the UL Grant is not received on the random access response message, the UE determines that the eNode B makes a request not for the transmission of the data stored in the Msg3 buffer but for transmission of new data, and performs new data transmission (S909). In more detail, the HARQ entity of the UE may be controlled such that a MAC PDU including new data from a multiplexing and assembly entity is acquired and is transmitted through the HARQ process.

Hereinafter, an example applied to a process of transmitting a BSR by the UE which operates by the embodiment described with reference to FIG. 9 as shown in FIG. 8 will be described.

Figure 10:
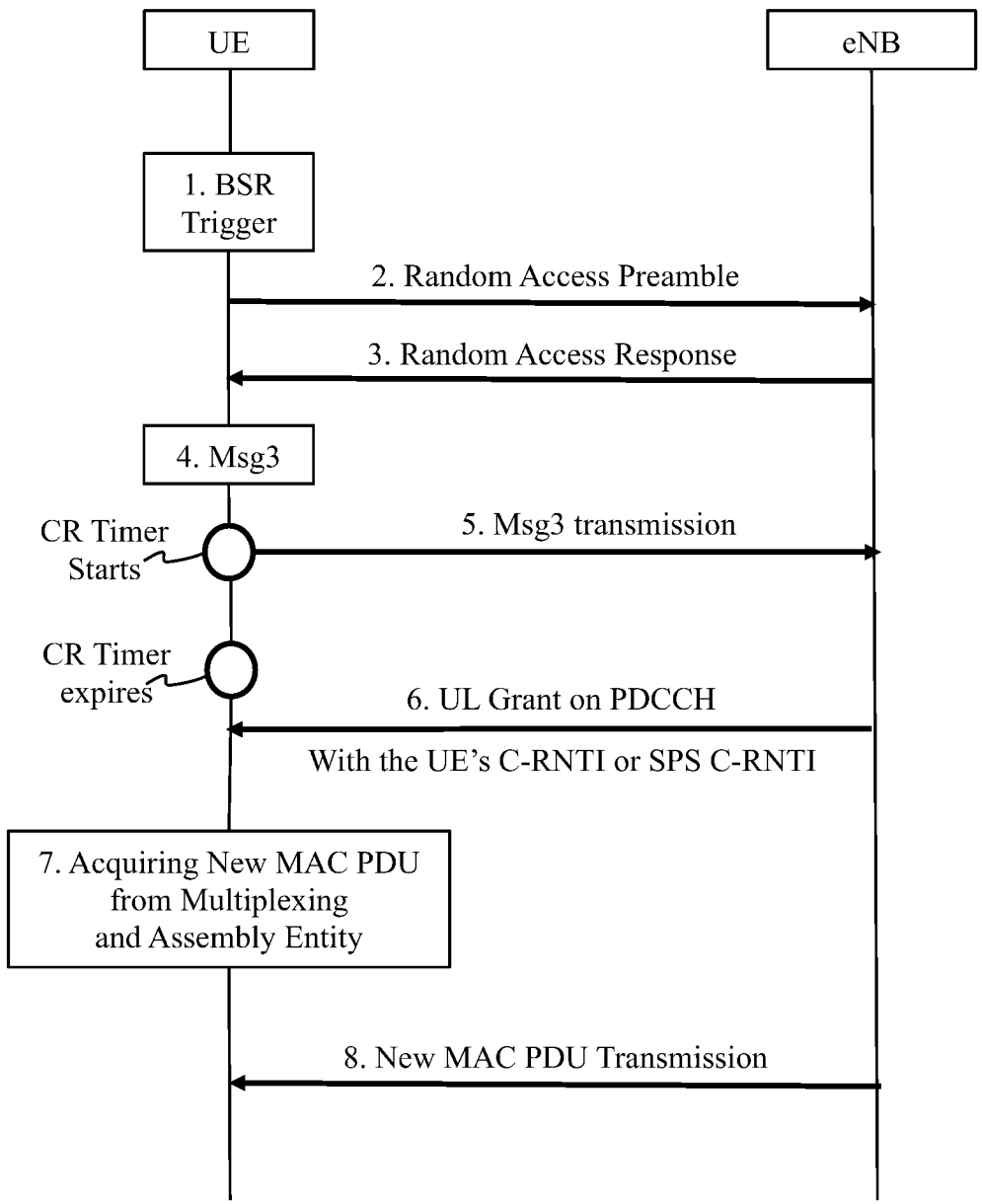
FIG. 10 is a view illustrating a method of transmitting uplink data when a Buffer status Report (BSR) is triggered in a UE, according to an embodiment of the present invention.

FIG. 10 is a view illustrating a method of transmitting UL data when a BSR is triggered in a UE, according to an embodiment of the present invention.

As described above, new data may be generated in the RLC and PDCP buffers of the UE. It is assumed that the generated new data has higher priority than that of the data already stored in the RLC and PDCP buffers. The UE may trigger the BSR transmission in order to inform an eNode B of information about the generation of the data (step 1).

The UE should transmit the BSR according to BSR transmission trigger, but, in a special case, there may be no radio resource for transmitting the BSR. In this case, the UE may trigger a random access procedure for transmitting the BSR. It is assumed that the random access procedure triggered in the present embodiment is the contention based random access procedure described with reference to FIG. 5.

The UE may transmit a random access preamble to the eNode B according to the triggering of the random access procedure (step 2).

The eNode B may receive the random access preamble transmitted by the UE and transmit a random access response message to the UE (step 3). The UE may receive the random access response message.

The UE may generate a message 3 including the BSR and a UE identifier according to a UL Grant signal included in the random access response message received in step 3 and store the message 3 in a Msg3 buffer (step 4).

The UE may select a HARQ process according to the UL Grant information included in the random access response message received in step 3 and copy and store the message 3 stored in the Msg3 buffer in the buffer corresponding to the selected HARQ process. Thereafter, the data stored in the HARQ buffer may be transmitted to the eNode B according to the UL HARQ procedure described with reference to FIG. 6 (step 5). The UE starts (or restarts) the CR timer by the transmission of the message 3.

When the CR timer expires, the UE may perform retrial of the random access procedure. That is, a random access preamble and a PRACH resource may be prepared to be selected and transmitted to the eNode B. However, in a state in which the CR timer is not operated, the UE may receive the UL Grant signal from the eNode B on a PDCCH masked by a UE identifier (step 6).

When the UL Grant signal has been received on the PDCCH in step 6, the UE generates new data different from the data stored in the Msg3 buffer according to the UL Grant information received in step 6 as a new MAC PDU, unlike the procedure of the embodiment of FIG. 8 for transmitting the message 3 stored in the Msg3 buffer according to the UL Grant information received in step 6 (step 7). In more detail, if the UE receives the UL Grant signal in step 6 but does not receive the UL Grant signal on the random access response message, a MAC PDU for transmitting not the data stored in the Msg3 buffer but new data from a multiplexing and assembly entity may be acquired and transmitted using a HARQ process corresponding thereto.

After the new MAC PDU is generated, the UE according to the present embodiment may select a HARQ process according to the UL Grant signal received in step 6, store the MAC PDU newly generated in step 7 in the buffer corresponding to the HARQ process, and transmit the MAC PDU to the eNode B according to the UL HARQ procedure (step 8).

Thereafter, the UE may perform a random access procedure including the transmission of the random access preamble and the reception of the random access response and transmit the BSR stored in the Msg3 buffer to the eNode B.

According to the above-described embodiment, it is possible to prevent the eNode B from erroneously operating the CR timer due to the UL Grant signal transmitted not for transmission of the data stored in the Msg3 buffer but for transmission of new data. Accordingly, the problem that the message 3 is lost may be solved. In addition, the random access procedure of the UE with the eNode B may be normally performed.

Unlike the above-described embodiment, as another embodiment of the present invention, a method of performing a process while ignoring the UL Grant signal if the UL Grant signal is received from the eNode B on the PDCCH masked by the UE identifier during the random access procedure of the UE may be implemented. In this case, the UE may transfer the message 3 to the eNode B by the normal random access procedure, and the eNode B may retransmit the UL Grant signal for the transmission of new data after the random access procedure of the UE is completed.

Hereinafter, the configuration of the UE for implementing the above-described embodiment of the present invention will be described.

Figure 11:
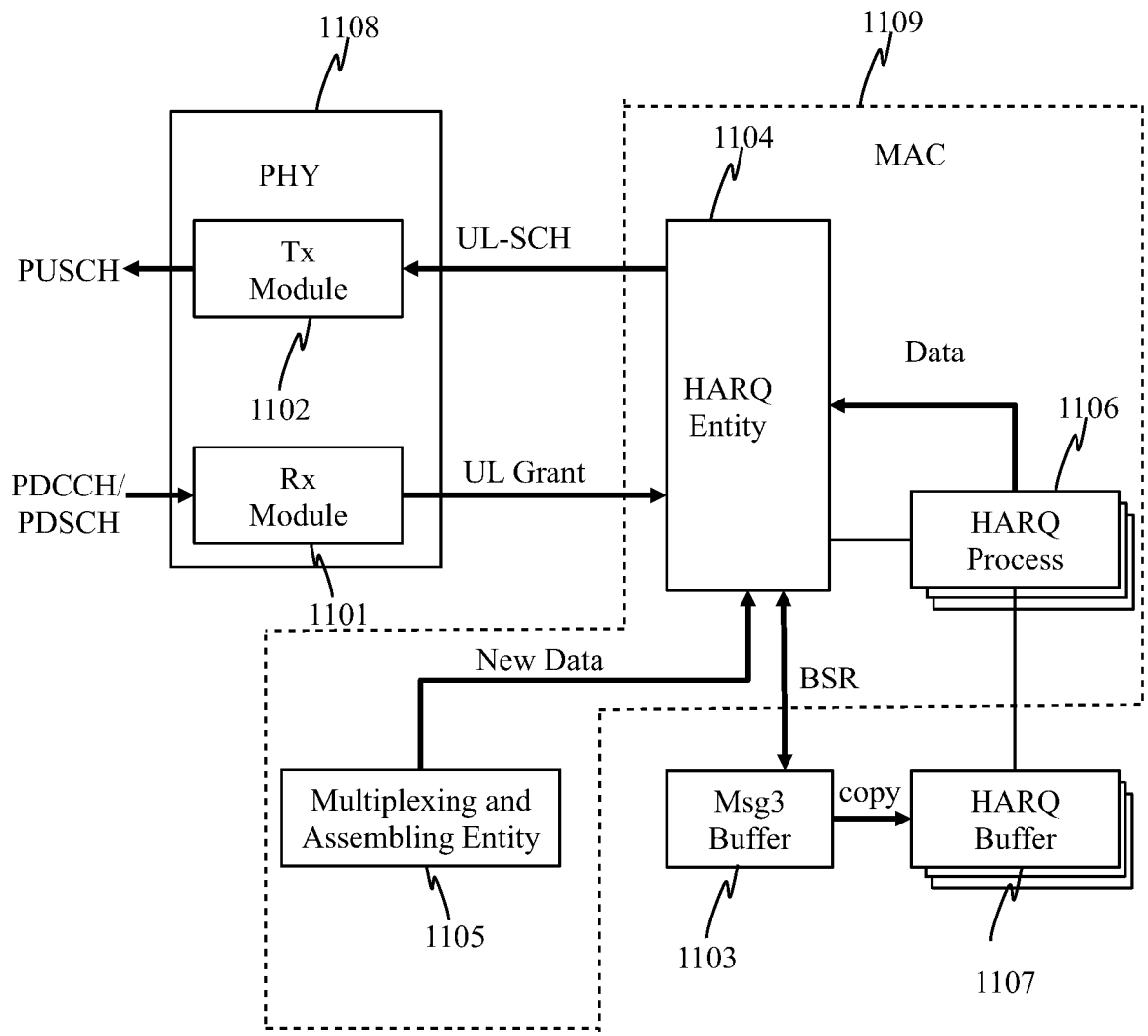
FIG. 11 is a schematic view showing the configuration of a UE according to an embodiment of the present invention.
Figure 12:
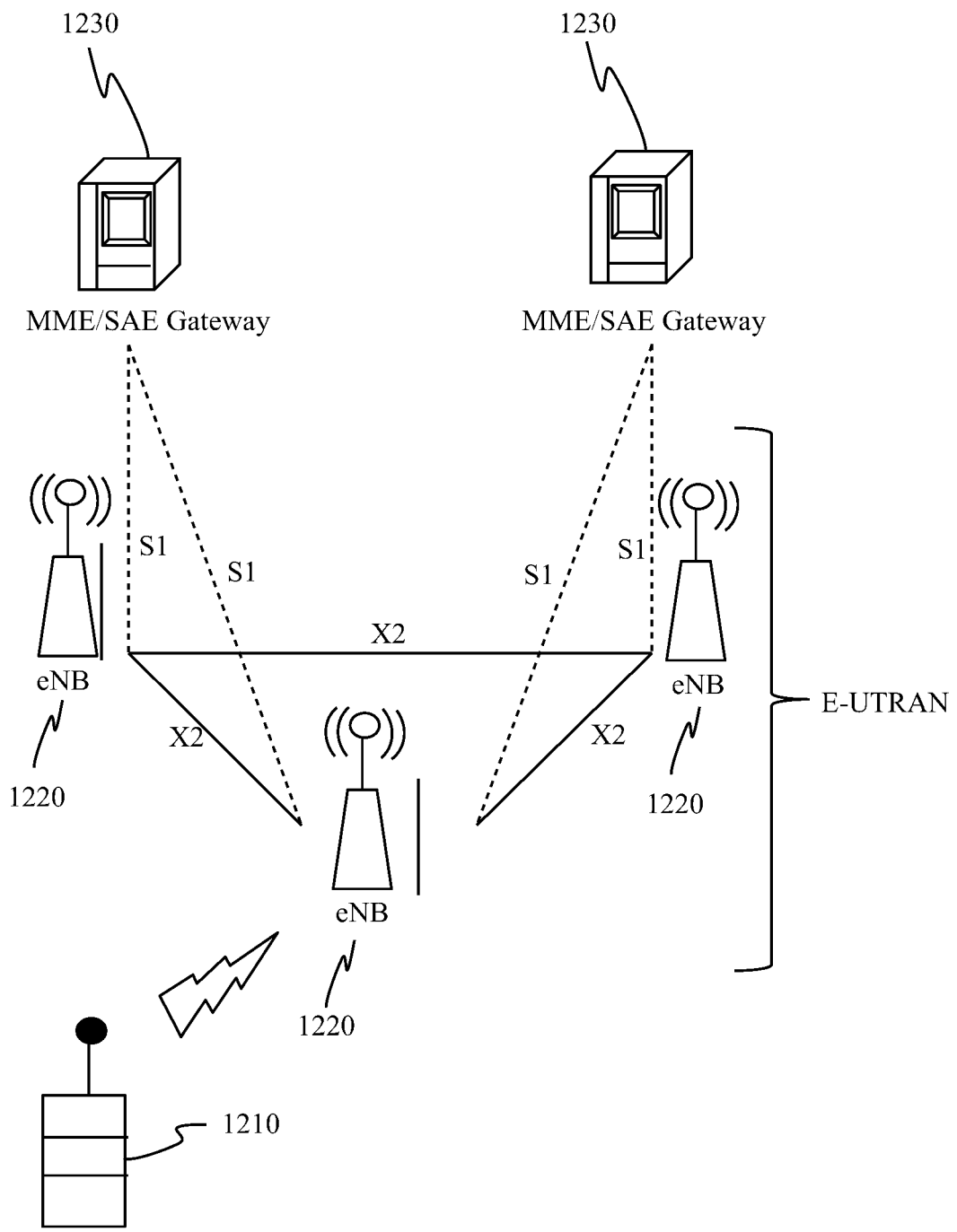
FIG. 12 illustrates a block diagram illustrating network structure of an evolved universal mobile telecommunication system (E-UMTS).
Figure 13:
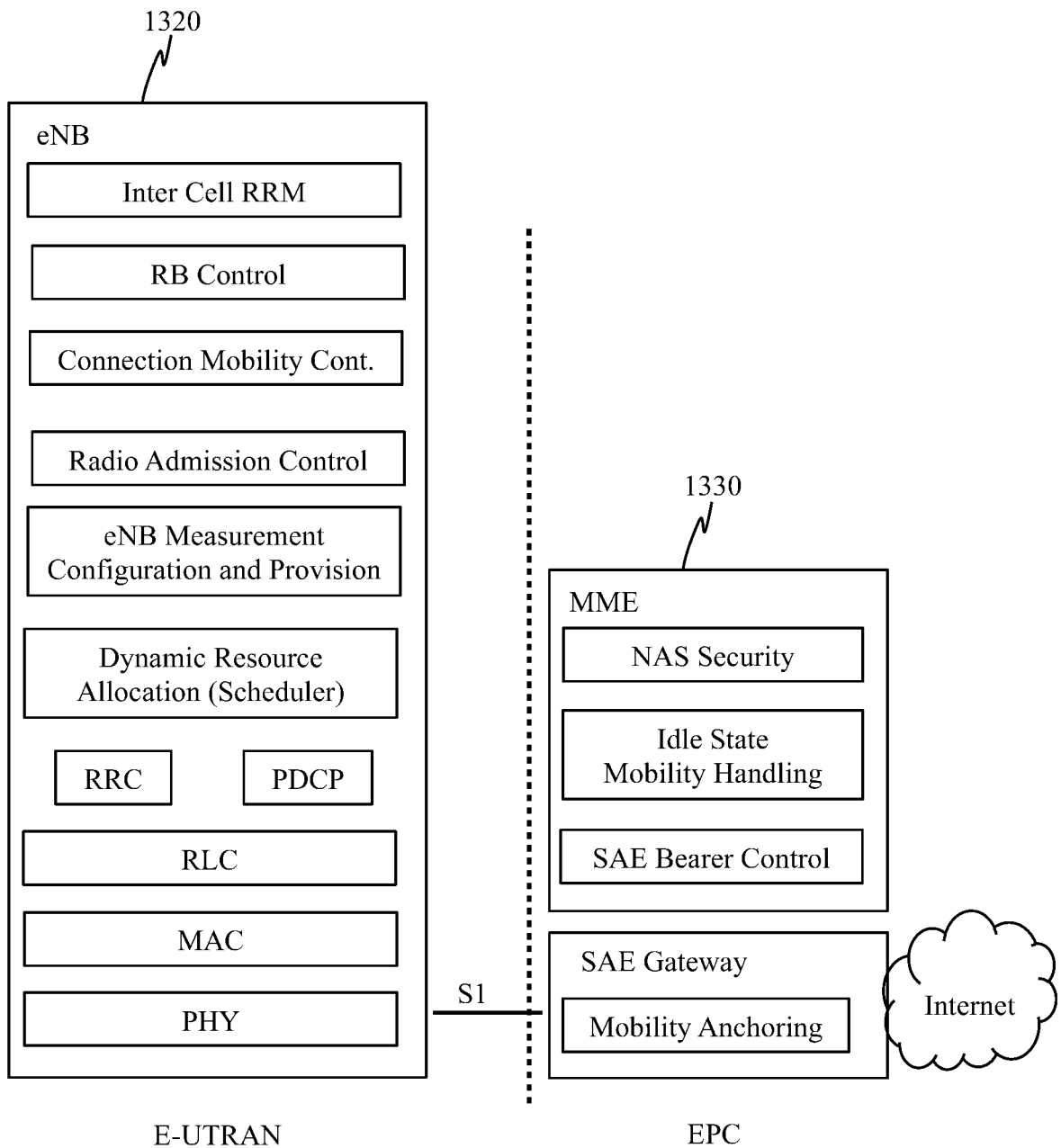
FIG. 13 illustrates a block diagram depicting architecture of a typical E-UTRAN and a typical EPC.
Figure 14A:
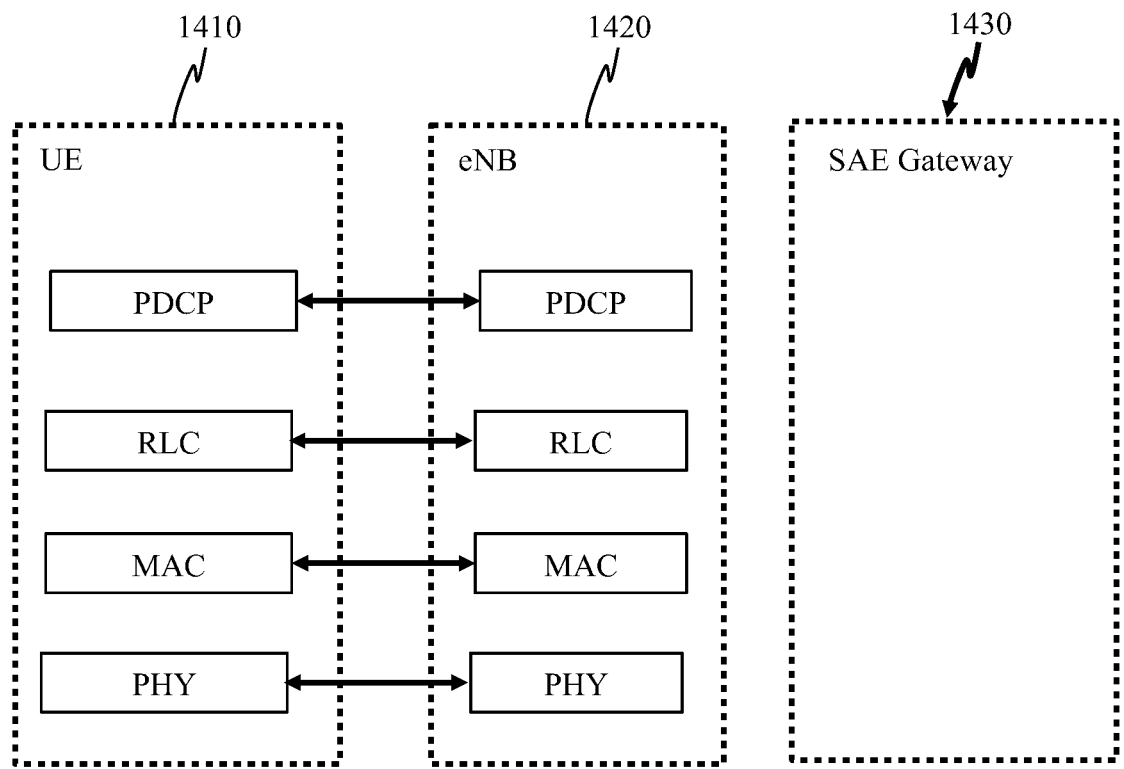
FIG. 14(*a*) illustrates the user-plane protocol for the E-UMTS.
Figure 14B:
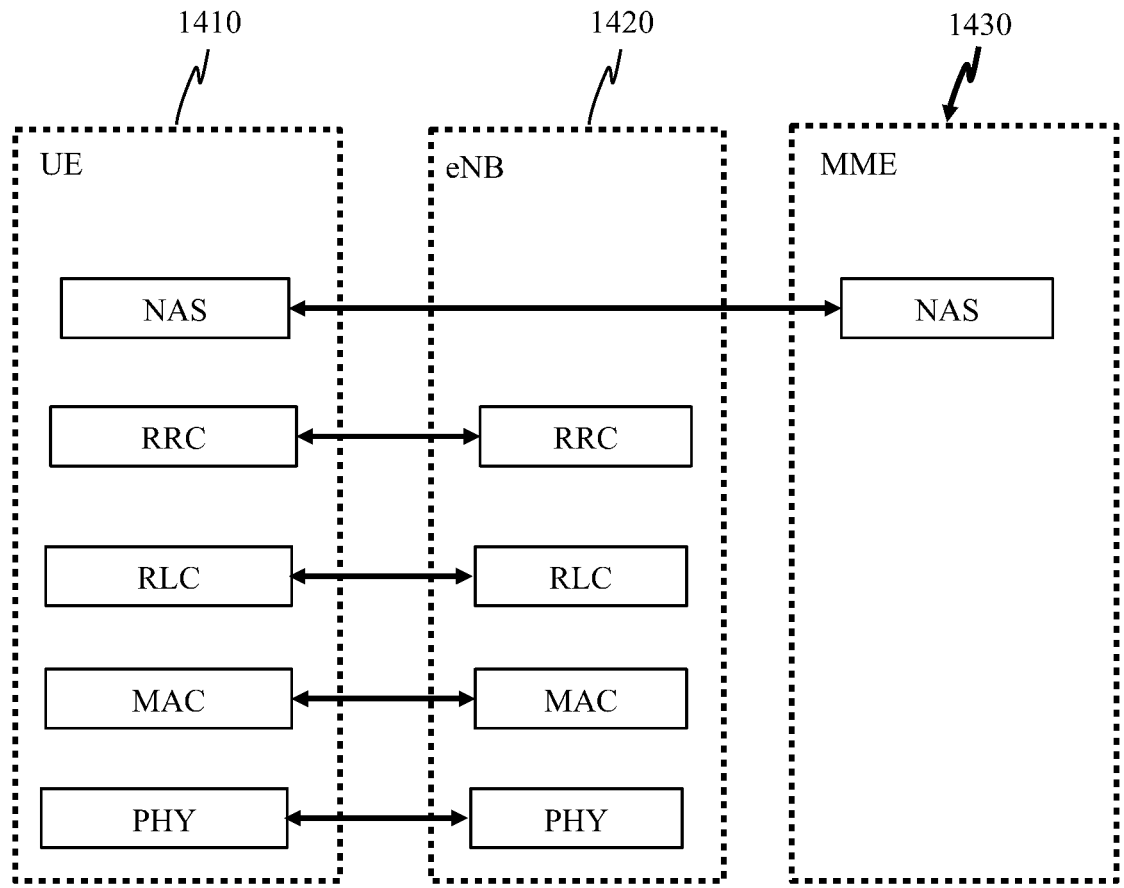
Figure 15:
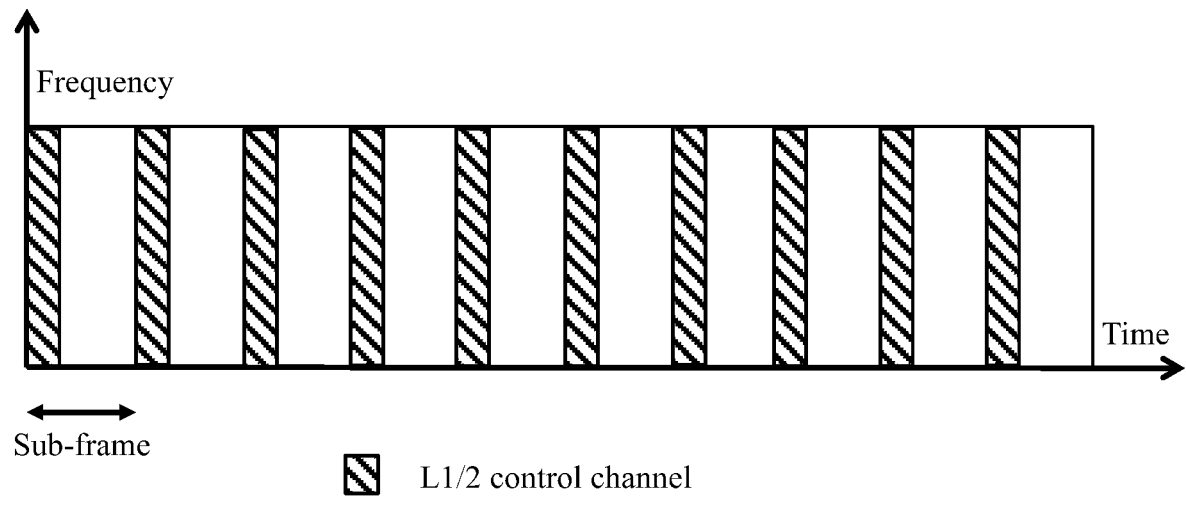
FIG. 15 illustrates a Structure of the physical channel.
Figure 16:
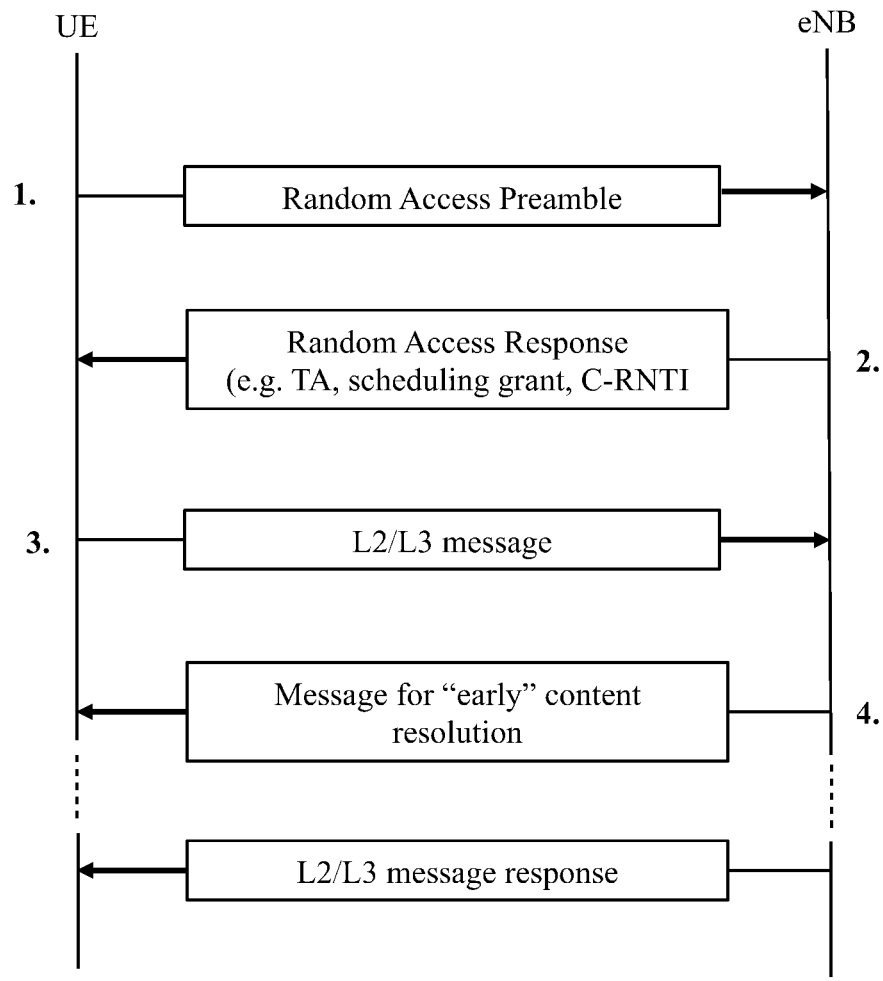
FIG. 16 illustrates a Random Access procedure for E-UTRAN initial access.
Figure 17:
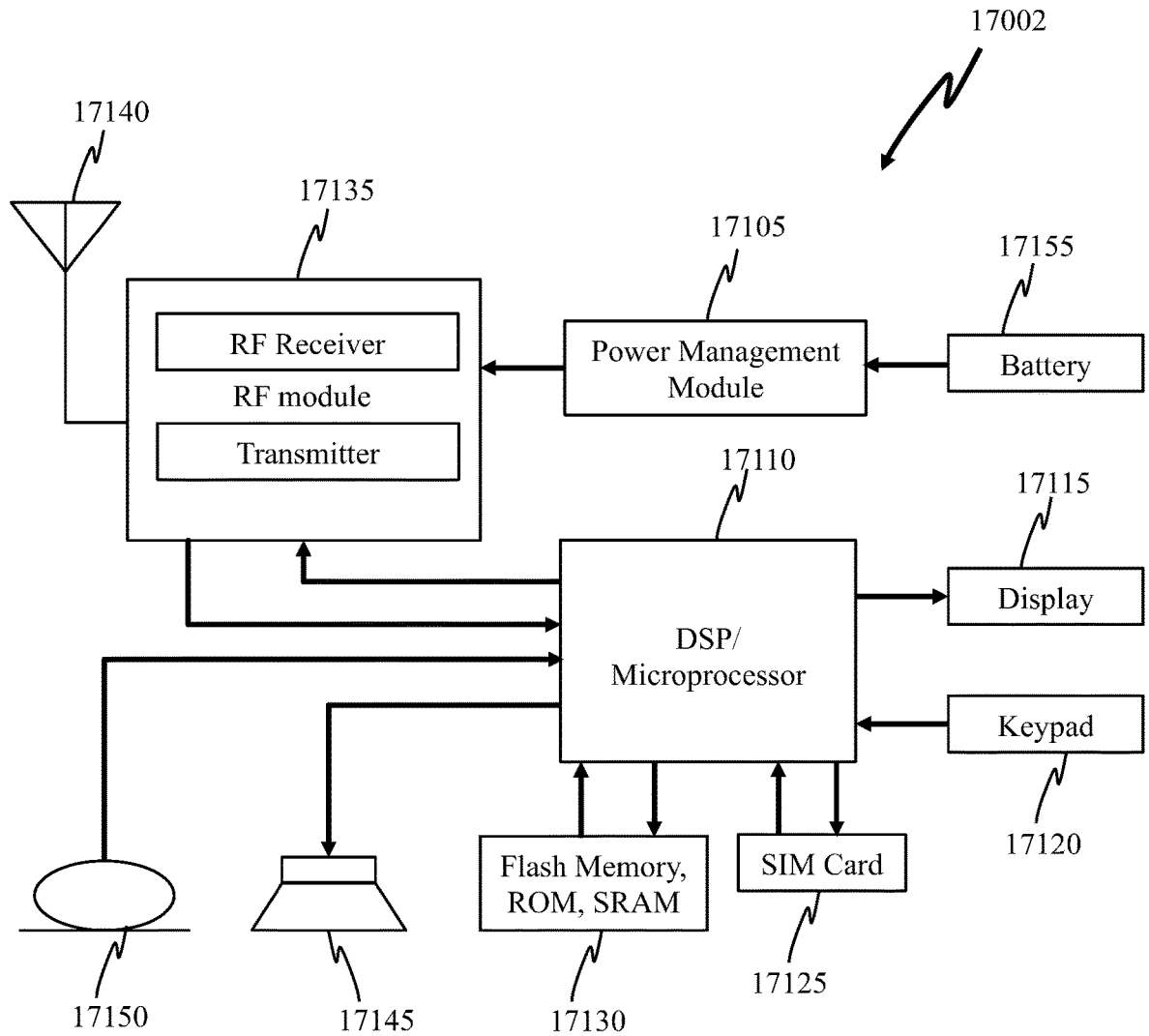
FIG. 17 illustrates a block diagram of a mobile station (MS) or access terminal (AT) according to the present invention.

FIG. 11 is a schematic view showing the configuration of a UE according to an embodiment of the present invention.

As shown in FIG. 11, the UE according to the present embodiment may include a reception (Rx) module 1101 for receiving a UL Grant signal from an eNode B on a specific message, a transmission (TX) module 1102 for transmitting data to the eNode B using the received UL Grant signal, a Msg3 buffer 1103 for storing UL data transmitted in a random access procedure, and a HARQ entity 1104 for controlling the transmission of UL data of the UE.

In particular, the HARQ entity 1104 of the UE according to the present embodiment performs a function of determining whether there is data stored in the Msg3 buffer 1103 when the Rx module 1101 receives the UL Grant signal and a function of determining whether the Rx module 1101 receives the UL Grant signal on a random access response message. If there is data stored in the Msg3 buffer 1103 when the Rx module 1101 receives the UL Grant signal and the RX module 1101 receives the UL Grant signal on the random access response message, the data stored in the Msg3 buffer 1103 is controlled to be acquired and transmitted to the eNode B. If there is no data stored in the Msg3 buffer 1103 when the Rx module 1101 receives the UL Grant signal and the RX module 1101 receives the UL Grant signal not on the random access response message but on the PDCCH, the data stored in the Msg3 buffer 1103 is not transmitted but new data is acquired from the multiplexing and assembly entity in the form of a MAC PDU and is transmitted to the eNode B.

In addition, in order to perform the UL HARQ procedure, the UE according to the present embodiment may include one or more HARQ processes 1106 and HARQ buffers 1107 corresponding to the HARQ processes 1106. In the current LTE system, eight independent HARQ processes are defined for use, but the present invention is not limited thereto.

Meanwhile, the HARQ entity 1104 according to the present embodiment may transfer the data acquired from the multiplexing and assembly entity 1105 or the msg3 buffer 1103 to a specific HARQ process 1106 using the above-described configuration, and control the specific HARQ process 1106 to transmit the data acquired from the multiplexing and assembly entity 1105 or the Msg3 buffer 1103 through the Tx module 1102. As described above, if the specific HARQ process 1106 transmits the data stored in the Msg3 buffer 1103 through the Tx module 1102 as described above, the data stored in the Msg3 buffer 1103 may be copied into the specific HARQ buffer 1107 corresponding to the specific HARQ process 1106 and the data copied into the specific HARQ buffer 1107 may be transmitted through the Tx module 1102.

At this time, the data stored in the Msg3 buffer 1103 is a MAC PDU including a UE identifier and may further include information such as a BSR according to the purpose of the random access procedure.

In the configuration of the UE shown in FIG. 11, the Tx module 1102 and the Rx module 1101 may be configured as a physical layer processing module 1108, and the HARQ entity 1104, the multiplexing and assembly entity 1105 and one or more HARQ processes 1106 may be configured as a MAC layer module 1109. However, the invention is not limited thereto. In addition, the Msg3 buffer 1103 and the HARQ buffers 1107 corresponding to the HARQ processes 1106 may be implemented using any storage medium.

Although the signal transmission or reception technology and the UE for the same are applied to a 3GPP LTE system, they are applicable to various mobile communication systems having a similar procedure, in addition to the 3GPP LTE system.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

Agenda Item: 6.2.1.2
Source: LG Electronics
Title: Scheduling of ETWS Notifications
Document for: Discussion and Decision Introduction This document proposes how to schedule ETWS notifications on BCCH Decoupling of ETWS notification from normal SI All SIBs other than SIB Type 1 are scheduled by scheduling information included in SIB Type 1. If SIB carrying ETWS notification is also scheduled by scheduling information, non-ETWS UEs would be informed about change in system information due to newly scheduled ETWS notification.

Moreover, if SIB carrying ETWS notification is also scheduled by scheduling information, value tag would be used to indicate change of ETWS notifications. We think that value tag used for normal SIBs should not be used for SIB carrying ETWS notification. It is because the current method for value tag is specified based on the assumption that SIBs won't be frequently changed. However, we could assume that contents of ETWS notification will be more frequently changed than normal system information.

Therefore, we propose that SIB carrying ETWS notifications are not scheduled by scheduling information including SIB Type 1.
Proposal 1: SIB Carrying ETWS Notifications are not Scheduled by Scheduling Information Including SIB Type 1.

In addition, we propose that modification of ETWS notification on BCCH does not update value tag. Namely, value tag does not indicate status of ETWS notification on BCCH. Therefore, ETWS notifications do not drive non-ETWS UEs to read system information.
Proposal 2: Modification of ETWS Notification on BCCH does not Update the Value Tag of Normal System Information Blocks.
Proposal for ETWS Scheduling Instead of using SIB Type 1, we think that ETWS specific SIB could be used to indicate update/scheduling of ETWS notifications.

In this scheme, scheduling information on ETWS notifications, i.e. ETWS scheduling information, is carried on ETWS specific SIB other than SIB Type 1. The ETWS specific SIB carrying ETWS scheduling information is not scheduled by SIB Type 1, unlike normal SIBs. The ETWS specific SIB carrying ETWS scheduling information is mapped to ETWS specific SI. Modification of ETWS specific SIB carrying ETWS scheduling information won't update value tag included in scheduling information of SIB Type 1. Thus, update of ETWS notifications does not drive non-ETWS UEs to read system information.

Alternatively, SIB Type 1 includes two value tags: one value tag indicating update of normal SIBs and another value tag indicating update of SIB carrying ETWS notifications. SIB Type 1 includes scheduling of information of SIBs carrying ETWS notifications. In this case, If SIB Type 1 indicates update of SIB carrying ETWS notification, UE reads SIB carrying ETWS notification based on SIB Type 1.
Proposal 3: ETWS Scheduling Information is Carried on ETWS Specific SIB Independent from Other SIBs.

Figure 18:
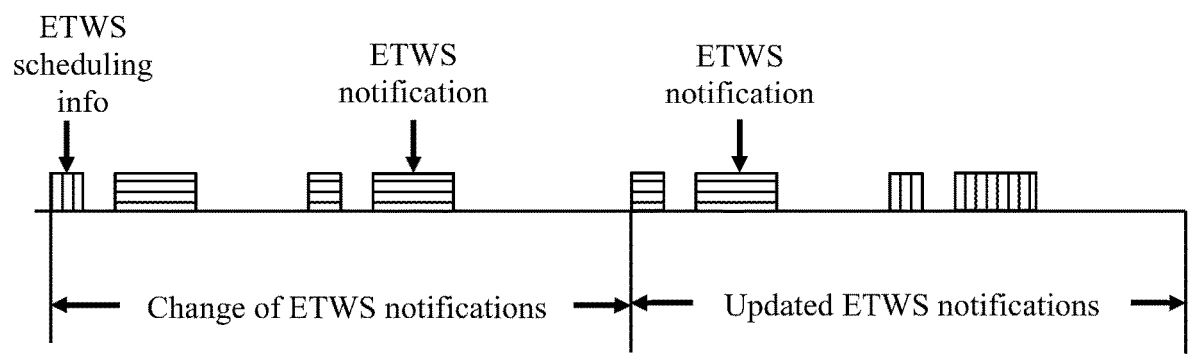
FIG. 18 illustrates ETWS scheduling information and notifications on ETWS specific SIs.

The FIG. 18 shows how this scheme works. The SIB carrying ETWS scheduling information is periodically transmitted on BCCH. How to broadcast the SIB carrying ETWS scheduling information can be fixed in the spec or included in normal SIB i.e. non-ETWS specific SIB. ETWS UE periodically monitors ETWS scheduling information to find out if there is ETWS notification to be transmitted on BCCH.

The SIB carrying ETWS scheduling information could include ETWS specific value tag which indicates update of SIB carrying ETWS notifications only. ETWS UE receives updated ETWS notifications only based on the scheduling information.
Proposal 4: ETWS Scheduling Information on ETWS Specific SIB Carries Value Tag to Indicate Update of ETWS Notifications.

The SIB carrying ETWS scheduling information carries scheduling of SIBs carrying ETWS notifications. Thus, by reading ETWS scheduling information, ETWS UE can know when SIBs carrying ETWS notifications will be transmitted on BCCH.
Proposal 5: ETWS Scheduling Information Carries Configuration and Scheduling of ETWS Notifications.

When the SIB carrying ETWS scheduling information or notifications is updated, a paging message can be transmitted to indicate update of the SIB carrying ETWS scheduling information or notifications.

For normal operation of system information, SI-RNTI is used to give detailed time-domain scheduling of SI message to UEs. To decouple ETWS notifications from normal system information, we propose to use ETWS specific SI-RNTI to give detailed time-domain scheduling of SI message carrying ETWS scheduling information or notifications to ETWS UEs.
Proposal 6: ETWS Specific SI-RNTI is Used to Give Detailed Time-Domain Scheduling of SI Message Carrying ETWS Scheduling Information or Notifications to ETWS UEs.

Conclusion

In conclusion, we propose the followings:
1. SIB carrying ETWS notifications are not scheduled by scheduling information including SIB Type 1.
2. Modification of ETWS notification on BCCH does not update the value tag of normal system information blocks.
3. ETWS scheduling information is carried on ETWS specific SIB independent from other SIBs.
4. ETWS scheduling information on ETWS specific SIB carries value tag to indicate update of ETWS notifications.
5. ETWS scheduling information carries configuration and scheduling of ETWS notifications.
6. ETWS specific SI-RNTI is used to give detailed time-domain scheduling of SI message carrying ETWS scheduling information or notifications to ETWS UEs.

Figure 19:
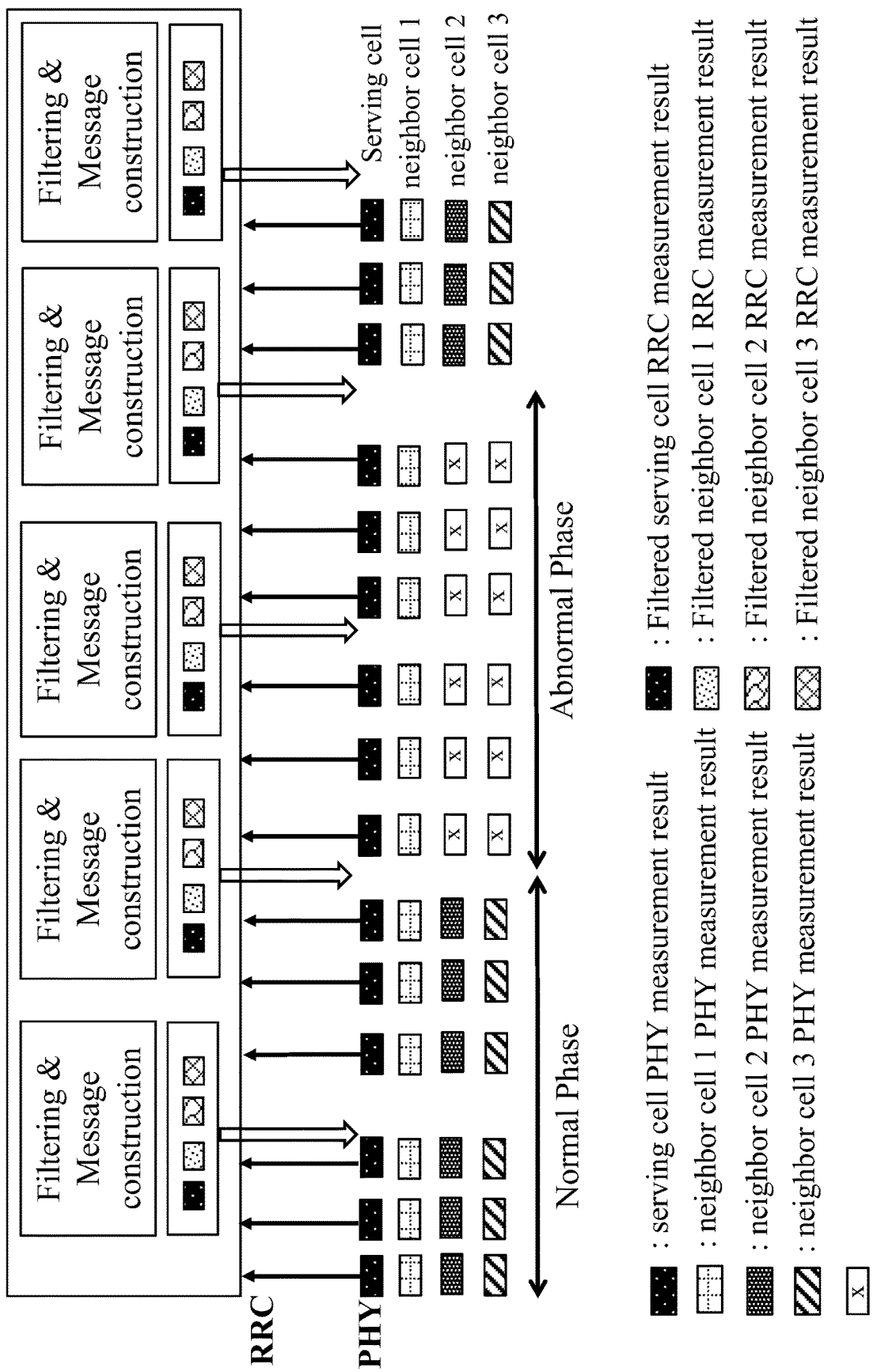
FIG. 19 illustrates serving and neighboring cell measurement results.

Title: Handling of Periodic Reporting in Case Measurement Results are Unavailable 1. Discussion We focus on the case when for some reasons physical layer is not able to perform measurement on neighbour cell(s). The example case is illustrated in the FIG. 19. Let's assume that at the periodic reporting occasion $p_{n+2}$, cellsToReport consists of serving cell, neighbour cell 1, 2, 3. During abnormal phase, physical layer fails to measure signal quality of neighbour cell 2, 3. Due to the failure of measurement of parts of cells listed in cellsToReport at physical layer, RRC does not have up to date measurement results at the periodic reporting occasion $P_{n+2}$, for every cells in cellsToReport. In spite of lack of the up-to-date measurement result, UE should report the measurement at $P_{n+3}$ since periodic reporting timer is expired.

It is not clear what RRC should do in case measurement results from physical layer are not available. The most simple and reasonable approach would be that cellsToReport is dynamically changed depending on the availability of measurement results from physical layer. For the case of FIG. 19, at $P_{n+3}$ cellsToReport excludes neighbour cell 2, 3 for which recent measurement results are not given to RRC, we note that the reverse case that the UE needs to add cell(s) into cellsToReport is already implemented in 5.5.4.1.

Text Proposal 5.5.4 Measurement Report Triggering 5.5.4.1 General

The UE shall:
1> for each measID included in the measIDList within VarMeasurementConfiguration:
2> if the entry condition applicable for this event, i.e. the event corresponding with the eventID of the corresponding reportConfig within VarMeasurementConfiguration, is fulfilled for one or more cells applicable for this event for a duration exceeding the value of timeToTrigger defined for this event within the VarMeasurementConfiguration
3> if the reportInterval defined within the VarMeasurementConfiguration for this event is not equal to 0: 4> set the periodicalReportingOngoing defined within the VarEventsTriggered for this event to TRUE; 3> set the numberOfReportsSent defined within the VarEventsTriggered for this event to 0;
3> include the concerned cell(s) in the cellsToReportList defined within the VarEventsTriggered for this event, if not included;
3> initiate the measurement reporting procedure, as specified in 5.5.5;
2> if the triggerType is set to 'periodical' and a (first) measurement result is available:
3> if the reportInterval defined within the VarMeasurementConfiguration for this event is not equal to 0:
4> set the periodicalReportingOngoing defined within the VarEventsTriggered for this event to TRUE;
3> set the numberOfReportsSent defined within the VarEventsTriggered for this event to 0;
3> include the concerned cell(s) in the cellsToReportList defined within the VarEventsTriggered for this event, if not included;
3> initiate the measurement reporting procedure, as specified in 5.5.4;
2> Upon expiry of the periodical reporting timer for this:
3> if measurement results are unavailable for one or more of the cells included in the cellsToReportList defined within the VarEventTriggered;
4> remove the concerned cell(s) in the cellsToReportList defined within the VarEventsTriggered for the measId1;3> initiate the measurement reporting procedure, as specified in 5.5.5;
2> if the leaving condition applicable for this event is fulfilled for one or more of the cells included in the cellsToReportList defined within the VarEventsTriggered for this event for a duration exceeding the value of timeToTrigger defined within the VarMeasurementConfiguration for this event:
3> remove the concerned cell(s) in the cellsToReportList defined within the VarEventsTriggered for this event;

Title: On Conditions to Perform Measurement

1 Discussion

On the removal of checking s-Measure configuration When UE gets the result of serving cell RSRP, it compares the serving cell quality with the configured s-Measure. If the serving cell quality goes below the configured s-Measure, UE starts to perform measurement procedure. The comparison, as specified in 5.5.3, comprises two OR conditions: 1) if s-Measure is NOT configured or 2) if s-Measurement is configured and the serving cell RSRP value is lower than the configured s-Measure.

We think the configuration check in both conditions (whether s-Measure is configured or not) is not appropriate: we believe default value is going to be defined for s-Measure, and therefore UE does not have such a case that s-Measure is not configured once the UE has received a measurement configuration via RRCConnectionReconfiguration message. So we propose to remove the check routine on whether s-Measure is configured or not. Simple inequality test would be sufficient. Text proposal is given in following section.

Proposal: Remove the routine to determine whether s-Measure is configured or not in section 5.5.3.

2 Text Proposal 5.5.3 Performing Measurements

The UE supports measurement using a reporting configuration with the reportCGI set to 'TRUE', if the network provides sufficient idle periods.

The UE shall:
1> If measurement gaps are active or
1> the UE does not require measurement gaps or
1> a measurement is configured which the UE should attempt to perform during idle periods:
2> If the serving cell quality (RSRP value) is lower than this value:
3> Perform the corresponding measurements of neighbouring cells and evaluation of reporting criteria as specified in the following;
3> If for one of the measurements reportCGI is set to 'TRUE' and
3> If timer T321 is running:
4> determine the global cell identity of the cell included in the associated measurement object by acquiring the relevant system information from the concerned cell;

Title: One Shot Measurement Issue

1 Introduction

Under the current specification, once triggering condition is met or measurement result is available for periodical reporting, UE then checks the value of reportInterval. If it is equal to zero, UE does not toggle its flag periodicalReportingOngoing from FALSE to TRUE. If the flag remains as FALSE, then UE does not start T321, and thus no more reporting is further performed. This is how one shot measurement is performed with what we have in current 36.331. We think this is not the best way, and use of reportAmount is more appropriate and intuitive for one shot measurement reporting than depending on reportInterval. We discuss this and propose text proposals on this.

2 Discussion

One shot measurement issue We think the implication behind checking zero reportInterval as described in section 1 above is that zero reportInterval implicitly indicates one shot measurement reporting. It also seems that zero default value for reportInterval needs to be assumed for this purpose. Regarding this implication and assumption, we need to be careful in that at first we have not agreed on the zero value for a default value of reportInterval. More importantly we are noting that for GCI reporting which was agreed to use one shot periodical reporting, reportAmount is set to 1. From our understanding, this approach can be generalized to the principle that reportAmount is set to 1 for any one shot measurement reporting because it would be much more intuitive that UE checks reportAmount to determine whether it report more rather than doing with zero reportInterval. So we propose that reportAmount is set to 1 for any one shot event triggered measurement reporting. This proposal can be captured in field description of IE ReportConfigEUTRA in ASN.1.

Proposal 1: Text proposal below is proposed, and is also found in section 3.
ReportAmount
Number of reports in case of periodical reporting triggered by event (if limited). In case reportCGI is set to 'TRUE' only value 1 applies. In case of the reporting configuration concerns a SON report of the strongest cells on the carrier, only value 1 applies. For the latter case, use of other values is FFS. In general, value 1 shall be applied for any single measurement reporting.

Presence property of reportAmount If reportAmount is set to 1 for general single measurement report regardless of the triggering type, we don't see the benefit to have reportAmount as optionally present. So we propose to have it as mandatory present.

Proposal 2: reportAmount is mandatory present.
reportAmount SEQUENCE { }

Presence property of reportInterval Currently reportInterval is mandatory in case measurement triggering type is periodical. From the last meeting agreement regarding GCI reporting, the reportInterval is not required for the GCI reporting because the reporting is basically one shot periodical reporting. The presence of reportInterval does not cause any problem in GCI reporting, but it would be entirely useless information. From this perspective, we propose to remove the conditional presence for reportInterval and have the value as just optional. With this, E-UTRAN can omit reportInterval for the case of GCI reporting configuration.

Proposal 3: Remove the conditional presence for reportInterval.
reportInterval SEQUENCE { } OPTIONAL 3 Text Proposal ReportConfigEUTRA
The IE ReportConfigEUTRA specifies criteria for triggering of an E-UTRA measurement reporting event. The E-UTRA measurement reporting events are labelled AN with N equal to 1, 2 and so on.
  Event AI: Serving becomes better than absolute threshold;
  Event A2: Serving becomes worse than absolute threshold;
  Event A3: Neighbour becomes amount of offset better than serving;
  Event A4: Neighbour becomes better than absolute threshold;
  Event A5: Serving becomes worse than absolute threshold1 AND Neighbour becomes better than another absolute threshold2.
ReportConfigEUTRA Information Element

```
-- ASN1START
ReportConfigEUTRA        SEQUENCE {
    triggerType CHOICE {
        event SEQUENCE {
            eventID    CHOICE {
                eventA1      SEQUENCE:{
                    a1-Threshold INTEGER (0) --value range FFS
                },
                eventA2      SEQUENCE:{
                    a2-Threshold INTEGER (0)     --value range FFS
                },
                eventA3      SEQUENCE:{
                    a3-Offset     INTEGER (0)
                    -- value range FFS but will include positive and negative
                    values
                },
                event A4      SEQUENCE:{
                    a4-Threshold INTEGER (0)     --value range FFS
                },
                event A5
                    a5-Threshold1     INTEGER (0)    --value range FFS
                    a5-Threshold2     INTEGER (0)    --value range FFS
                }
            },
            hysteresis    INTEGER (0)       --value range FFS
            timeToTrigger      INTEGER (0)      --value range FFS
        },
        periodical    SEQUENCE:{
            reportCGI      BOOLEAN,
            t321        INTEGER (0)        OPTIONAL      -- COND CGI
                                                         -- value range FFS
        }
    },
```

-continued

```
ttriggerQuantity    ENUMERATED (rsrp, rerq),
reportQuantity      ENUMERATED (sameAsTriggerQuantity, both),
maxReportCells      INTEGER (1..maxCellReport),
reportInterval      SEQUENCE ( )            OPTIONAL
reportAmount        SEQUENCE ( )
}
-- ASN1STOP
```

ReportConfigEUTRA Field Descriptions
Eventid
Choice of E-UTRA event triggered reporting criteria.
TriggerQuantity
The quantities used to evaluate the triggering condition for the event. The values rsrp and rsrq correspond to Reference Signal Received Power (RSRP) and Reference Signal Received Quality (RSRQ) [36.214].
Hysteresis
Hysteresis parameter for entering/leaving measurement report triggering condition. Value in dB.
TimeToTrigger
Time during which specific criteria for the event needs to be met in order to trigger a measurement report. Value in seconds.
ReportQuantity
The quantities to be included in the measurement report. The value both means that both the rsrp and rsrq quantities are to be included in the measurement report
MaxReportCells
Max number of cells to include in the measurement report.
ReportInterval
If included, the event triggers the UE to perform periodical reporting with the indicated interval. Value in seconds.
ReportAmount
Number of reports in case of periodical reporting triggered by event (if limited). In case reportCGI is set to TRUE' only value 1 applies. In case of the reporting configuration concerns a SON report of the strongest cells on the carrier, only value 1 applies. For the latter case, use of other values is FFS. In general, value 1 shall be applied for any single measurement reporting, Conditional Presence Explanation CGI This IE is mandatory in case reportCGI is set to TRUE'; otherwise it is not needed.

Title: Removal of PeriodicalReportingOngoing In

VarEventsTriggered

1 Introduction

According to current 36.331, the flag reportInterval in VarMeasurementConfiguration is used to determine whether periodical report timer needs to start. For this purpose, this flag should be properly set to proper value at the proper time. While the intention of the flag is understandable, we doubt the real need of it. We think this variable can be removed since there is already sufficient mechanism to support this functionality. In this document, we propose to remove reportInterval, and relevant changes are also suggested including miscellaneous clarification.

2 Discussion

To investigate whether the flag periodicalReportingOngoing is really needed or not, we first look into when periodicalReportingOngoing is toggled and how it is used therein.

When the flag is set The variable reportInterval in VarMeasurementConfiguration can be applied for both cases of event triggering measurement report and periodic report. According to section 5.5.4.1, if reportInterval is not equal to the default value, i.e., 1) triggering type is either (purely) periodical reporting or 2) event triggered periodical reporting, then periodicalReportingOngoing is set to 'TRUE'. Toggling from 'TRUE' to 'FALSE' is performed when the actual number of measurement reporting for the concerned measurement ID reaches reportAmount which is the required number of reporting.

How it is used The periodicalReportingOngoing flag is then used, as specified in section 5.5.5, to determine whether the periodic reporting timer T321 needs to start or not. The relevant descriptions are taken from section 5.5.5 and presented below:
1> if the periodicalReportingOngoing defined within the VarEventsTriggered for this event is set to FALSE or
1> if the numberOfReportsSent as defined within the VarEventsTriggered for this event is equal to reportAmount as defined within the reporting configuration for this event as defined in variable VarMeasurementConfiguration:
2> set the periodicalReportingOngoing defined within the VarEventsTriggered for this event to FALSE;
1> else:
2> start a timer with the value of reportInterval as defined within the VarMeasurementConfiguration for this event;

Discussion As shown in the above, the value of periodicalReportingOngoing is first checked and if it is equal to FALSE, then the flag is set to FALSE again. This seems a bit awkward and needs to be improved. Although the intention of introduction of periodicalReportingOngoing is to explicitly specify the status on periodic measurement reporting for the sake of T321 handling, the need of periodicalReportingOngoing does not really come up. This is because numberOfReports together with reportAmount already makes it possible for UE to handle T312: if numberOfReportsSent is less than reportAmount, then UE should start T321 again for the next occasion of periodic reporting. If we follow this approach, we can entirely remove the variable periodicalReportingOngoing and relevant behaviours regarding the flag variable. We believe that with this change we could get 36.331 that is more succinct and clearer. Key changes are given in the table below, and detailed text proposal is presented in section 3.

Periodic reporting timer handling part specified in section 5.5.5
1> if numberOfReportsSent is less than reportAmount as defined within the reporting configuration for this event as defined in variable VarMeasurementConfiguration:
2> start a timer with the value of reportInterval as defined within the VarMeasurementConfiguration for this event;

Although this approach is mainly related to the UE internal variable and thus seems to be only up to implementation though, we should note that which kind of variable UE have and how those values are used could affect the presence property of IEs, which in turn, could affect UE behaviour description also.

Proposal 1: periodicalReportingOngoing defined in the VarEventsTriggered is removed, and necessary modifications to section 5.5.4 and 5.5.5 due to the removal are done as suggested in section 3

PDU type for reportAmount Currently the reportAmount is defined as SEQUENCE type, but we think INTEGER type would be a proper type. INTEGER type could be also applied for the reportInterval.

Proposal 2: Change the PDU type of reportAmount and reportInterval from SEQUENCE to INTEGER Default value for reportAmount If we keep the presence property of reportAmount as optional while being in line with proposal 1 and proposal 2, we need to have a default value for it. We propose 'infinity' for the default value, with which UE can perform unlimited number of periodic reporting in case of absence of the IE reportAmount.

Proposal 3: Set the default value of reportAmount to 'infinity'

Current ASN.1 description seems to assume that reportInterval and reportAmount are applied only for event triggered reporting, not for purely periodic reporting. Since reportInterval and reportAmount are used for both reporting types, the current description should be changed to embrace periodical reporting also. The proposal is as follows:
Proposal 4:
ReportInterval
If included, the UE performs periodical reporting with the indicated interval. Value in seconds.
ReportAmount
Number of measurement reports. In case reportCGI is set to 'TRUE' only value 1 applies. In case the reporting configuration concerns a SON report of the strongest cells on the carrier, only value 1 applies. For the latter case, use of other values is FFS.

Proposal 5[Editorial]: clarify the timer in section 5.5.5 as follows (following the term in section 5.5.4 where 'Upon expiry of the periodical reporting timer for this' is used):
2> start the periodical reporting timer with the value of reportInterval as defined within the VarMeasurementConfiguration for this event;

3 Text Proposal 5.5.4 Measurement Report Triggering
5.5.4.1 General
The UE shall:
1> for each measID included in the measIDList within VarMeasurementConfiguration:
2> if the entry condition applicable for this event, i.e. the event corresponding with the eventID of the corresponding reportConfig within VarMeasurementConfiguration, is fulfilled for one or more cells applicable for this event for a duration exceeding the value of timeToTrigger defined for this event within the VarMeasurementConfiguration
3> set the numberOfReportsSent defined within the VarEventsTriggered for this event to 0;
3> include the concerned cell(s) in the cellsToReportList defined within the VarEventsTriggered for this event, if not included;
3> initiate the measurement reporting procedure, as specified in 5.5.5;
2> if the triggerType is set to 'periodical' and a (first) measurement result is available:
3> set the numberOfReportsSent defined within the VarEventsTriggered for this event to 0;
3> include the concerned cell(s) in the cellsToReportList defined within the VarEventsTriggered for this event, if not included;
3> initiate the measurement reporting procedure, as specified in 5.5.4;
2> Upon expiry of the periodical reporting timer for this:
3> initiate the measurement reporting procedure, as specified in 5.5.5;
2> if the leaving condition applicable for this event is fulfilled for one or more of the cells included in the cellsToReportList defined within the VarEventsTriggered for this event for a duration exceeding the value of timeToTrigger defined within the VarMeasurementConfiguration for this event:
3> remove the concerned cell(s) in the cellsToReportList defined within the VarEventsTriggered for this event;

5.5.5 Measurement Reporting
For the measID for which the measurement reporting procedure was triggered, the UE shall set the measuredResults within the MeasurementReport message as follows:
1> set the IE measID to the measurement identity that triggered the measurement reporting;
1> set the mobilityMeasResults to include all cells included in the cellsToReportList as defined within the VarEventsTriggered for this event
1> for each included cell include the measured results in accordance with the reportConfigList defined in variable VarMeasurementConfiguration for that measurement;
1> include the cells in order of decreasing reporting Quantity, i.e. the best cell is included first.
Editor's note: It is FFS whether, if multiple cells meet the criteria, ordering is also applied irrespective of the cells carrier frequency
1> increment the numberOfReportsSent as defined within the VarEventsTriggered for this event by 1;
1> if numberOfReportsSent is less than reportAmount as defined within the reporting configuration for this event as defined in variable VarMeasurementConfiguration:
2> start the periodical reporting timer with the value of reportInterval as defined within the VarMeasurementConfiguration for this event;
1> if the measured results are for CDMA:
2> set the preRegistrationStatus to the UE's cdma upper layer's HRPD preRegistrationStatus;
1> submit the MEASUREMENT REPORT message to lower layers for transmission, upon which the procedure ends.
Editor's note: It is FFS which additional cells may be included in a report, e.g. cells of another type (e.g. best inter-frequency cell included in an intra-frequency report.

Editor's note: It is FFS if, for the case of a SON report of the strongest cell(s) on the carrier, the UE is required to report more than one cell.

VarEventsTriggered

The UE variable VarEventsTriggered includes information about the events for which the triggering conditions have been met.

VarEventsTriggered UE Variable

```
-- ASN1START
VarEvents Triggered ::=    SEQUENCE (SIZE (1..maxEventsTriggered)) OF SEQUENCE (
        -- List of events that have been triggered
        eventID        EventID,
        cellsToReportList   CellsToReportList,
        numberOfReportsSent    INTEGER
)
CellsToReportList ::=      SEQUENCE (SIZE (1..maxCellReport)) OF SEQUENCE (
        cellIdentity    PhysicalCellIdentity
)
EventID ::= ENUMERATED (eventA1, eventA2, eventA3, eventA4, eventA5, eventB1, eventB2)
- ANS1STOP
```

ReportConfigEUTRA

The IE ReportConfigEUTRA specifies criteria for triggering of an E-UTRA measurement reporting event. The E-UTRA measurement reporting events are labelled AN with N equal to 1, 2 and so on.
  Event AI: Serving becomes better than absolute threshold;
  Event A2: Serving becomes worse than absolute threshold;
  Event A3: Neighbour becomes amount of offset better than serving;
  Event A4: Neighbour becomes better than absolute threshold;
  Event A5: Serving becomes worse than absolute threshold) AND Neighbour becomes better than another absolute threshold2.

ReportConfigEUTRA Information Element

```
-- ASH1START
ReportConfigEUTRA      SEQUENCE (
    triggerType CHOICE {
        event SEQUENCE {
            eventID      CHOICE {
                eventA1      SEQUENCE:{
                    a1-Threshold INTEGER (0) --value range FFS
                },
                eventA2      SEQUENCE:{
                    a2-Threshold INTEGER (0)      --value range FFS
                },
                eventA3      SEQUENCE:{
                    a3-Offset       INTEGER (0)
                    -- value range FFS but will include positive and negative
                values
                },
                event A4      SEQUENCE:{
                    a4-Threshold INTEGER (0)      --value range FFS
                },
                event A5
                    a5-Threshold1       INTEGER (0)       --value range FFS
                    a5-Threshold2       INTEGER (0)       --value range FFS
                }
            },
            hysteresis    INTEGER (0)     --value range FFS
            timeToTrigger    INTEGER (0)     --value range FFS
        },
        periodical    SEQUENCE:{
            reportCGI    BOOLEAN,
            t321       INTEGER (0)      OPTIONAL - COND CGI
                                                    -value range FFS
        }
    },
    triggerQuantity     ENUMERATED (rsrp, rerq),
    reportQuantity      ENUMERATED (sameAsTriggerQuantity, both),
    maxReportCells      INTEGER (1..maxCellReport),
    reportInterval      Integer ( )     OPTIONAL, --Cond Periodic
    reportAmount        Integer (Infinity)    OPTIONAL - Need OP
}
- ANS1STOP
```

ReportConfigEUTRA Field Descriptions
Eventici
Choice of E-UTRA event triggered reporting criteria.
TriggerQuantity
The quantities used to evaluate the triggering condition for the event. The values rsrp and rsrq correspond to Reference Signal Received Power (RSRP) and Reference Signal Received Quality (RSRQ) [36.214].
Hysteresis
Hysteresis parameter for entering/leaving measurement report triggering condition. Value in dB.
Time To Trigger
Time during which specific criteria for the event needs to be met in order to trigger a measurement report. Value in seconds.
Report Quantity
The quantities to be included in the measurement report. The value both means that both the rsrp and rsrq quantities are to be included in the measurement report
MaxReportCells
Max number of cells to include in the measurement report.
ReportInterval
If included, the UE performs periodical reporting with the indicated interval. Value in seconds.
ReportAmount
Number of measurement reports. In case reportCGI is set to 'TRUE' only value 1 applies. In case the reporting configuration concerns a SON report of the strongest cells on the carrier, only value 1 applies. For the latter case, use of other values is FFS.
Change Request
   36.321 CR rev—Current version: 8.2.0
   Proposed change affects: UICC apps ME X Radio Access Network X Core Network
   Title: DRX with PCH, BCH and DL-SCH mapped on BCCH
   Source to WG: LG Electronics Inc.
   Source to TSG: R2
   Work item code: LTE-L23
   Date: Jul. 8, 2008
   Release: Rel-1-8
   Reason for change: X—When to read PCH, BCH, DL-SCH mapped on BCCH during a DRX is not clear.
     Upon a reception of DL-SCH mapped on BCCH, the HARQ RTT Timer and DRX Retransmission Timer work meaninglessly.
     Upon a reception of PCH or DL-SCH mapped on BCCH, the Inactivity Timer works uselessly.
   Summary of change:
     It is proposed that regardless of the DRX configured, the UE shall receive PCH, BCH and DL-SCH mapped on BCCH.
     It is proposed that if PDCCH indicates a DI transmission but is addressed to SI-RNTI, the HARQ RTT Timer and DRX Retransmission Timer is not affected.
     It is proposed that if PDCCH indicates a new transmission and is addressed to SI-RNTI or P-RNTI, the DRX Inactivity Timer is not affected.
   Consequences if not approved:
     Time to read PCH, BCH and DL-SCH mapped on BCCH is unclear.
     Some timers related to DRX work meaninglessly or uselessly.

5.7 Discontinuous Reception (DRX)

The UE may be configured by RRC with a DRX functionality that allows it to not continuously monitor the PDCCH. The DRX functionality consists of a Long DRX cycle, a DRX Inactivity Timer, a DRX Retransmission Timer and optionally a Short DRX Cycle and a DRX Short Cycle Timer, all defined in subclause 3.1.

When a DRX cycle is configured, the Active Time includes the time while:

the On Duration Timer or the DRX Inactivity Timer or a DRX Retransmission Timer or the Contention Resolution Timer is running; or
   a Scheduling Request is pending (as described in subclause 5.4.4); or an uplink grant for a retransmission can occur; or
   a PDCCH indicating a new transmission addressed to the C-RNTI or Temporary C-RNTI of the UE has not been received after successful reception of a Random Access Response (as described in subclause 5.1.4).

When a DRX cycle is configured, the UE shall for each subframe:

start the On Duration Timer when [(SFN*10)+sub frame number] modulo (current DRX Cycle)=DRX Start Offset;
   if a HARQ RTT Timer expires in this subframe and the data in the soft buffer of the corresponding HARQ process was not successfully decoded:
     start the DRX Retransmission Timer for the corresponding HARQ process.
   if a DRX Command MAC control element is received:
     stop the On Duration Timer;
     stop the DRX Inactivity Timer.
   if the DRX Inactivity Timer expires or a DRX Command MAC control element is received in this subframe:
     if the short DRX cycle is configured:
       start the DRX Short Cycle Timer and use the Short DRX Cycle.
     else:
       use the Long DRX cycle.
   if the DRX Short Cycle Timer expires in this subframe:
     use the long DRX cycle.
   during the Active Time, for a PDCCH-subframe except if the subframe is required for uplink transmission for half-duplex FDD UE operation:
   monitor the PDCCH;
   if the PDCCH indicates a DL transmission and is not addressed to SI-RNTI:
     start the HARQ RTT Timer for the corresponding HARQ process;
     stop the DRX Retransmission Timer for the corresponding HARQ process.
   if the PDCCH indicates a new transmission (DL or UL) and is not addressed to SI-RNTI or P-RNTI:
     start or restart the DRX Inactivity Timer.
   if a DL assignment has been configured for this subframe and no PDCCH indicating a DL transmission was successfully decoded:
     start the HARQ RTT Timer for the corresponding HARQ process.
   when not in active time, CQI and SRS shall not be reported.

Regardless of whether the UE is monitoring PDCCH or not the UE receives and transmits HARQ feedback when such is expected.

Regardless of whether the UE is monitoring PDCCH or not the UE shall receive BCH, PCH and DL-SCH mapped on BCCH to be needed to receive.

Change Request
36.321 CR rev—Current version 8.2.0

Title: Handling of Nacked Data in HARQ Buffer when UL State is Out of Sync

Source to WG: LG Electronics Inc.
Source to TSG: R2
Work item code: LTE-L23
Category: F (correction)
Date: Jul. 8, 2008
Release: Rel-8

5.2 Maintenance of Uplink Time Alignment

The UE has a configurable Time Alignment Timer. The Time Alignment Timer is valid only in the cell for which it was configured and started.

If the Time Alignment Timer has been configured, the UE shall:
when a Timing Advance MAC control element is received:
  apply the Timing Advance Command;
  start the Time Alignment Timer (if not running) or restart the Time Alignment Timer (if already running).
when a Time Alignment Command is received in a Random Access Response message:
  if the Random Access Preamble and PRACH resource were explicitly signalled:
    apply the Time Alignment Command;
    start the Time Alignment Timer (if not running) or restart the Time Alignment Timer (if already running).
  else, if the Time Alignment Timer is not running or has expired:
    apply the Time Alignment Command;
    start the Time Alignment Timer;
    when the contention resolution is considered not successful as described in subclause 5.1.5, stop the Time Alignment Timer.
  else:
    ignore the received Time Alignment Command.
when the Time Alignment Timer has expired or is not running:
  prior to any uplink transmission, use the Random Access procedure (see subclause 5.1) in order to obtain uplink Time Alignment.
when the Time Alignment Timer expires:
  release all PUCCH resources;
  release any assigned SRS resources.
when the Time Alignment Timer expires or is stopped:
  flush all HARQ buffers.

Change Request
36.321 CR rev—Current version 8.2.0

Title: Handling of Received UL Grant in RA Procedure

Source to WG: LG Electronics Inc.
Source to TSG: R2
Work item code: LTE-L23
Date: Jul. 8, 2008
Release Rel-8

5.4.1 UL Grant Reception

When the UE has a C-RNTI, Semi-Persistent Scheduling C-RNTI, or Temporary C-RNTI, the UE shall for each TTI:
if an uplink grant for this TTI has been received on the PDCCH for the UE's C-RNTI or Temporary C-RNTI; or
if an uplink grant for this TTI has been received in a Random Access Response:
  indicate a valid uplink grant and the associated HARQ information to the HARQ entity for this TTI.
else, if an uplink grant for this TTI has been configured:
  indicate an uplink grant, valid for new transmission, and the associated HARQ information to the HARQ entity for this TTI.
NOTE: The period of configured uplink grants is expressed in TTIs.
NOTE: If the UE receives both a grant for its RA-RNTI and a grant for its C-RNTI, and [Message 3] buffer is empty, the UE may choose to continue with either the grant for its RA-RNTI or the grant for its C-RNTI.

During a Random Access procedure, when an uplink grant is received and addressed to a C-RNTI, the UE shall:
if there is a MAC PDU in the [Message 3] buffer; and
if the Contention Resolution Timer is not running as described in section 5.1.5:
  ignore the received uplink grant.

5.4.2.1 HARQ Entity

There is one HARQ entity at the UE. A number of parallel HARQ processes are used in the UE to support the HARQ entity, allowing transmissions to take place continuously while waiting for the feedback on the successful or unsuccessful reception of previous transmissions.

At a given TTI, if an uplink grant is indicated for the TTI, the HARQ entity identifies the HARQ process for which a transmission should take place. It also routes the receiver feedback (ACKJNACK information), MCS and resource, relayed by the physical layer, to the appropriate HARQ process.

If TTI bundling is configured, the parameter TTI_BUNDLE_SIZE provides the number of TTIs of a TTI bundle. If a transmission is indicated for the TTI, the HARQ entity identifies the HARQ process for which a transmission should take place. The next TTI_BUNDLE_SIZE uplink TTIs are subsequently used for transmissions for the identified HARQ process. HARQ retransmissions within a bundle shall be performed without waiting for feedback from previous transmissions according to TTI_BUNDLE SIZE. The UE expects feedback only for the last transmission of a bundle.

For transmission of an uplink message containing the C-RNTI MAC control element or an uplink message including a CCCH SDU during Random Access (see section 5.1.5) TTI bundling does not apply.

The number of HARQ processes is equal to [X] [FFS]. Each process is associated with a number from 0 to [X−1].
At the given TTI, the HARQ entity shall:
if an uplink grant indicating that the NDI has been incremented compared to the value in the previous transmission of this HARQ process is indicated for this TTI or if this is the very first transmission for this HARQ process (i.e. a new transmission takes place for this HARQ process):
  if an uplink grant for this TTI has been received in a Random Access Response and there is a MAC PDU in the [Message3] buffer:
    obtain the MAC PDU to transmit from the [Message3] buffer.

else, if the "uplink prioritization" entity indicates the need for a new transmission:
  obtain the MAC PDU to transmit from the "Multiplexing and assembly" entity;
  instruct the HARQ process corresponding to this TTI to trigger a new transmission using the identified parameters.
  else:
  flush the HARQ buffer.
else, if an uplink grant, indicating that the NDI is identical to the value in the previous transmission of this HARQ process (i.e. a retransmission takes place for this HARQ process), is indicated for this TTI:
  instruct the HARQ process to generate an adaptive retransmission.
else, if the HARQ buffer of the HARQ process corresponding to this TTI is not empty:
  instruct the HARQ process to generate a non-adaptive retransmission.
NOTE: A retransmission triggered by the HARQ entity should be cancelled by the corresponding HARQ process if it collides with a measurement gap or if a non-adaptive retransmission not allowed.

Change Request
  36.321 CR rev—Current version 8.2.0
  Title: NDI and Msg4 Carrying Contention Resolution ID
  Source to WG: LG Electronics Inc.
  Source to TSG: R2
  Work item code: LTE-L23
  Date: Jul. 8, 2008
  Release: Rel-8
Proposed change affects: UICC apps ME X Radio Access Network X Core Network
5.3.2.2 HARQ Process
  For each received TB:
    if the NDI, when provided, has been incremented compared to the value of the previous received transmission for this HARQ process; or
    if the HARQ process is equal to the broadcast process and the physical layer indicates a new transmission; or if this is the very first received transmission for this HARQ process:
    a new transmission is indicated for this HARQ process.
    else, a retransmission is indicated for this HARQ process.
  The UE then shall:
    if a new transmission is indicated for this HARQ process:
    replace the data currently in the soft buffer for this HARQ process with the received data if a retransmission is indicated for this HARQ process:
    if the data has not yet been successfully decoded:
    combine the received data with the data currently in the soft buffer for this HARQ process.
    if the TB size is different from the last valid TB size signalled for this HARQ process:
    the UE may replace the data currently in the soft buffer for this HARQ process with the received data.
    attempt to decode the data in the soft buffer;
    if the data in the soft buffer was successfully decoded:
    if the HARQ process is equal to the broadcast process, deliver the decoded MAC PDU to RRC.
    else, deliver the decoded MAC PDU to the disassembly and demultiplexing entity.
    generate a positive acknowledgement (ACK) of the data in this HARQ process.
    else:
    generate a negative acknowledgement (NACK) of the data in this HARQ process.
    if the HARQ process is associated with a transmission indicated with an RA-RNTI; or
    if the HARQ process is associated with a transmission indicated with a Temporary C-RNTI and a UE Contention Resolution Identity match is not indicated; or
    if the HARQ process is equal to the broadcast process:
    do not indicate the generated positive or negative acknowledgement to the physical layer.
    else:
    indicate the generated positive or negative acknowledgement to the physical layer.
  When determining if NDI has been incremented compared to the value in the previous transmission UE shall ignore NDI received in all downlink assignments on PDCCH for its Temporary C-RNTI.

Agenda Item: 6.1.1.6
Source: LG Electronics Inc.

Title: DRX with PCH, BCH and DL-SCH Mapped on BCCH

Document for: Discussion and Decision

1. Discussion

Reading PCH, BCH and DL-SCH Mapped on BCCH in a UE Configured with DRX Functionality
  In DRX operation, the Active Time is defined as times that the UE monitors the PDCCH. And, currently, the Active Time does not include the time to read PCH, BCH and DL-SCH mapped on BCCH. However, obviously the PCH, BCH and DL-SCH mapped on BCCH should be read regardless of the DRX.
  Proposal 1: it is proposed that regardless of the DRX configured, the UE shall receive PCH, BCH and DL-SCH mapped on BCCH.
Impact to DRX Operation with a Reception of PCH and DL-SCH Mapped on BCCH
  Currently, during the Active Time, when the PDCCH indicates a DL transmission, the UE starts HARQ RTT Timer and stops the DRX Retransmission Timer for the corresponding HARQ process respectively. Also, the UE starts or restarts the DRX Inactivity Timer.
  In case DL-SCH mapped on BCCH, the first transmission and repetitions of the SystemInformationBlockType1 are scheduled in subframe #5. And all SI messages are scheduled within the corresponding SI-window. It means that there is no need to handle HARQ RTT Timer and DRX Retransmission Timer for a reception of DL-SCH mapped on BCCH.
  Proposal 2: it is proposed that if PDCCH indicates a DI transmission but is addressed to SI-RNTI, the HARQ RTT Timer and DRX Retransmission Timer is not affected.
  As proposal 1, BCCH and PCH should be read regardless of the DRX configured. That is, since BCCH and PCH should work independently of the DRX, the DRX Inactivity Timer should be independent of BCCH and PCH.
  Proposal 3: it is proposed that if PDCCH indicates a new transmission and is addressed to SI-RNTI or P-RNTI, the DRX Inactivity Timer is not affected.

2 Conclusion

Proposal 1: it is proposed that regardless of the DRX configured, the UE shall receive PCH, BCH and DL-SCH mapped on BCCH.

Proposal 2: it is proposed that if PDCCH indicates a DI transmission but is addressed to SI-RNTI, the HARQ RTT Timer and DRX Retransmission Timer is not affected.

Proposal 3: it is proposed that if PDCCH indicates a new transmission and is addressed to SI-RNTI or P-RNTI, the DRX Inactivity Timer is not affected.

The associated CR is provided in R2-084386 DRX with PCH, BCH, DL-SCH mapped on BCCH, LG Electronics Inc.

Agenda Item: 6.1.1.5
Source: LG Electronics Inc.
Title: Handling of Nacked Date in HARQ Buffer When UL State is Out of Sync
Document for: Discussion and Decision 1 Introduction In the current MAC specification 3GPP TS 36.321 V8.2.0, if HARQ NACK corresponding to the transmitted data is received and the HARQ buffer of the HARQ process is not empty, a retransmission of the data is instructed by the HARQ entity. Then unless there is a measurement gap of the time of the retransmission, the retransmission is generated to be transmitted.

However, although there is Nacked data in HARQ buffer and there is no measurement gap at the time of the retransmission, the retransmission could not be done because Time Alignment Timer could suddenly expire.

In this contribution, we discuss some cases where HARQ buffer contains Nacked data when UL state becomes out of sync, and identify a problem caused by this situation.

2 Discussion

In most cases, during UE's UL activity on UL-SCH, the eNB should be responsible for keeping the UL state of the UE in sync. However, in some cases, there is a possibility that while there is Nacked data in HARQ buffer, the UL state of the UE suddenly becomes out of sync state. Those cases are listed below.

Figure 20A:
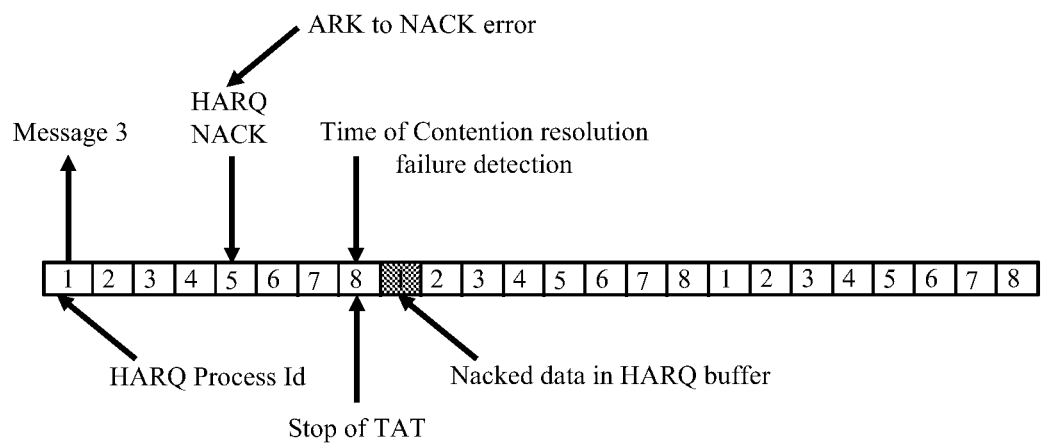
FIG. 20(*a*) illustrates handling of Nacked data when uplink state is out of sync.

Contention resolution failure: In contention based random access procedure, more than one UE could receive a HARQ feedback corresponding to the message 3 transmission. Given that the eNB sends HARQ ACK, one receives HARQ ACK as it is but, the other one could receive HARQ NACK due to HARQ ACK to NACK error. Then, given initial access, RLF, HO failure, the eNB sends message 4 containing UE Contention Resolution Identity MAC CE for contention resolution. Accordingly, the UEs that received HARQ NACK could be identified as a loser. Therefore, since it was agreed that when the contention resolution failure is identified by the mismatched UE Contention Resolution Identity MAC CE, UL state of the UE is considered out of sync, containing Nacked data in HARQ buffer occurs when UL state is not aligned. See FIG. 20(a).

Figure 20B:
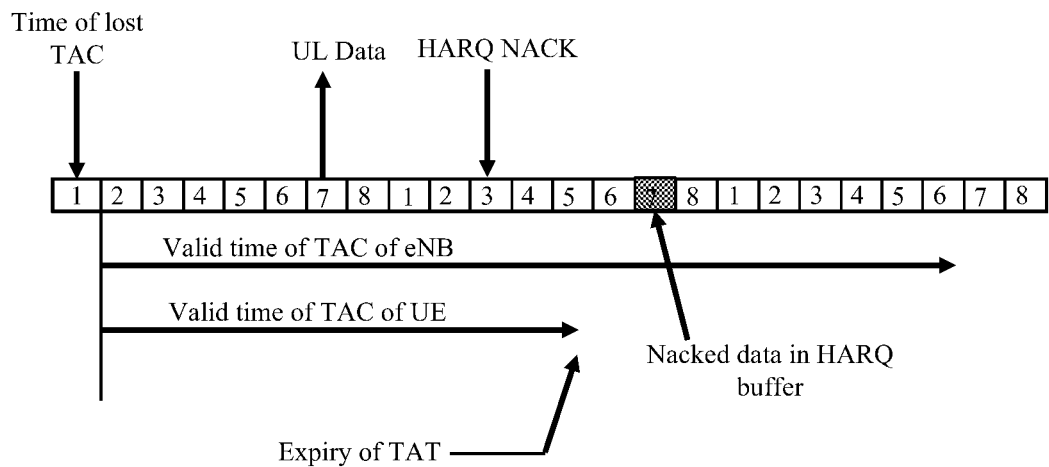

Misaligned Time Alignment Timer (TAT): Due to facts that Time Alignment Command (TAC) is indicated as MAC CE, there is a possibility that the MAC PDU carrying the TAC is lost. If it happens, TAT is misaligned between the eNB and the UE since TAT in eNB is extended while TAT in UE is not. In this case, during UL HARQ activity, the UE's UL state could go to out of sync state. Also, there might be Nacked data in HARQ buffer. See FIG. 20(b).

With the above situation and the current specification, once the UL sync of the UE becomes in sync again, the Nacked data in HARQ, if any, is automatically retransmitted at the time of the retransmission. But, we think that from eNB point of view the retransmission is not an expected transmission. So, the resource of the retransmission would not be intended for the UE at that time. Therefore, keeping Nacked data in HARQ when the UL state is out of sync would be dangerous due to a possibility that it is collided with other UE's transmission.

To overcome the above situation, we can either flush HARQ buffer at in sync state→out of sync state or prohibit to automatically resume a non-adaptive retransmission at out of sync state→in sync state. We believe that it is obvious that message 3 in HARQ buffer is meaningless in contention resolution failure case, and it is difficult for the eNB to trace what is stored in HARQ buffer in misaligned TAT case. Due to simplicity reason, it is preferred to flush HARQ buffer at in sync state→out of sync state.

Proposal: it is proposed to flush all HARQ buffers when Time Alignment Timer expires or is stopped.

3 Conclusion

It is proposed to flush all HARQ buffers when Time Alignment Timer expires or is stopped. The associated CR is provided in R2-084393 Handling of Nacked Date in HARQ Buffer When UL State is Out of Sync, LG Electronics Inc.

Agenda Item: 6.1.1.4
Source: LG Electronics Inc.
Title: Handling of Received UL Grant in RA procedure
Document for: Discussion and Decision 1 Discussion Regarding handling of a received UL grant during a random access procedure, a couple of notes in the current specification 3GPP TS 36.321 V8.2.0 are inserted as follows.

NOTE: When an uplink transmission is required, e.g., for contention resolution, the eNB should not provide a grant smaller than 80 bits in the Random Access Response.

NOTE: If within a Random Access procedure, an uplink grant provided in the Random Access Response for the same group of Random Access Preambles has a different size than the first uplink grant allocated during that Random Access procedure, the UE behavior is not defined.

NOTE: If the UE receives both a grant for its RA-RNTI and a grant for its C-RNTI, the UE may choose to continue with either the grant for its RA-RNTI or the grant for its C-RNTI.

And following text in 3GPP TS 36.321 V8.2.0 states the current UL HARQ operation.

At the given TTI, the HARQ entity shall:
if an uplink grant indicating that the NDI has been incremented compared to the value in the previous transmission of this HARQ process is indicated for this TTI or if this is the very first transmission for this HARQ process (i.e. a new transmission takes place for this HARQ process):
  if there is an ongoing Random Access procedure and there is a MAC PDU in the [Message 3] buffer.
    obtain the MAC PDU to transmit from the [Message3] buffer.
  else, if the "uplink prioritisation" entity indicates the need for a new transmission:
    obtain the MAC PDU to transmit from the "Multiplexing and assembly" entity;

instruct the HARQ process corresponding to this TTI to trigger a new transmission using the identified parameters.
else:
   flush the HARQ buffer.
else, if an uplink grant, indicating that the NDI is identical to the value in the previous transmission of this HARQ process (i.e. a retransmission takes place for this HARQ process), is indicated for this TTI:
   instruct the HARQ process to generate an adaptive retransmission.
else, if the HARQ buffer of the HARQ process corresponding to this TTI is not empty:
   instruct the HARQ process to generate a non-adaptive retransmission.

1.1 Selection Between a Grant for C-RNTI and a Grant for RA-RNTI

It is our understanding that the above third note highlighted in yellow is relevant only before generating a MAC PDU for message 3 because the building the MAC PDU can be based on either a grant for a RA-RNTI or a grant for a C-RNTI. That is, the MAC PDU including BSR can be handled with either the grant for the RA-RNTI or the grant for the C-RNTI. However, once the MAC PDU is built and stored in [Message 3] buffer, it is not clear whether or not the UE can still choose between them when the UE is having the both grants. That is, while there is a MAC PDU in [Message 3] buffer, if a UE has a grant for its C-RNTI and a grant for its RA-RNTI, the current specification says that the UE can take one of them as the note highlighted in yellow. If the UE takes the grant for its C-RNTI, the current specification also says that the HARQ entity obtains the MAC PDU from the [Message 3] buffer and instructs the HARQ process to store it in HARQ buffer as the text highlighted in green. However, it is unlikely that the MAC PDU transmission is properly handled with the grant for the C-RNTI because the MAC PDU already was generated by not the grant for the C-RNTI but the grant for the RA-RNTI. Therefore, the selection should be allowed only before the building the MAC PDU for the message 3. Also, the MAC PDU in the [Message 3] buffer should be handled with only the grant for the RA-RNTI.

Proposal 1: It is proposed to modify the note like "if the UE receives both a grant for its RA-RNTI and a grant for its C-RNTI and [Message 3] buffer is empty, the UE may choose to continue with either the grant for its RA-RNTI or the grant for its C-RNTI".

Proposal 2: It is also proposed that only when an UL grant is indicated in a Random Access Response, the HARQ entity instructs the HARQ process to store a MAC PDU stored in [Message 3] buffer in HARQ buffer.

1.2 Handling of an UL Grant Addressed to a C-RNTI During RA

With proposal 1 and 2, during a RA procedure, when the UE receives a grant for its C-RNTI except for a purpose of contention resolution, we assume that the HARQ entity obtains a new MAC PDU from "Multiplexing and assembly" entity and the HARQ process starts to transmit it. However, the concern is whether or not we can allow to take an UL HARQ not related to the ongoing RA procedure and a Random Access procedure in parallel.

Figure 21:
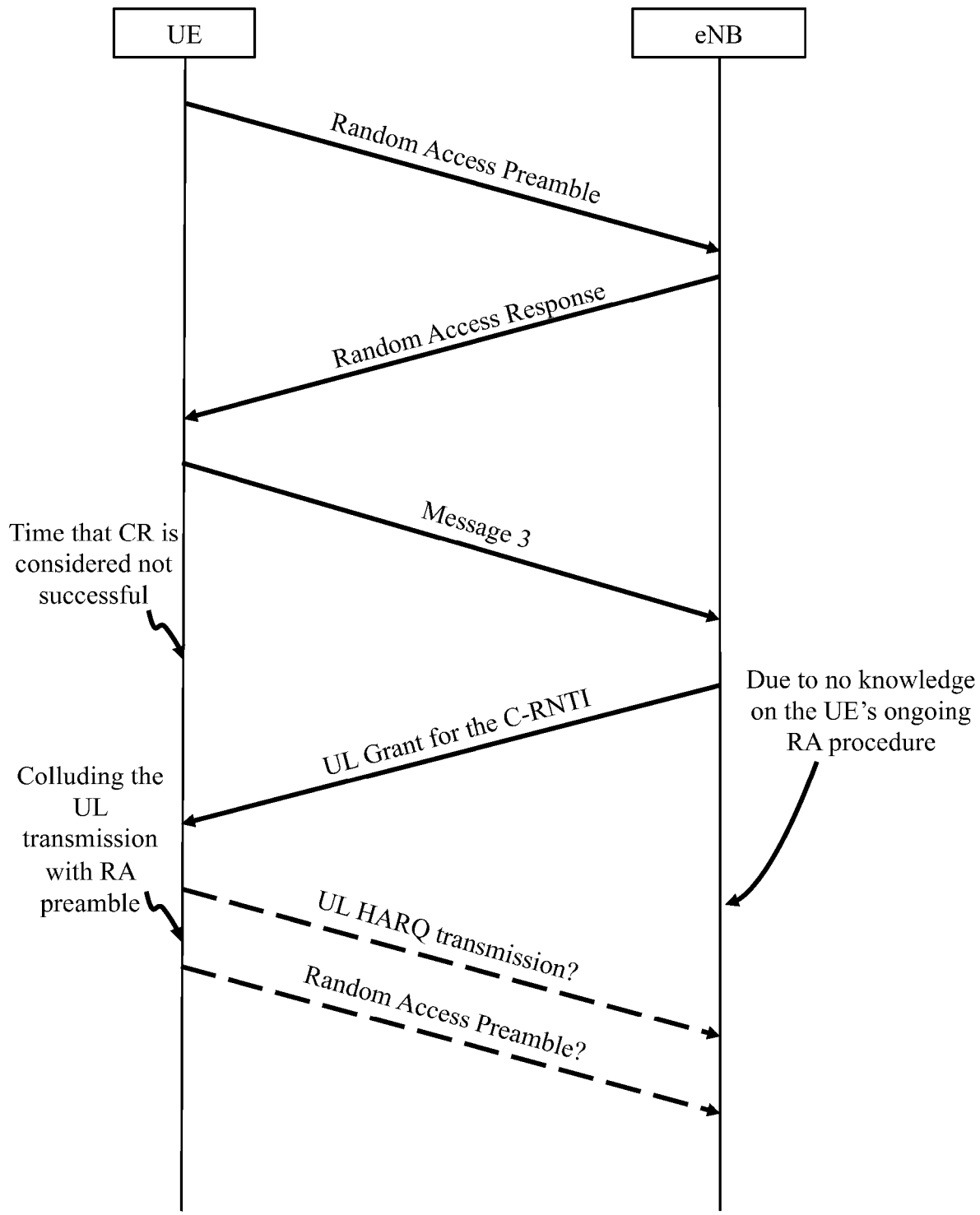
FIG. 21 illustrates when a grant collides with a time of random access preamble transmission.

If taking both in parallel, there is a possibility that the time of the transmission upon the received grant is collided with the time of RA preamble transmission as depicted in FIG. 21. Although it is a rare case, we should not allow to happen it because such happening breaks a single carrier property of an uplink transmission. Then, we end up with falling in selection between the UL HARQ transmission and a RA preamble transmission. It would be complicated to implement it in MAC.

If we take only UL HARQ, it would mean that the ongoing RA procedure is cancelled. Then, the BSR in the MAC PDU in the [Message 3] buffer is lost. So, as long as a new BSR is not triggered, the UE would be stalling. Furthermore, currently, an endless RA attempt is supervised by RRC. So, if the ongoing RA procedure is cancelled by MAC itself, it would be complicated to implement it in both MAC and RRC.

Therefore, for simplicity, it is proposed to keep the ongoing RA procedure and ignore the received uplink grant for the C-RNTI. That is,
   If there is an ongoing RA procedure and there is a MAC PDU in [Message 3 buffer]; and
   If the Contention Resolution Timer is not running
   When receiving a grant for its C-RNTI, the UE ignores the received UL grant for its C-RNTI.

Proposal 3: It is proposed that if there is an ongoing RA procedure, there is a MAC PDU in [Message 3 buffer] and the Contention Resolution Timer is not running, when receiving a grant for its C-RNTI, the UE ignores the received UL grant for its C-RNTI.

<<Alternatively, in the Above Scenario>>
1. The UE cancels the ongoing RA procedure.
2. The UE cancels the RA preamble transmission. For a while, the UE selects the PRACH resources again.
3. The UE treats the transmission at that time as colliding with a measurement gap. That is, At time collided with a RA preamble, the transmission is skipped and then, the HARQ feedback corresponding to the transmission is considered as HARQ ACK
4. The UE treats the transmission at that time as colliding with a measurement gap. That is, At time collided with a RA preamble, the transmission is skipped and then, the HARQ feedback corresponding to the transmission is considered as HARQ NACK 2 Conclusion Proposal 1: It is proposed to modify the note like "if the UE receives both a grant for its RA-RNTI and a grant for its C-RNTI, and [Message 31 buffer is empty, the UE may choose to continue with either the grant for its RA-RNTI or the grant for its C-RNTI".

Proposal 2: It is proposed to that only when a new UL grant is indicated in a Random Access Response, the HARQ entity instructs the HARQ process to store a MAC PDU stored in [Message 3] buffer in HARQ buffer.

Proposal 3: It is proposed that if there is an ongoing RA procedure, there is a MAC PDU in [Message 3 buffer] and the Contention Resolution Timer is not running, when receiving a grant for its C-RNTI, the UE ignores the received UL grant for its C-RNTI.

The associated CR is provided in R2-084388 Handling of Received UL Grant in RA procedure, LG Electronics Inc.
Agenda Item: 6.1.1.5
Source: LG Electronics Inc.

Title: NDI and Msg4 Carrying Contention Resolution ID

Document for: Discussion and Decision

1 Discussion

During Warsaw meeting, it was agreed that for message 3 transmission, when determining if NDI has been incremented compared to the value in the previous transmission UE ignores NDI received in all uplink grants on PDCCH for its Temporary C-RNTI, R2-083723 NDI and Msg3, LG Electronics Inc, RAN2 #62bis, Warsaw, Poland. It is because the eNB can not trace the last NDI of the HARQ processes that were used for message 3 transmission in a random access procedure.

In addition to this, we found that same situation occurs in case of message 4 transmission. That is, to transmit the message 4 carrying the Contention Resolution Id, PDCCH addressed to a Temporary C-RNTI is used for DL assignment. This PDCCH also contains NDI field. Like message 3 transmission, the eNB can not trace the last NDI of the HARQ processes that were used for message 4 transmission in a random access procedure.

For instance,

1. At the first RA attempt, the UE receives the message 4 with its Temporary C-RNTI. But, until expiry of CR timer, the message 4 is not correctly decoded. Then, The UE tries the second RA attempt. At the second RA attempt, with a reception of message 4, the associated PDCCH addressed to its Temporary C-RNTI indicates the same HARQ process Id and NDI as ones at the first RA attempts. And we think that the TB size of message 4 carrying Contention Resolution Id would not vary. So, it would end up with combining the received message 4 at the second RA attempts with the message with the message 4 at the first RA attempts in HARQ buffer.

2. At the first RA attempt, the UE correctly receives the message 4 with its Temporary C-RNTI. But, the Contention Resolution Id is not matched. Then, The UE tries the second RA attempt. At the second RA attempt, with a reception of message 4, the associated PDCCH addressed to its Temporary C-RNTI indicates the same HARQ process Id and NDI as ones at the first RA attempts. In this case, we think that the current specification lets the UE discard the message 4. So, it would end up with a retry of RA attempt.

As a result of the examples shown above, processing NDI received in downlink assignment on PDCCH for a Temporary C-RNTI would cause the same problem as message 3 transmission in R2-083723 NDI and Msg3, LG Electronics Inc, RAN2 #62bis, Warsaw, Poland.

Proposal: it is proposed that for message 4 reception, when determining if NDI has been incremented compared to the value in the previous reception UE ignores NDI received in all downlink assignments on PDCCH for its Temporary C-RNTI.

2 Conclusion

It is proposed that for message 4 reception, when determining if NDI has been incremented compared to the value in the previous reception UE ignores NDI received in all downlink assignments on PDCCH for its Temporary C-RNTI.

The associated CR is provided in R2-084391 NDI and Msg4 Carrying Contention Resolution ID, LG Electronics Inc.

Change Request
36.321 CR rev—Current version 8.2.0

Title: Correction to PCH Reception

Source to WG: 2:0 LG Electronics Inc.
Source to TSG: 2:0 R2
Work item code: LTE-L23
Date: Jul. 8, 2008

Release: Rel-8
Reason for change: It is not implemented in MAC specification that system information update is indicated by PCH in RRC_CONNECTED.
Summary for change: It is proposed to let a UE in both RRC_CONNECTED and RRC_IDLE read PCH. It is also proposed to remove detailed description on time to read PCH in MAC and leave it in the care of RRC.
Consequences if not approved: The UE in RRC_CONNECTED does not read PCH for system information update.
5.5 PCH Reception
When the UE needs to receive PCH, the UE shall:
if a PCH assignment has been received on the PDCCH for the P-RNTI:
attempt to decode the TB on the PCH as indicated by the PDCCH information.
if a TB on the PCH has been successfully decoded:
deliver the decoded MAC PDU to higher layers.

The invention claimed is:

1. A user equipment (UE) comprising:
a receiver; and
a processor, operatively coupled to the receiver, wherein:
the receiver and the processor are configured to:
receive a timing advance medium access control (MAC) control element; the processor configured to:
apply a timing advance command of the timing advance MAC control element and to start or restart a time alignment timer;
when the time alignment timer expires, release physical uplink control channel (PUCCH) resources and release any assignment sounding reference signal (SRS) resources; and
when the time alignment timer expires or is stopped, flush hybrid automatic request (HARQ) buffers.

2. The UE of claim 1 wherein the flush of the HARQ buffers flushes all of the HARQ buffers.

3. The UE of claim 1 wherein the time alignment timer is started when the time alignment timer is not running and the time alignment timer is restarted when the time alignment timer is already running.

4. The UE of claim 1 wherein: the receiver and the processor are further configured to: monitor, in discontinuous reception (DRX) operation and in a radio resource control connected (RRC_CONNECTED) state, physical downlink control channels (PDCCHs) physical downlink control channel during a first active time; receive, during the first active time, a PDCCH indicating a first new downlink transmission addressed to a cell radio network temporary identifier (C-RNTI) of the UE; and receive the first new downlink transmission, based on the PDCCH addressed to the C-RNTI; the processor is further configured to, start or restart a DRX Inactivity Timer based on the PDCCH indicating the first new downlink transmission addressed to the C-RNTI; the receiver and the processor are further configured to: monitor, in DRX operation and in RRC_CONNECTED state, PDCCHs during a second active time; receive, during the second active time, a PDCCH indicating a second new downlink transmission addressed to a paging radio network temporary identifier (P-RNTI); and receive the second new downlink transmission, based on the PDCCH indicating the second new downlink transmission addressed to the P-RNTI; and the processor is further configured to not start or restart, based on the PDCCH indicating the second new downlink transmission addressed to the P-RNTI, a DRX Inactivity Timer.

5. The UE of claim 4 wherein: the receiver and the processor are further configured to: monitor, in DRX operation and in RRC_CONNECTED state, PDCCHs during a third active time, and during the third active time, a PDCCH indicating a third new downlink transmission addressed to a system information radio network temporary identifier (SI-RNTI) is received; and receive the third new downlink transmission, based on the PDCCH indicating the third new downlink transmission addressed to the SI-RNTI; and the processor is further configured to, based on the PDCCH indicating the third new downlink transmission addressed to the SI-RNTI, not start a hybrid automatic request round-trip time (HARQ RTT) Timer and not stop a DRX Retransmission Timer for a corresponding HARQ process and not start or not restart a DRX Inactivity Timer.

6. The UE of claim 5 wherein the receiver and the processor are further configured to receive, based on the PDCCH indicating the third new downlink transmission addressed to the SI-RNTI, a downlink-shared channel (DL-SCH) having data of a broadcast control channel (BCCH).

7. The UE of claim 5 wherein the receiver and the processor are further configured to, based on the PDCCH indicating the second new downlink transmission addressed to the P-RNTI, to receive a paging channel (PCH) and deliver a decoded medium access control (MAC) protocol data unit (PDU) to higher layers.

8. The UE of claim 1 wherein the receiver and the processor are further configured, in both a radio resource control idle (RRC_IDLE) state and a radio resource control connected (RRC_CONNECTED) state, to monitor a physical downlink control channel (PDCCH) for a paging radio network temporary identifier (P-RNTI) for a paging channel (PCH) assignment.

9. The UE of claim 1 wherein the receiver and the processor are further configured to receive a first downlink assignment that includes an new data indicator (NDI) on a physical downlink control channel (PDCCH) addressed to a Temporary cell radio network temporary identifier (C-RNTI) and in determining whether the NDI has been incremented compared to a value of a previous transmission, to ignore the NDI included in the first downlink assignment.

10. A method performed by a user equipment (UE), the method comprising:
receiving a timing advance medium access control (MAC) control element;
applying a timing advance command of the timing advance MAC control element and to start or restart a time alignment timer;
releasing physical uplink control channel (PUCCH) resources and releasing any assignment sounding reference signal (SRS) resources, when the time alignment timer expires; and
flush hybrid automatic request (HARQ) buffers, when the time alignment timer expires or is stopped.

11. The method of claim 10 wherein the flushing of the HARQ buffers flushes all of the HARQ buffers.

12. The method of claim 10 wherein the time alignment timer is started when the time alignment timer is not running and the time alignment timer is restarted when the time alignment timer is already running.

13. The method of claim 10 further comprising: monitoring, in discontinuous reception (DRX) operation and in a radio resource control connected (RRC_CONNECTED) state, physical downlink control channels (PDCCHs) during a first active time; receiving, during the first active time, a PDCCH indicating a first new downlink transmission addressed to a cell radio network temporary identifier (C-RNTI) of the UE; and receiving the first new downlink transmission, based on the PDCCH addressed to the C-RNTI; starting or restarting a DRX Inactivity Timer based on the PDCCH indicating the first new downlink transmission addressed to the C-RNTI; monitoring, in DRX operation and in RRC_CONNECTED state, PDCCHs during a second active time; receiving, during the second active time, a PDCCH indicating a second new downlink transmission addressed to a paging radio network temporary identifier (P-RNTI); and receiving the second new downlink transmission, based on the PDCCH indicating the second new downlink transmission addressed to the P-RNTI; and not starting or not restarting, based on the PDCCH indicating the second new downlink transmission addressed to the P-RNTI, a DRX Inactivity Timer.

14. The method of claim 13 further comprising: monitoring, in DRX operation and in RRC_CONNECTED state, PDCCHs during a third active time, and during the third active time, a PDCCH indicating a third new downlink transmission addressed to a system information radio network temporary identifier (SI-RNTI) is received; and receiving the third new downlink transmission, based on the PDCCH indicating the third new downlink transmission addressed to the SI-RNTI; and not starting a hybrid automatic request round-trip time (HARQ RTT) Timer and not stopping a DRX Retransmission Timer for a corresponding HARQ process and not start or not restart a DRX Inactivity Timer, based on the PDCCH indicating the third new downlink transmission addressed to the SI-RNTI.

15. The method of claim 14 further comprising receiving, based on the PDCCH indicating the third new downlink transmission addressed to the SI-RNTI, a downlink-shared channel (DL-SCH) having data of a broadcast control channel (BCCH).

16. The method of claim 14 further comprising receiving, based on the PDCCH indicating the second new downlink transmission addressed to the P-RNTI, a paging channel (PCH) and delivering a decoded medium access control (MAC) protocol data unit (PDU) to higher layers.

17. The method of claim 10 further comprising monitoring, in both a radio resource control idle (RRC_IDLE) state and a radio resource control connected (RRC_CONNECTED) state, a physical downlink control channel (PDCCH) for a paging radio network temporary identifier (P-RNTI) for a paging channel (PCH) assignment.

18. The method of claim 10 further comprising receiving a first downlink assignment that includes an new data indicator (NDI) on a physical downlink control channel (PDCCH) addressed to a Temporary cell radio network temporary identifier (C-RNTI) and in determining whether the NDI has been incremented compared to a value of a previous transmission, ignoring the NDI included in the first downlink assignment.

19. A base station comprising: a transmitter; and a processor, operatively coupled to the transmitter, wherein: the transmitter and the processor are configured to: transmit, to a user equipment (UE) in discontinuous reception (DRX) operation of the UE and the UE is in a radio resource control connected (RRC_CONNECTED) state, during a first active time of the DRX operation, a physical downlink control channel (PDCCH) indicating a first new downlink transmission addressed to a cell radio network temporary identifier (C-RNTI) of the UE; and transmit the first new downlink transmission; the processor is further configured to track DRX operation of the UE by knowing that the UE starts or restarts a DRX Inactivity Timer based on the PDCCH indicating the first new downlink transmission addressed to the C-RNTI; the transmitter and the processor are further configured to: transmit, when the UE is in DRX operation and in RRC_CONNECTED state during a second active time, a PDCCH indicating a second new downlink transmission addressed to a paging radio network temporary identifier (P-RNTI); and transmit the second new downlink transmission to the UE; and the processor is further configured to track DRX operation of the UE by knowing that the UE does not start or restart, based on the PDCCH indicating the second new downlink transmission addressed to the P-RNTI, a DRX Inactivity Timer.

20. The base station of claim 19 wherein: the transmitter and the processor are configured to: transmit, to the UE when the UE is in DRX operation and in RRC_CONNECTED state, a PDCCH, during a third active time of the UE, indicating a third new downlink transmission addressed to a system information radio network temporary identifier (SI-RNTI); and transmit, to the UE, the third new downlink transmission; and the processor is further configured to track, based on the PDCCH indicating the third new downlink transmission addressed to the SI-RNTI, DRX operation of the UE by knowing that the UE does not start a hybrid automatic request round-trip time (HARQ RTT) Timer and not stop a DRX Retransmission Timer for a corresponding HARQ process and not start or restart a DRX Inactivity Timer.

21. The base station of claim 20 wherein the third new downlink transmission has a downlink-shared channel (DL-SCH) having data of a broadcast control channel (BCCH).

22. The base station of claim 19 wherein the second new downlink transmission includes a paging channel (PCH).

23. The base station of claim 19 wherein the transmitter and the processor are further configured, when the UE is in both a radio resource control idle (RRC_IDLE) state and a radio resource control connected (RRC_CONNECTED) state, to transmit a PDCCH for the P-RNTI for a paging channel (PCH) assignment for at least the UE.

24. A method performed by a base station, the method comprising:
    transmitting, to a user equipment (UE) in discontinuous reception (DRX) operation of the UE and the UE is in a radio resource control connected (RRC_CONNECTED) state, during a first active time of the DRX operation, a physical downlink control channel (PDCCH) indicating a first new downlink transmission addressed to a cell radio network temporary identifier (C-RNTI) of the UE; transmitting the first new downlink transmission; tracking DRX operation of the UE by knowing that the UE starts or restarts a DRX Inactivity Timer based on the PDCCH indicating the first new downlink transmission addressed to the C-RNTI; transmitting, when the UE is in DRX operation and in RRC_CONNECTED state during a second active time, a PDCCH indicating a second new downlink transmission addressed to a paging radio network temporary identifier (P-RNTI); transmitting the second new downlink transmission to the UE; and tracking DRX operation of the UE by knowing that the UE starts or restarts, based on the PDCCH indicating the second new downlink transmission addressed to the P-RNTI, a DRX Inactivity Timer.

25. The method of claim 24 further comprising: transmitting, to the UE when the UE is in DRX operation and in RRC_CONNECTED state, a PDCCH, during a third active time of the UE, indicating a third new downlink transmission addressed to a SI-RNTI; transmitting, to the UE, the third new downlink transmission; and tracking, based on the PDCCH indicating the third new downlink transmission addressed to the SI-RNTI, DRX operation of the UE by knowing that the UE does not start a hybrid automatic request round-trip time (HARQ RTT) Timer and not stop a DRX Retransmission Timer for a corresponding HARQ process and not start or restart a DRX Inactivity Timer.

26. The method of claim 25 wherein the third new downlink transmission has a downlink-shared channel (DL-SCH) having data of a broadcast control channel (BCCH).

27. The method of claim 24 wherein the second new downlink transmission includes a paging channel (PCH).

28. The method of claim 24 further comprising transmitting, when the UE is in both a radio resource control idle (RRC_IDLE) state and a radio resource control connected (RRC_CONNECTED) state, a PDCCH for the P-RNTI for a paging channel (PCH) assignment for at least the UE.

* * * * *